US010606040B2

(12) United States Patent
Hsu et al.

(10) Patent No.: US 10,606,040 B2
(45) Date of Patent: Mar. 31, 2020

(54) IMAGE CAPTURING LENS ASSEMBLY, IMAGING APPARATUS AND ELECTRONIC DEVICE

(71) Applicant: LARGAN PRECISION CO., LTD., Taichung (TW)

(72) Inventors: Po-Lun Hsu, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 16/427,690

(22) Filed: May 31, 2019

(65) Prior Publication Data

US 2019/0285858 A1    Sep. 19, 2019

Related U.S. Application Data

(63) Continuation of application No. 15/243,056, filed on Aug. 22, 2016, now Pat. No. 10,353,176.

(30) Foreign Application Priority Data

May 20, 2016   (TW) .............................. 105115693 A

(51) Int. Cl.
    G02B 3/02      (2006.01)
    G02B 21/02     (2006.01)
    G02B 13/04     (2006.01)
    G02B 9/62      (2006.01)
    G02B 13/00     (2006.01)
    G02B 13/06     (2006.01)
    G02B 27/00     (2006.01)

(52) U.S. Cl.
    CPC ........... G02B 13/0045 (2013.01); G02B 9/62 (2013.01); G02B 13/06 (2013.01); G02B 27/0025 (2013.01)

(58) Field of Classification Search
    CPC ........ G02B 13/18; G02B 21/02; G02B 13/04; G02B 13/00
    USPC ................ 359/713, 658, 752, 756, 757, 759
    See application file for complete search history.

(56) References Cited

U.S. PATENT DOCUMENTS

2012/0229917 A1* 9/2012 Huang ............... G02B 13/0045
                                                359/713
2015/0116572 A1   4/2015 Liao
2015/0124333 A1   5/2015 Noda et al.
2015/0207998 A1   7/2015 Lin et al.
(Continued)

FOREIGN PATENT DOCUMENTS

CN       103777330 A    5/2014
CN       104570298 A    4/2015
(Continued)

*Primary Examiner* — Dawayne Pinkney
(74) *Attorney, Agent, or Firm* — Locke Lord LLP; Tim Tingkang Xia, Esq.

(57) ABSTRACT

An image capturing lens assembly includes, in order from an object side to an image side: a first lens element; a second lens element; a third lens element; a fourth lens element having positive refractive power; a fifth lens element having both an object-side surface and an image-side surface being aspheric; and a sixth lens element having both an object-side surface and an image-side surface being aspheric, the image-side surface being concave, and at least one inflection point on the image-side surface. There are a total of six lens elements.

39 Claims, 30 Drawing Sheets

(56) References Cited

U.S. PATENT DOCUMENTS

| | | |
|---|---|---|
| 2015/0212296 A1* | 7/2015 | Huang ............... G02B 13/0045 348/335 |
| 2015/0241671 A1 | 8/2015 | Chang |
| 2015/0268446 A1 | 9/2015 | Chen et al. |
| 2016/0154210 A1 | 6/2016 | Baik et al. |
| 2016/0195698 A1 | 7/2016 | Gong |
| 2016/0223796 A1 | 8/2016 | Lee et al. |
| 2016/0223797 A1 | 8/2016 | Zhao |
| 2017/0045718 A1 | 2/2017 | Park |
| 2017/0102526 A1 | 4/2017 | Chen |
| 2017/0108666 A1 | 4/2017 | Lee |
| 2017/0153421 A1 | 6/2017 | Baik |
| 2017/0219803 A1 | 8/2017 | Lee et al. |
| 2017/0235102 A1 | 8/2017 | Lai et al. |
| 2017/0235103 A1 | 8/2017 | Lai et al. |
| 2017/0235109 A1 | 8/2017 | Shin et al. |
| 2017/0269339 A1 | 9/2017 | Jung et al. |
| 2017/0329103 A1 | 11/2017 | Lai et al. |
| 2017/0329104 A1 | 11/2017 | Lai et al. |

FOREIGN PATENT DOCUMENTS

| | | |
|---|---|---|
| CN | 105759406 A | 7/2016 |
| CN | 107085280 A | 8/2017 |
| CN | 107085281 A | 8/2017 |
| WO | 2017164605 A1 | 9/2017 |

* cited by examiner

IMAGE CAPTURING LENS ASSEMBLY, IMAGING APPARATUS AND ELECTRONIC DEVICE

RELATED APPLICATIONS

This application is a continuation application of U.S. application Ser. No. 15/243,056 filed on Aug. 22, 2016, now approved, which claims priority under 35 U.S.C. 119(e) to Taiwan Application Serial Number 105115693, filed on May 20, 2016, which is incorporated by reference herein in its entirety.

BACKGROUND

Technical Field

The present disclosure relates to an image capturing lens assembly and an imaging apparatus, and more particularly, to an image capturing lens assembly and an imaging apparatus applicable to electronic devices.

Description of Related Art

As camera modules being widely utilized, the applications of the camera modules for various intelligent electronics, car devices, recognition devices, entertainment devices, sports devices and intelligent home systems have become a trend of development in the technology, especially the portable devices which have satisfied most of the public's desires. In order to further enhance users' experiences, smart devices with one, two or even more than three lens assemblies are becoming the mainstream in the market and lens assemblies with various features to meet requirements in different applications are continuously in development.

Conventional lens assemblies with a wide view angle are usually equipped with spherical glass lenses having an aperture stop disposed near an image surface. Thus, overly large lens elements are required to retrieve light, and it becomes difficult to reduce the volume of the lens assemblies in order to achieve the goal of miniaturization. The view angles of the miniaturized imaging systems that are currently available are too limited and do not have sufficient imaging ranges. Therefore, the conventional optical lens has failed to meet the trend of the current development in the technology.

SUMMARY

According to one aspect of the present disclosure, an image capturing lens assembly comprising, in order from an object side to an image side: a first lens element; a second lens element; a third lens element; a fourth lens element having positive refractive power; a fifth lens element having both an object-side surface and an image-side surface being aspheric; and a sixth lens element having both an object-side surface and an image-side surface being aspheric, the image-side surface being concave, and at least one inflection point on the image-side surface thereof, wherein the image capturing lens assembly has a total of six lens elements; an axial distance between an object-side surface of the first lens element and an image surface is TL, a maximum image height of the image capturing lens assembly is ImgH, a half of a maximal field of view of the image capturing lens assembly is HFOV, an axial distance between an aperture stop and the image-side surface of the sixth lens element is SD, an axial distance between the object-side surface of the first lens element and the image-side surface of the sixth lens element is TD, an axial distance between the aperture stop and the image surface is SL, a focal length of the image capturing lens assembly is f, and the following conditions are satisfied:

$0.20 < TL/(ImgH*\tan(HFOV)) < 1.35;$ $0.90 < SD/TD < 1.20;$ $1.50 < SL/f < 5.0.$ According to another aspect of the present disclosure, an image capturing lens assembly comprising, in order from an object side to an image side: a first lens element; a second lens element; a third lens element; a fourth lens element; a fifth lens element having both an object-side surface and an image-side surface being aspheric, and the image-side surface being concave; and a sixth lens element having both an object-side surface and an image-side surface being aspheric, the image-side surface being concave, and at least one inflection point on the image-side surface thereof, wherein the image capturing lens assembly has a total of six lens elements; an axial distance between an object-side surface of the first lens element and an image surface is TL, a maximum image height of the image capturing lens assembly is ImgH, a half of a maximal field of view of the image capturing lens assembly is HFOV, an axial distance between an aperture stop and the image-side surface of the sixth lens element is SD, an axial distance between the object-side surface of the first lens element and the image-side surface of the sixth lens element is TD, an axial distance between the aperture stop and the image surface is SL, a focal length of the image capturing lens assembly is f, and the following conditions are satisfied:

$0.30 < TL/(ImgH*\tan(HFOV)) < 1.20;$ $0.85 < SD/TD < 1.30;$ $1.50 < SL/f < 5.0;$ $1.50 < TL/f < 5.0.$ According to another aspect of the present disclosure, an image capturing lens assembly comprising, in order from an object side to an image side: a first lens element; a second lens element; a third lens element; a fourth lens element having positive refractive power; a fifth lens element having both an object-side surface and an image-side surface being aspheric; and a sixth lens element having both an object-side surface and an image-side surface being aspheric, the object-side surface being convex, the image-side surface being concave and at least one inflection point on the image-side surface thereof, wherein the image capturing lens assembly has a total of six lens elements; an axial distance between an object-side surface of the first lens element and an image surface is TL, a maximum image height of the image capturing lens assembly is ImgH, a half of a maximal field of view of the image capturing lens assembly is HFOV, an axial distance between an aperture stop and the image-side surface of the sixth lens element is SD, an axial distance between the object-side surface of the first lens element and the image-side surface of the sixth lens element is TD, a focal length of the image capturing lens assembly is f, a focal length of the fourth lens element is f4, a focal length of the i-th lens element is fi, and the following conditions are satisfied:

0.20<*TL*/(Img*H*\*tan(HFOV))<1.50;

0.85<*SD*/*TD*<1.30;

<|*f*/*fi*|,*i*=1,2,3,5,6.

According to another aspect of the present disclosure, an imaging apparatus includes the aforementioned image capturing lens assembly and an image sensor disposed on an image surface of the image capturing lens assembly.

According to yet another aspect of the present disclosure, an electronic device includes the aforementioned imaging apparatus.

DETAILED DESCRIPTION

Figure 1A:
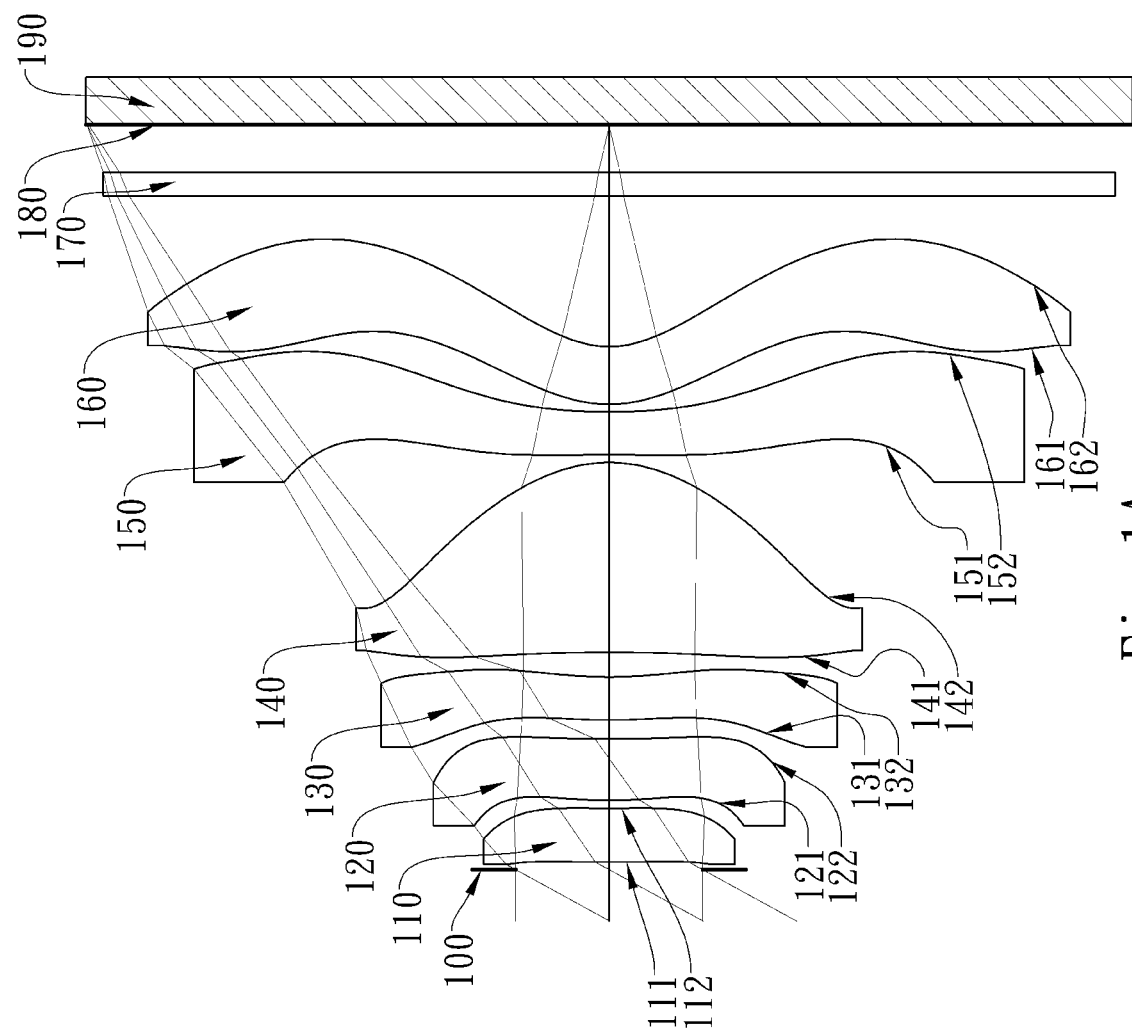
FIG. 1A is a schematic view of an imaging apparatus according to the 1st embodiment of the present disclosure.

The present disclosure provides an image capturing lens assembly including, in order from an object side to an image side, a first lens element, a second lens element, a third lens element, a fourth lens element, a fifth lens element, and a sixth lens element.

The first lens element may have an object-side surface being concave so as to favorably lessen the convergent ability on the object side of the lens assembly and form a retro-focus structure.

The second lens element may have positive refractive power to provide the convergent ability on the object side of the lens assembly so as to favor the miniaturization of the lens assembly. The second lens element may have an object-side surface being convex so as to enhance the convergent ability of the second lens element and the total track length of the lens assembly can be effectively controlled.

The third lens element may have negative refractive power so as to favorably correct the lateral chromatic aberrations of the lens assembly. The third lens element may have an image-side surface being concave so as to balance the aberrations of the lens assembly and increase the imaging quality.

The fourth lens element may have positive refractive power such that the main convergent ability can be provided by the middle section of the lens assembly and the refractive power distribution of the lens assembly can be balanced. The fourth lens element may have an image-side surface being convex so as to enhance the convergent ability of the image side of the lens assembly and the feature of wide angle.

The fifth lens element may have negative refractive power so as to balance the chromic aberration and control the back focal length for various applications. The fifth lens element may have an image-side surface being concave so as to further reinforce the reduction of the back focal length from the sixth lens element to miniaturize the lens assembly. The fifth lens element has both an object-side surface and the image-side surface being aspheric so as to effectively correct the aberrations of the lens assembly.

The sixth lens element has an image-side surface being concave so as to effectively limit the length of the back focus to miniaturize the lens assembly. The sixth lens element has at least one inflection point on the image-side surface thereof so as to effectively correct the aberrations in an off-axial region to maintain a satisfactory image quality in the off-axial region. The sixth lens element may have an object surface being convex to enhance the ability of astigmatism correction. The sixth lens element may have the object-side surface and the image-side surface being aspheric so as to effectively correct aberrations of the lens assembly.

The image capturing lens assembly has a total of six lens elements; a central thickness of the fourth lens element may be the largest among the first lens element, the second lens element, the third lens element, the fourth lens element, the fifth lens element, and the sixth lens element so as to stabilize the lens element in the middle section of the lens assembly and favorably improve the symmetry of the lens assembly for higher imaging quality.

When an axial distance between the object-side surface of the first lens element and an image surface is TL, a maximum image height of the image capturing lens assembly is ImgH, a half of a maximal field of view of the image capturing lens assembly is HFOV, and the following condition is satisfied: 0.20<TL/(ImgH*tan(HFOV))<1.35, the total track length can be favorably controlled while the wide angle can be maintained. Meanwhile, the lens assembly can be equipped with a sufficient light retrieving area to overcome the drawbacks of insufficient brightness in the peripheral region of the conventional wide angle lens assembly and achieves a better imaging quality for a wider range of applications. Preferably, the following condition can be satisfied: 0.30<TL/(ImgH*tan(HFOV))<1.20. Preferably, the following condition can be satisfied: 0.40<TL/(ImgH*tan(HFOV))<1.05.

When an axial distance between an aperture stop and the image-side surface of the sixth lens element is SD, an axial distance between the object-side surface of the first lens element and the image-side surface of the sixth lens element is TD, and the following condition is satisfied: 0.85<SD/TD<1.30, the position of the aperture stop can be controlled so as to favor the miniaturization of the lens assembly. Preferably, the following condition can be satisfied: 0.90<SD/TD<1.20.

When an axial distance between the aperture stop and the image surface is SL, a focal length of the image capturing lens assembly is f, and the following condition is satisfied: 1.50<SL/f<5.0, the configuration between the aperture stop position and other features of the lens assembly can be more balanced for a wider range of applications. Preferably, the following condition can be satisfied: 1.70<SL/f<4.0.

When the axial distance between the object-side surface of the first lens element and the image surface is TL, the focal length of the image capturing lens assembly is f, and the following condition is satisfied: 1.50<TL/f<5.0, the proper total track length can be maintained among the properties of the lens assembly for obtaining a wide angle feature. Preferably, the following condition can be satisfied:

1.70<*TL/f*<4.0.

The aperture stop can be disposed on the object side of the first lens element for the light converging at a position closer to the object side, effectively shortening the back focal length for improved miniaturization.

When a half of the maximal field of view of the image capturing lens assembly is HFOV, and the following condition is satisfied: 0<1/tan(HFOV)<0.70, there is sufficient field of view in the lens assembly for the requirements in various applications.

When a sum of axial distances of air gaps between every two adjacent lens elements is ΣAT, a sum of central thicknesses of the first lens element, the second lens element, the third lens element, the fourth lens element, the fifth lens element, and the sixth lens element is ΣCT, and the following condition is satisfied: 0<ΣAT/ΣCT<0.25, the spatial distance of the lens assembly can be effectively arranged so as to improve the space utilization and achieve the goal of size reduction.

When the maximum image height of the image capturing lens assembly is ImgH, a curvature radius of the image-side surface of the sixth lens element is R12, and the following condition is satisfied: 1.0<ImgH/R12<8.0, the miniaturized structure with sufficient image size can be favorably formed so as to achieve a balance between miniaturization and high brightness.

When the focal length of the image capturing lens assembly is f, an entrance pupil diameter of the image capturing lens assembly is EPD, and the following condition is satisfied: 1.25<f/EPD<2.30, the lens assembly may obtain large aperture to increase the coverage rate of the light on the lens element at each field of view so as to increase the amount of incident light and the brightness of the image.

When the maximal field of view of the image capturing lens assembly is FOV, and the following condition is satisfied: 110 degrees<FOV<150 degrees, the imaging field of the lens assembly can be effectively controlled for a wider range of applications.

When the focal length of the image capturing lens assembly is f, a focal length of the fourth lens element is f4, a focal length of the i-th lens element is fi, and the following condition is satisfied: |f/fi|<|f/f4|, i=1, 2, 3, 5, 6 (|f/f1|<|f/f4|·|f/f2|<|f/f4|·|f/f3|<|f/f4|·|f/f5|<|f/f4|·|f/f6|<|f/f4|), the refractive power of the lens assembly can be mainly distributed in the middle section so as to enhance the light controlling ability of the lens elements in the middle section.

When the axial distance between the object-side surface of the first lens element and the image surface is TL, the maximum image height of the image capturing lens assembly is ImgH, and the following condition is satisfied: TL/ImgH<1.80, miniaturization of the lens assembly can be achieved with sufficient light retrieving range to enhance the image brightness and the imaging quality.

When a curvature radius of the object-side surface of the sixth lens element is R11, the curvature radius of the image-side surface of the sixth lens element is R12, and the following condition is satisfied: −0.10<(R11−R12)/(R11+R12)<0.35, the geometry and the refractive power of the sixth lens element can also be effectively controlled such that the sixth lens element becomes a correction lens to enhance its ability in correcting aberrations.

When a central thickness of the fourth lens element is CT4, the sum of central thicknesses of the first lens element, the second lens element, the third lens element, the fourth lens element, the fifth lens element, and the sixth lens element is ΣCT, and the following condition is satisfied: 0.45<CT4/(ΣCT−CT4)<1.50, the thickness arrangement of the fourth lens element can be balanced and the stability of the lens assembly can be increased.

When an Abbe number of the first lens element is V1, an Abbe number of the third lens element is V3, an Abbe number of the fifth lens element is V5, and the following condition is satisfied: 0.3<(V3+V5)/V1<1.0, the lens assembly can favorably converge the light with different wavelengths to the same imaging point and thus the imaging quality can be enhanced.

When a curvature radius of the object-side surface of the first lens element is R1, a curvature radius of the image-side surface of the first lens element is R2, and the following condition is satisfied: |R2/R1|<1.70, it is favorable to broaden the view angle of the lens assembly for obtaining a larger image capturing range.

When the focal length of the image capturing lens assembly is f, the focal length of the second lens element is f2, and the following condition is satisfied: 0.15<f/f2<1.80, the object side of the lens assembly can provide sufficient convergent ability for miniaturization.

When a maximum refractive index among the first lens element, the second lens element, the third lens element, the fourth lens element, the fifth lens element and the sixth lens element is Nmax, and the following condition is satisfied: 1.60<Nmax<1.72, the lens elements can be favorably arranged and a more flexible geometry of lens elements with optimization and a better balance of aberrations.

Figure 12:
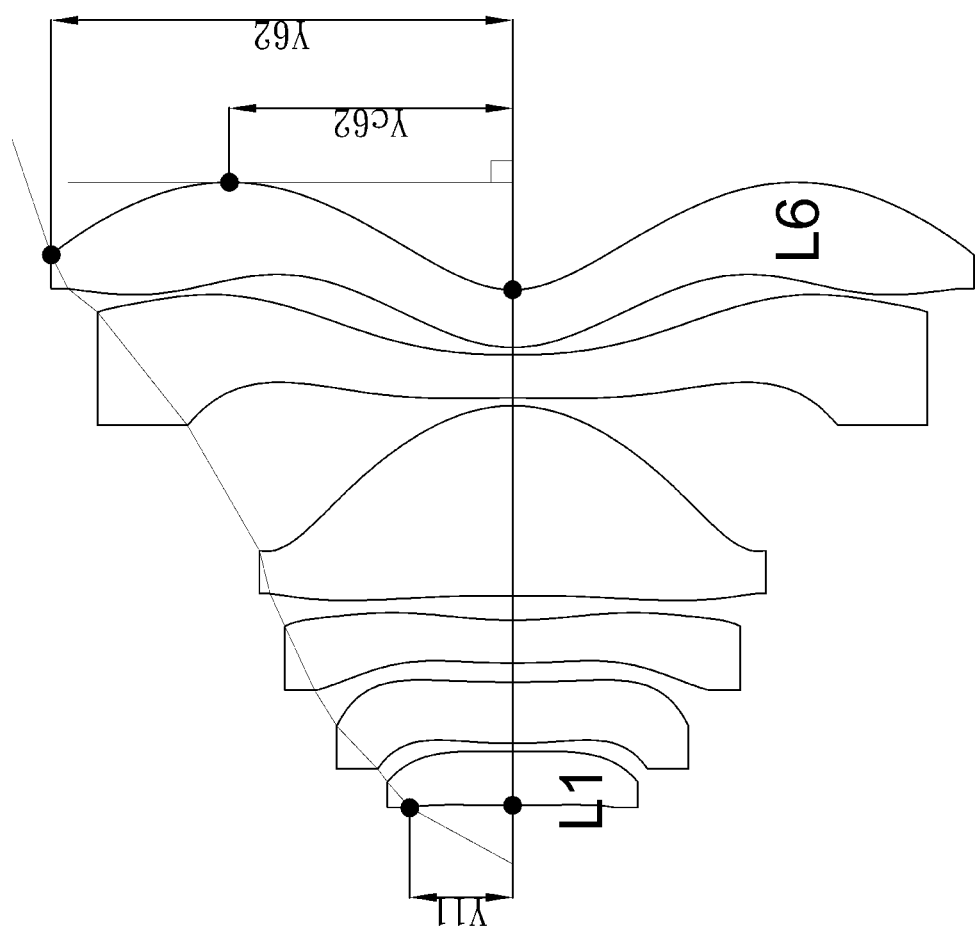
FIG. 12 is a schematic view showing distances represented by the parameters Y11, Yc62 and Y62 of an image capturing lens assembly of the present disclosure.

Please refer to FIG. 12. When a vertical distance between a maximum effective diameter position on the object-side surface of the first lens element (L1) and an optical axis is Y11, a vertical distance between a maximum effective diameter position on the image-side surface of the sixth lens element (L6) and the optical axis is Y62, and the following condition is satisfied: 0<Y11/Y62<0.30, it is favorable to decrease the contact area with the external environment so as to reduce the damage caused by collisions and increase the delicacy and consistency of the products.

Please refer to FIG. 12. When a vertical distance between an off-axial critical point on the image-side surface of the sixth lens element (L6) and an optical axis is Yc62, the focal length of the image capturing lens assembly is f, and the following condition is satisfied: 0.3<Yc62/f<1.2, it is favorable to control the angle of light ray at an off-axial region so as to correct the off-axial aberrations.

Figure 13:
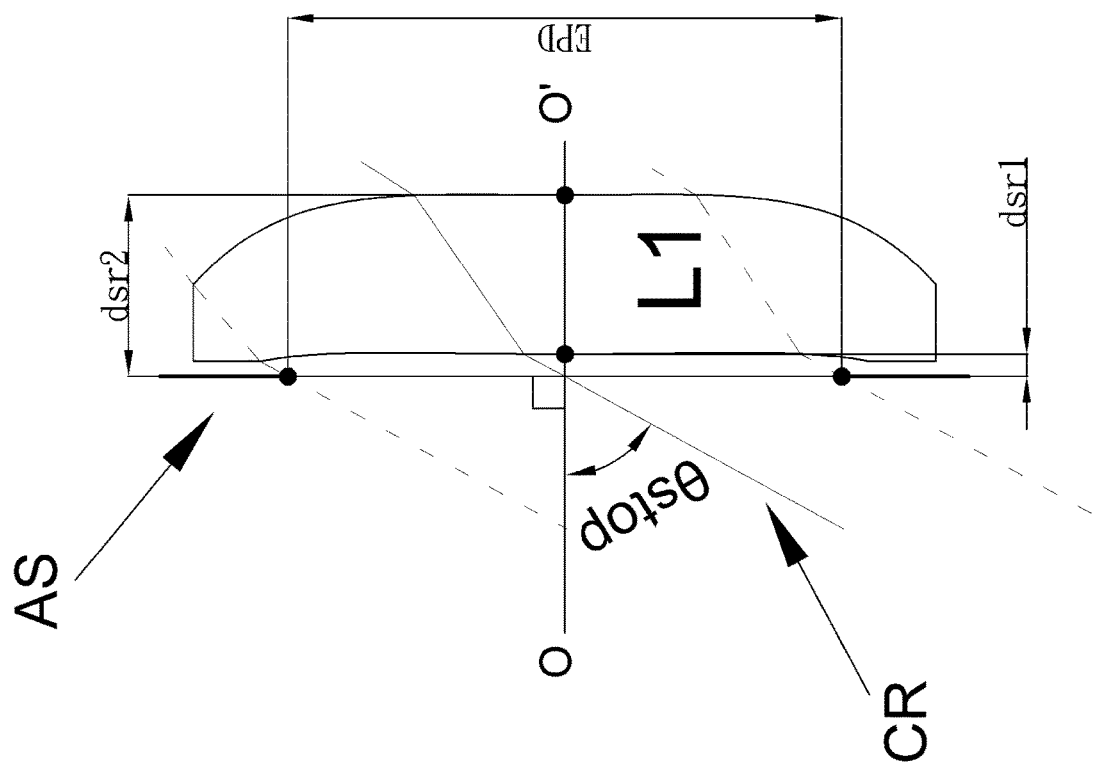
FIG. 13 is a schematic view showing distances or angles represented by the parameters EPD, θstop, dsr1 and dsr2 of an image capturing lens assembly of the present disclosure.

Please refer to FIG. 13. When an axial ($\overline{OO'}$) distance between the aperture stop (AS) and the object-side surface of the first lens element (L1) is dsr1, an axial ($\overline{OO'}$) distance between the aperture stop (AS) and the image-side surface of the first lens element (L1) is dsr2, and the following condition is satisfied: |dsr1/dsr2|<0.50, it is favorable to position the aperture stop (AS) so as to adjust the incident angle on the image surface and further avoid the vignette at the peripheral region of the image. Meanwhile, the total track length can be effectively controlled for the miniaturization of the lens assembly.

Please refer to FIG. 13. When an angle between a chief ray (CR) of the maximum image height and an optical axis ($\overline{OO'}$) at the aperture stop (AS) is θstop, and the following condition is satisfied: 55 degrees<θstop<80 degrees, the incident angle at the center of the aperture stop of the maximum field of view can be controlled to have sufficient imaging height for an increased light retrieving area.

According to the image capturing lens assembly of the present disclosure, the lens elements thereof can be made of glass or plastic material. When the lens elements are made of glass material, the distribution of the refractive power of the image capturing lens assembly may be more flexible to design. When the lens elements are made of plastic material, the manufacturing cost can be effectively reduced. Furthermore, surfaces of each lens element can be arranged to be aspheric (ASP). Since these aspheric surfaces can be easily formed into shapes other than spherical shapes so as to have more controllable variables for eliminating aberrations and to further decrease the required quantity of lens elements, the total track length of the image capturing lens assembly can be effectively reduced.

According to the image capturing lens assembly of the present disclosure, the image capturing lens assembly can include at least one stop, such as an aperture stop, a glare stop or a field stop, so as to favorably reduce the amount of stray light and thereby improving the image quality.

According to the image capturing lens assembly of the present disclosure, an aperture stop can be configured as a front stop or a middle stop. A front stop disposed between an imaged object and the first lens element can provide a longer distance between an exit pupil of the image capturing lens assembly and the image surface so that the generated telecentric effect can improve the image-sensing efficiency of an image sensor, such as a CCD or CMOS sensor. A middle stop disposed between the first lens element and the image surface is favorable for enlarging the field of view of the image capturing lens assembly, thereby providing the image capturing lens assembly with the advantage of a wide-angle lens.

According to the image capturing lens assembly of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the image capturing lens assembly of the present disclosure, the image surface of the image capturing lens assembly, based on the corresponding image sensor, can be a plane or a curved surface with an arbitrary curvature, especially a curved surface being concave facing towards the object side.

The image capturing lens assembly of the present disclosure can be optionally applied to moving focus optical systems and optical image stabilizer (OIS). According to the image capturing lens assembly of the present disclosure, the image capturing lens assembly features a good correction capability and high image quality, and can be applied to 3D (three-dimensional) image capturing applications and electronic devices, such as digital cameras, mobile devices, smartphones, digital tablets, smart TVs, network surveillance devices, motion sensing game console, driving recording systems, rear view camera systems, drone cameras and wearable devices.

According to the present disclosure, an imaging apparatus includes the aforementioned image capturing lens assembly and an image sensor, wherein the image sensor is disposed on or near an image surface of the image capturing lens assembly. Therefore, the design of the image capturing lens assembly enables the imaging apparatus to achieve the best image quality. Preferably, the image capturing lens assembly can further include a barrel member, a holder member or a combination thereof.

Figure 14A:
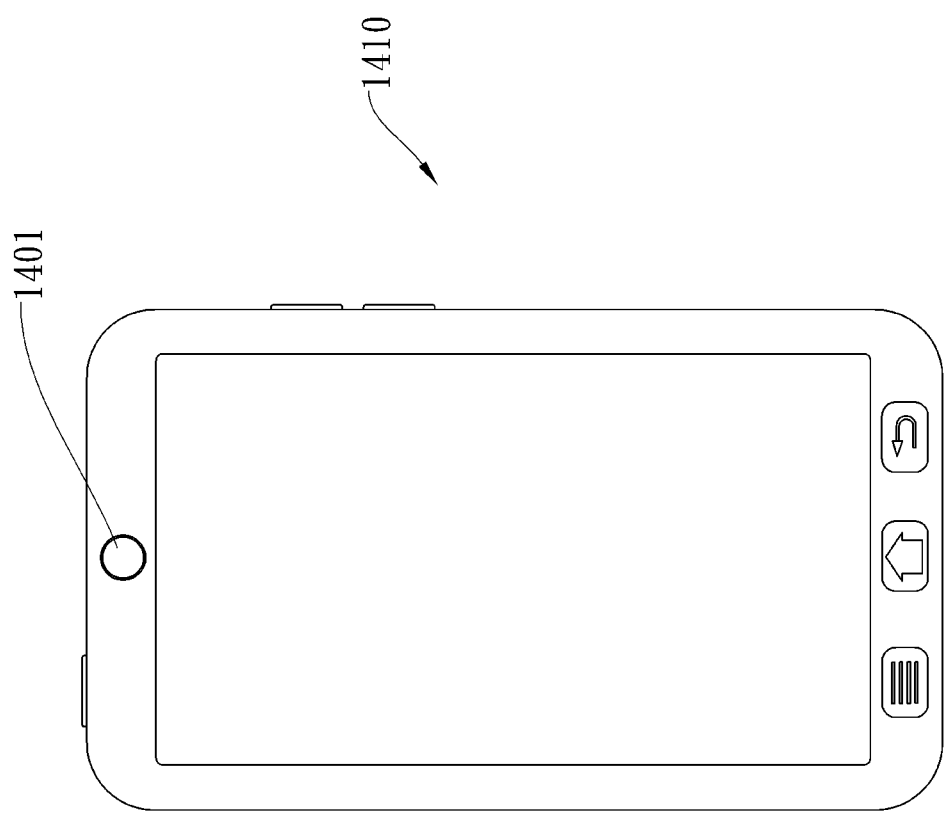
FIG. 14A shows a smartphone with an imaging apparatus of the present disclosure installed therein.
Figure 14B:
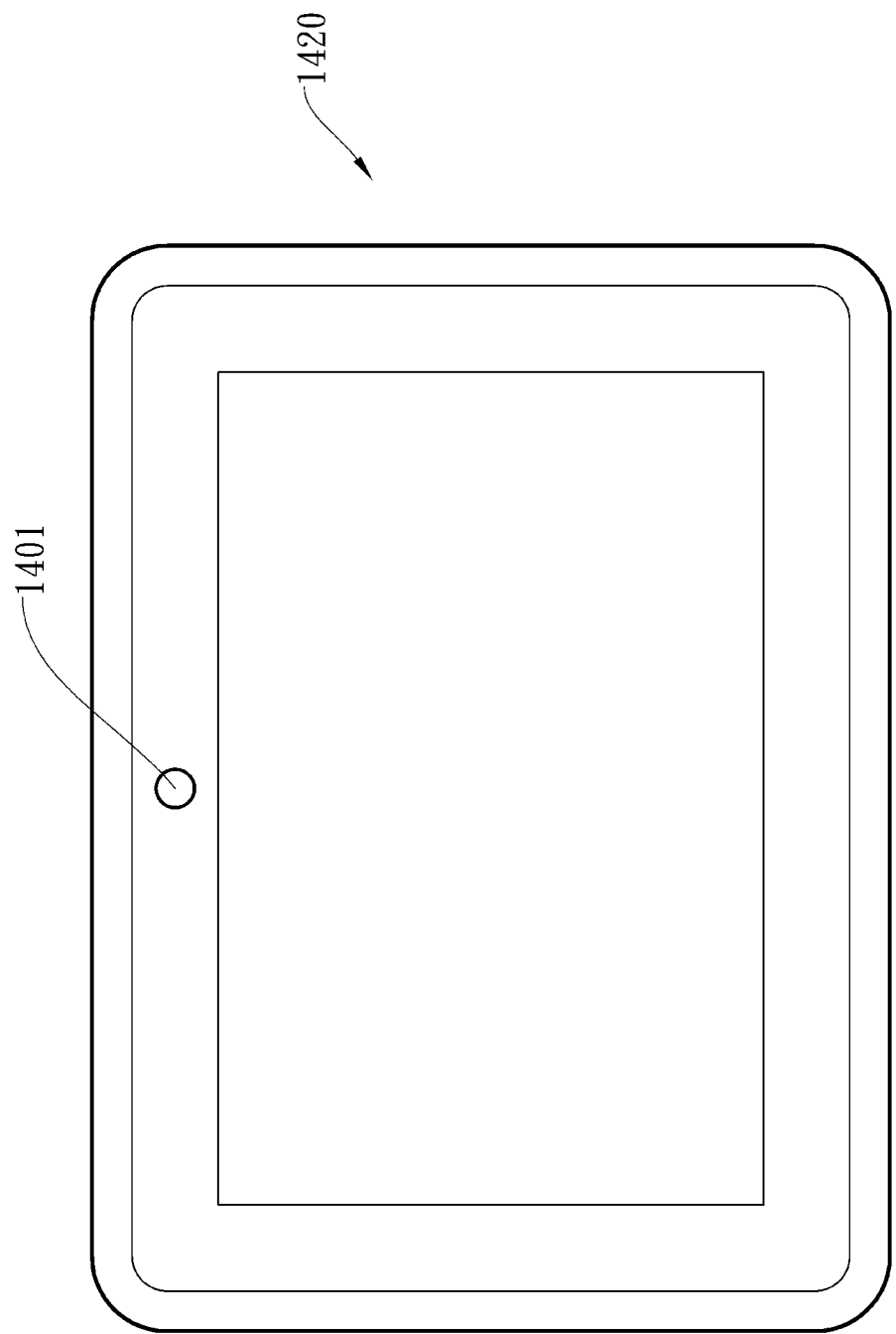
FIG. 14B shows a tablet with an imaging apparatus of the present disclosure installed therein.
Figure 14C:
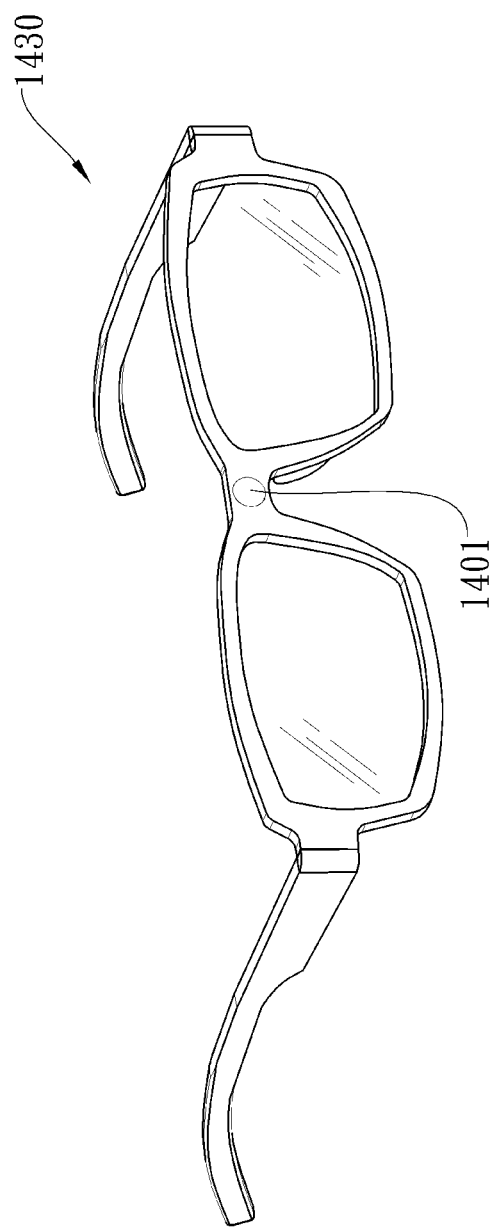
FIG. 14C shows a wearable device with an imaging apparatus of the present disclosure installed therein.

Please refer to FIG. 14A, FIG. 14B and FIG. 14C, an imaging apparatus 1401 may be installed in an electronic device including, but not limited to, a smartphone 1410, a tablet 1420, or a wearable device 1430. The four exemplary figures of different electronic devices are only exemplary for showing the imaging apparatus of the present disclosure installed in an electronic device, and the present disclosure is not limited thereto. Preferably, the electronic device can further include a control unit, a display unit, a storage unit, a random access memory unit (RAM) or a combination thereof.

Figure 15A:
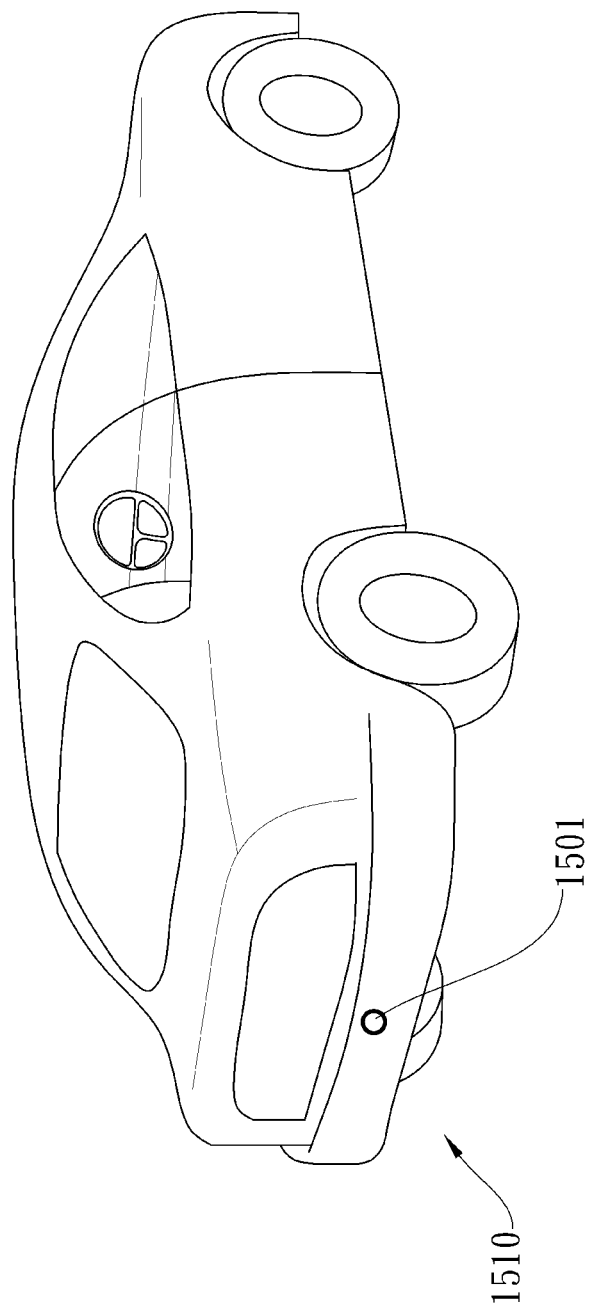
FIG. 15A shows a rear view camera with an imaging apparatus of the present disclosure installed therein.
Figure 15B:
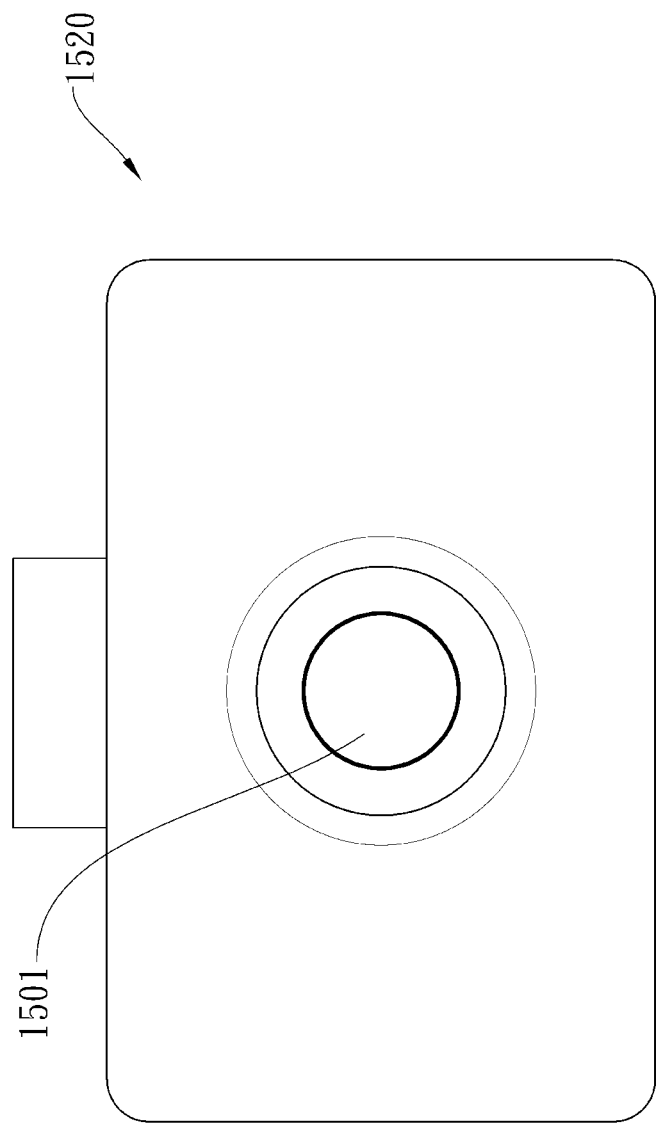
FIG. 15B shows a driving recording system with an imaging apparatus of the present disclosure installed therein.
Figure 15C:
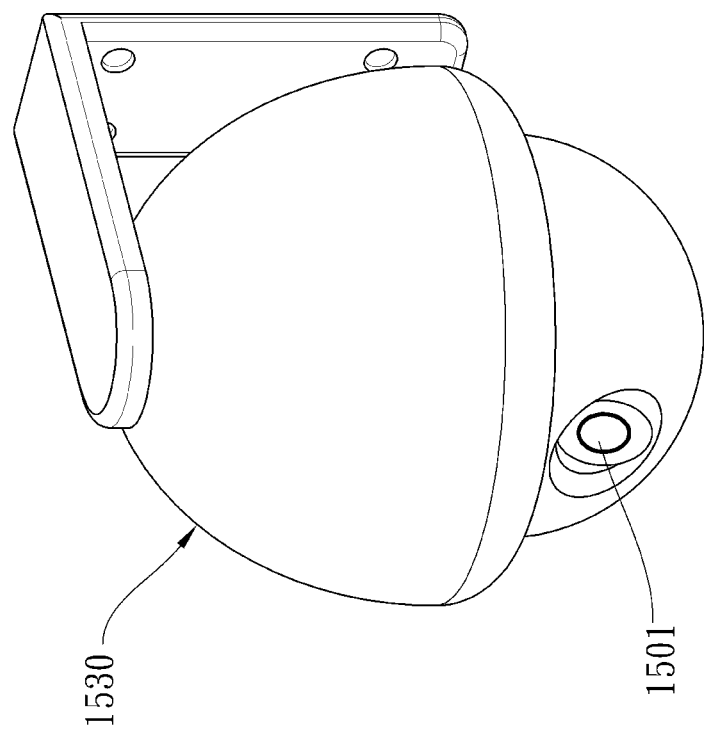
FIG. 15C shows a surveillance camera with an imaging apparatus of the present disclosure installed therein.

Please refer to FIG. 15A, FIG. 15B and FIG. 15C, an imaging apparatus 1501 may be installed in an electronic device including, but not limited to, a rear view camera 1510, a driving recording system 1520, or a surveillance camera 1530. The four exemplary figures of different electronic devices are only exemplary for showing the imaging apparatus of the present disclosure installed in an electronic device, and the present disclosure is not limited thereto. Preferably, the electronic device can further include a control unit, a display unit, a storage unit, a random access memory unit (RAM) or a combination thereof.

According to the above description of the present disclosure, the following 1st-11th specific embodiments are provided for further explanation.

1st Embodiment

Figure 1B:
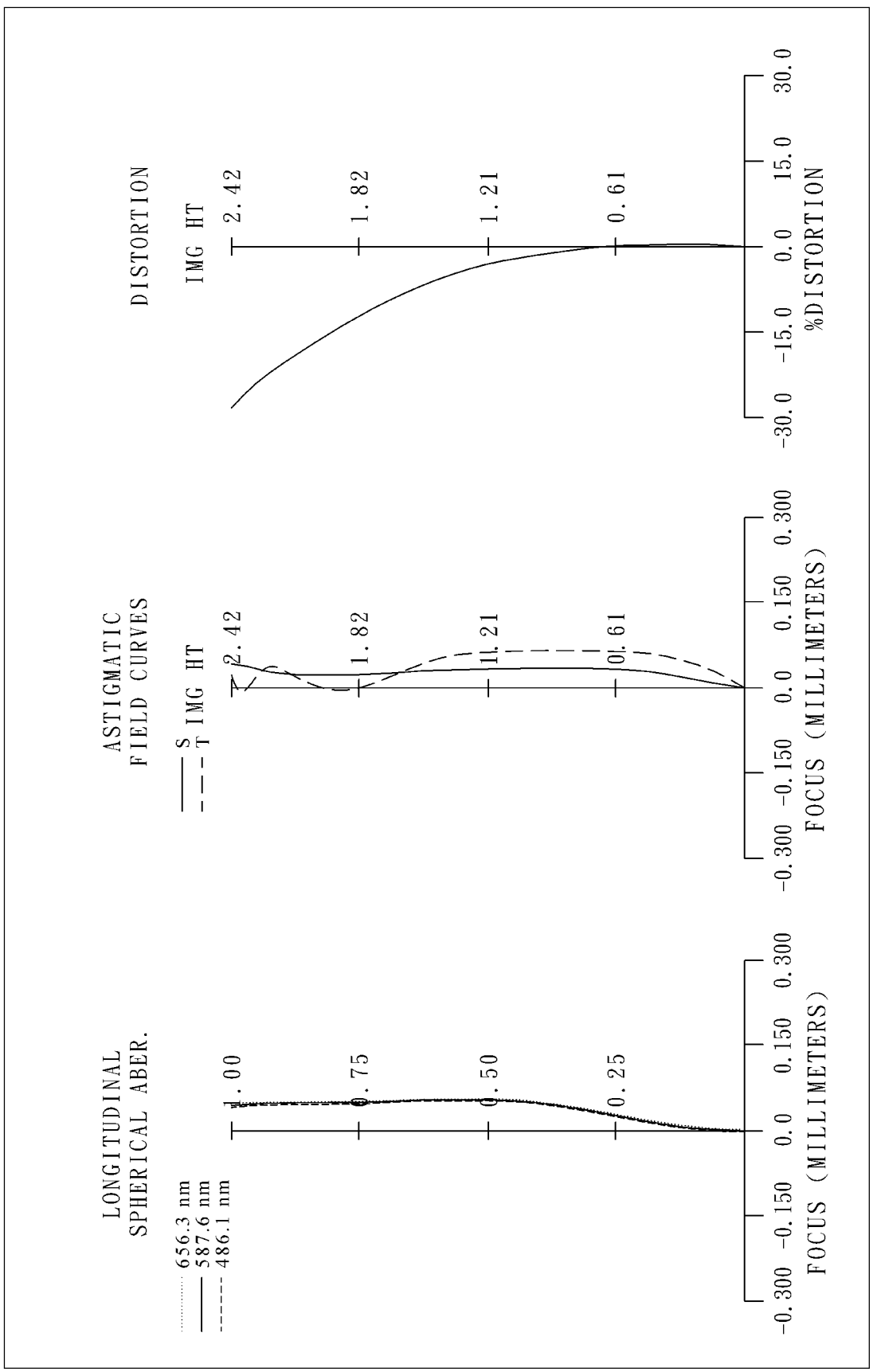
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes an image capturing lens assembly (not otherwise herein labeled) of the present disclosure and an image sensor 190. The image capturing lens assembly includes, in order from an object side to an image side, an aperture stop 100, a first lens element 110, a second lens element 120, a third lens element 130, a fourth lens element 140, a fifth lens element 150 and a sixth lens element 160.

The first lens element 110 with negative refractive power has an object-side surface 111 being convex in a paraxial region thereof, an image-side surface 112 being concave in a paraxial region thereof, and both the object-side surface 111 and the image-side surface 112 being aspheric. The first lens element 110 is made of plastic material.

The second lens element 120 with positive refractive power has an object-side surface 121 being convex in a paraxial region thereof, an image-side surface 122 being concave in a paraxial region thereof, and both the object-side surface 121 and the image-side surface 122 being aspheric. The second lens element 120 is made of plastic material.

The third lens element 130 with negative refractive power has an object-side surface 131 being convex in a paraxial region thereof, an image-side surface 132 being concave in a paraxial region thereof, and both the object-side surface 131 and the image-side surface 132 being aspheric. The third lens element 130 is made of plastic material.

The fourth lens element 140 with positive refractive power has an object-side surface 141 being concave in a paraxial region thereof, an image-side surface 142 being convex in a paraxial region thereof, and both the object-side surface 141 and the image-side surface 142 being aspheric. The fourth lens element 140 is made of plastic material.

The fifth lens element 150 with negative refractive power has an object-side surface 151 being concave in a paraxial region thereof, an image-side surface 152 being concave in a paraxial region thereof, and both the object-side surface 151 and the image-side surface 152 being aspheric. The fifth lens element 150 is made of plastic material.

The sixth lens element 160 with negative refractive power has an object-side surface 161 being convex in a paraxial region thereof, an image-side surface 162 being concave in a paraxial region thereof, both the object-side surface 161 and the image-side surface 162 being aspheric, and at least one inflection point on the image-side surface 162. The sixth lens element 160 is made of plastic material.

The image capturing lens assembly further includes an IR cut filter 170 located between the sixth lens element 160 and an image surface 180. The IR cut filter 170 is made of glass material and will not affect the focal length of the image capturing lens assembly. The image sensor 190 is disposed on or near the image surface 180 of the image capturing lens assembly.

The detailed optical data of the 1st embodiment are shown in TABLE 1, and the aspheric surface data are shown in TABLE 2, wherein the units of the curvature radius, the thickness and the focal length are expressed in mm, and HFOV is a half of the maximal field of view.

TABLE 1

(1st Embodiment)
f = 1.87 mm, Fno = 2.15, HFOV = 61.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.035 | | | | |
| 2 | Lens 1 | 10.091 | ASP | 0.250 | Plastic | 1.544 | 55.9 | −143.85 |
| 3 | | 8.860 | ASP | 0.037 | | | | |
| 4 | Lens 2 | 2.069 | ASP | 0.285 | Plastic | 1.544 | 55.9 | 5.40 |
| 5 | | 6.666 | ASP | 0.088 | | | | |
| 6 | Lens 3 | 2.677 | ASP | 0.200 | Plastic | 1.660 | 20.4 | −10.28 |
| 7 | | 1.862 | ASP | 0.114 | | | | |
| 8 | Lens 4 | −14.875 | ASP | 0.884 | Plastic | 1.544 | 55.9 | 1.26 |
| 9 | | −0.670 | ASP | 0.035 | | | | |
| 10 | Lens 5 | −11.132 | ASP | 0.200 | Plastic | 1.660 | 20.4 | −3.48 |
| 11 | | 2.913 | ASP | 0.035 | | | | |
| 12 | Lens 6 | 0.605 | ASP | 0.268 | Plastic | 1.544 | 55.9 | −6.77 |
| 13 | | 0.439 | ASP | 0.700 | | | | |
| 14 | IR Cut Filter | Plano | | 0.110 | Glass | 1.517 | 64.2 | — |
| 15 | | Plano | | 0.220 | | | | |
| 16 | Image Surface | Plano | | — | | | | |

\* Reference wavelength is d-line 587.6 nm.

TABLE 2

| Aspheric Coefficients | | | | |
|---|---|---|---|---|
| Surface # | 2 | 3 | 4 | 5 |
| k = | −3.9851E−09 | −8.3535E+00 | −3.2725E+01 | −8.6693E+00 |
| A4 = | −3.5293E−01 | −1.1392E+00 | −3.2657E−01 | 6.5452E−02 |
| A6 = | 8.9497E−01 | −1.0757E+00 | −2.3266E+00 | −1.0934E+00 |
| A8 = | −6.9251E+00 | 2.6365E+00 | −6.1306E−01 | 4.9018E−01 |
| A10 = | 6.9381E+00 | −4.9598E+00 | 8.6227E+00 | 1.4945E+00 |
| A12 = | | | −1.5563E+01 | −8.3766E−01 |
| Surface # | 6 | 7 | 8 | 9 |
| k = | −9.0000E+01 | −1.6308E+01 | −1.3538E+01 | −2.1018E+00 |
| A4 = | −3.4800E−01 | −4.1891E−01 | −1.6228E−01 | −2.2436E−01 |
| A6 = | −9.9653E−01 | 4.6814E−01 | 4.6367E−01 | 2.4649E−01 |
| A8 = | 2.7683E+00 | −8.7088E−01 | −4.5985E−01 | −3.7624E−01 |
| A10 = | −2.6747E+00 | 1.7396E+00 | 2.0760E−01 | 2.5902E−01 |
| A12 = | 1.3663E+00 | −1.6747E+00 | −1.6367E−03 | 1.0064E−01 |
| A14 = | −3.4296E−01 | 6.8674E−01 | −2.2515E−02 | −1.2457E−01 |
| A16 = | | −9.8241E−02 | | 2.5151E−02 |
| Surface # | 10 | 11 | 12 | 13 |
| k = | −1.0000E+00 | −2.5576E+01 | −2.9554E+00 | −2.4555E+00 |
| A4 = | 3.5458E−01 | 3.5899E−01 | −8.6720E−02 | −1.7363E−01 |
| A6 = | −3.6225E−01 | −4.6320E−01 | −1.1692E−01 | 4.7140E−02 |
| A8 = | 1.4081E−01 | 2.9153E−01 | 9.0123E−02 | −4.7906E−03 |
| A10 = | −6.5997E−03 | −1.1287E−01 | −2.5247E−02 | −1.6621E−02 |
| A12 = | −1.7454E−02 | 2.6456E−02 | 3.4282E−03 | 7.0629E−04 |
| A14 = | 6.0211E−03 | −3.3546E−03 | −2.2041E−04 | −1.0079E−04 |
| A16 = | −6.1605E−04 | 1.7251E−04 | 5.0769E−06 | 5.0559E−06 |

The equation of the aspheric surface profiles is expressed as follows:

$$X(Y) = (Y^2/R)/(1 + \text{sqrt}(1 - (1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, a focal length of the image capturing lens assembly is f, an f-number of the image capturing lens assembly is Fno, a half of a maximal field of view of the image capturing lens assembly is HFOV, and these parameters have the following values: f=1.87 mm; Fno=2.15; and HFOV=61.3 degrees.

In the 1st embodiment, the maximal field of view of the image capturing lens assembly is FOV, and it satisfies the condition: FOV=122.6 degrees.

In the 1st embodiment, a maximum refractive index among the first lens element 110, the second lens element 120, the third lens element 130, the fourth lens element 140, the fifth lens element 150 and the sixth lens element 160 is Nmax, and it satisfies the condition: Nmax=1.660.

In the 1st embodiment, an Abbe number of the first lens element 110 is V1, an Abbe number of the third lens element 130 is V3, an Abbe number of the fifth lens element 150 is V5, and they satisfy the condition: (V3+V5)/V1=0.73.

In the 1st embodiment, a central thickness of the fourth lens element 140 is CT4, a sum of central thicknesses of the first lens element 110, the second lens element 120, the third lens element 130, the fourth lens element 140, the fifth lens element 150, and the sixth lens element 160 is ΣCT, and they satisfy the condition:

CT4/(ΣCT−CT4)=0.73.

In the 1st embodiment, a sum of axial distances of air gaps between every two adjacent lens elements is ΣAT, the sum of central thicknesses of the first lens element 110, the second lens element 120, the third lens element 130, the fourth lens element 140, the fifth lens element 150, and the sixth lens element 160 is ΣCT, and they satisfy the condition: ΣAT/ΣCT=0.15.

In the 1st embodiment, a curvature radius of the object-side surface 111 of the first lens element 110 is R1, a curvature radius of the image-side surface 112 of the first lens element 110 is R2, and they satisfy the condition: |R2/R1|=0.88.

In the 1st embodiment, a curvature radius of the object-side surface 161 of the sixth lens element 160 is R11, a curvature radius of the image-side surface 162 of the sixth lens element 160 is R12, and they satisfy the condition: (R11−R12)/(R11+R12)=0.16.

In the 1st embodiment, the focal length of the image capturing lens assembly is f, a focal length of the second lens element 120 is f2, and they satisfy the condition:

f/f2=0.35.

In the 1st embodiment, the focal length of the image capturing lens assembly is f, a focal length of the first lens element 110 is f1, and they satisfy the condition:

|f/f1|=0.01.

In the 1st embodiment, the focal length of the image capturing lens assembly is f, the focal length of the second lens element 120 is f2, and they satisfy the condition: |f/f2|=0.35.

In the 1st embodiment, the focal length of the image capturing lens assembly is f, a focal length of the third lens element 130 is f3, and they satisfy the condition:

|f/f3|=0.18.

In the 1st embodiment, the focal length of the image capturing lens assembly is f, a focal length of the fourth lens element 140 is f4, and they satisfy the condition:

|f/f4|=1.48.

In the 1st embodiment, the focal length of the image capturing lens assembly is f, a focal length of the fifth lens element 150 is f5, and they satisfy the condition:

|f/f5|=0.54.

In the 1st embodiment, the focal length of the image capturing lens assembly is f, a focal length of the sixth lens element 160 is f6, and they satisfy the condition:

|f/f6|=0.28.

In the 1st embodiment, an axial distance between the aperture stop 100 and the image surface 180 is SL, the focal length of the image capturing lens assembly is f, and they satisfy the condition: SL/f=1.86.

In the 1st embodiment, an axial distance between the object-side surface 111 of the first lens element 110 and the image surface 180 is TL, the focal length of the image capturing lens assembly is f, and they satisfy the condition: TL/f=1.84.

In the 1st embodiment, an axial distance between the aperture stop 100 and the image-side surface 162 of the sixth lens element 160 is SD, an axial distance between the object-side surface 111 of the first lens element 110 and the image-side surface 162 of the sixth lens element 160 is TD, and they satisfy the condition: SD/TD=1.01.

In the 1st embodiment, a half of the maximal field of view of the image capturing lens assembly is HFOV, and it satisfies the condition: 1/tan(HFOV)=0.55.

In the 1st embodiment, the focal length of the image capturing lens assembly is f, an entrance pupil diameter of the image capturing lens assembly is EPD, and they satisfy the condition: f/EPD=2.15.

In the 1st embodiment, a maximum image height of the image capturing lens assembly is ImgH, the curvature radius of the image-side surface 162 of the sixth lens element 160 is R12, and they satisfy the condition: ImgH/R12=5.53.

In the 1st embodiment, the axial distance between the object-side surface 111 of the first lens element 110 and the image surface 180 is TL, the maximum image height of the image capturing lens assembly is ImgH, and they satisfy the condition:

TL/ImgH=1.41.

In the 1st embodiment, the axial distance between the object-side surface 111 of the first lens element 110 and the image surface 180 is TL, the maximum image height of the image capturing lens assembly is ImgH, a half of the maximal field of view of the image capturing lens assembly is HFOV, and they satisfy the condition:

TL/(ImgH*tan(HFOV))=0.77.

In the 1st embodiment, an angle between a chief ray of the maximum image height and an optical axis at the aperture stop 100 is θstop, and it satisfies the condition: θstop=61.3 degrees.

In the 1st embodiment, an axial distance between the aperture stop 100 and the object-side surface 111 of the first lens element 110 is dsr1, an axial distance between the aperture stop 100 and the image-side surface 112 of the first lens element 110 is dsr2, and they satisfy the condition: |dsr1/dsr2|=0.12.

In the 1st embodiment, a vertical distance between an off-axial critical point on the image-side surface 162 of the sixth lens element 160 and the optical axis is Yc62, the focal length of the image capturing lens assembly is f, and they satisfy the condition: Yc62/f=0.70.

In the 1st embodiment, a vertical distance between a maximum effective diameter position on the object-side surface 111 of the first lens element 110 and the optical axis is Y11, a vertical distance between a maximum effective diameter position on the image-side surface 162 of the sixth lens element 160 and the optical axis is Y62, and they satisfy the condition: Y11/Y62=0.22.

2nd Embodiment

Figure 2A:
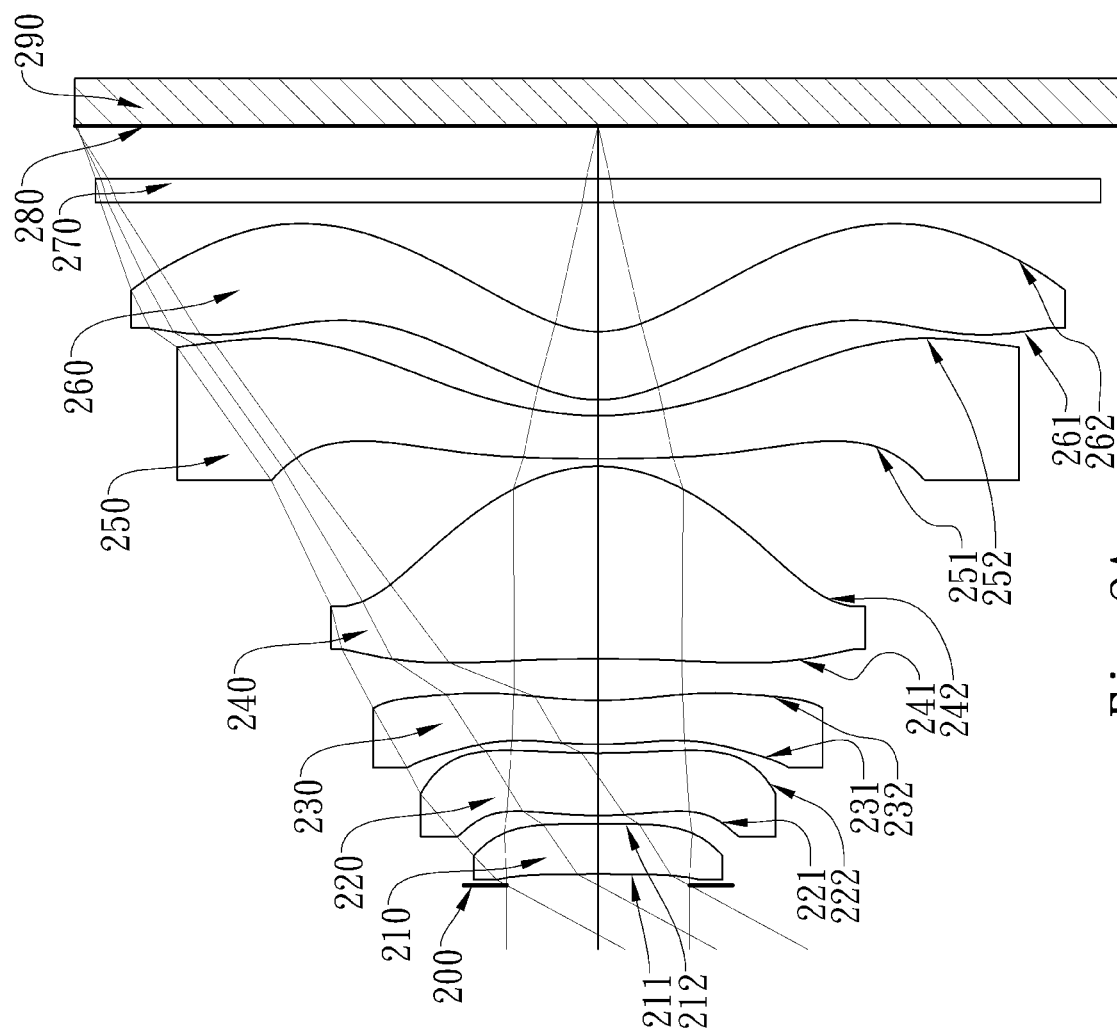
FIG. 2A is a schematic view of an imaging apparatus according to the 2nd embodiment of the present disclosure.
Figure 2B:
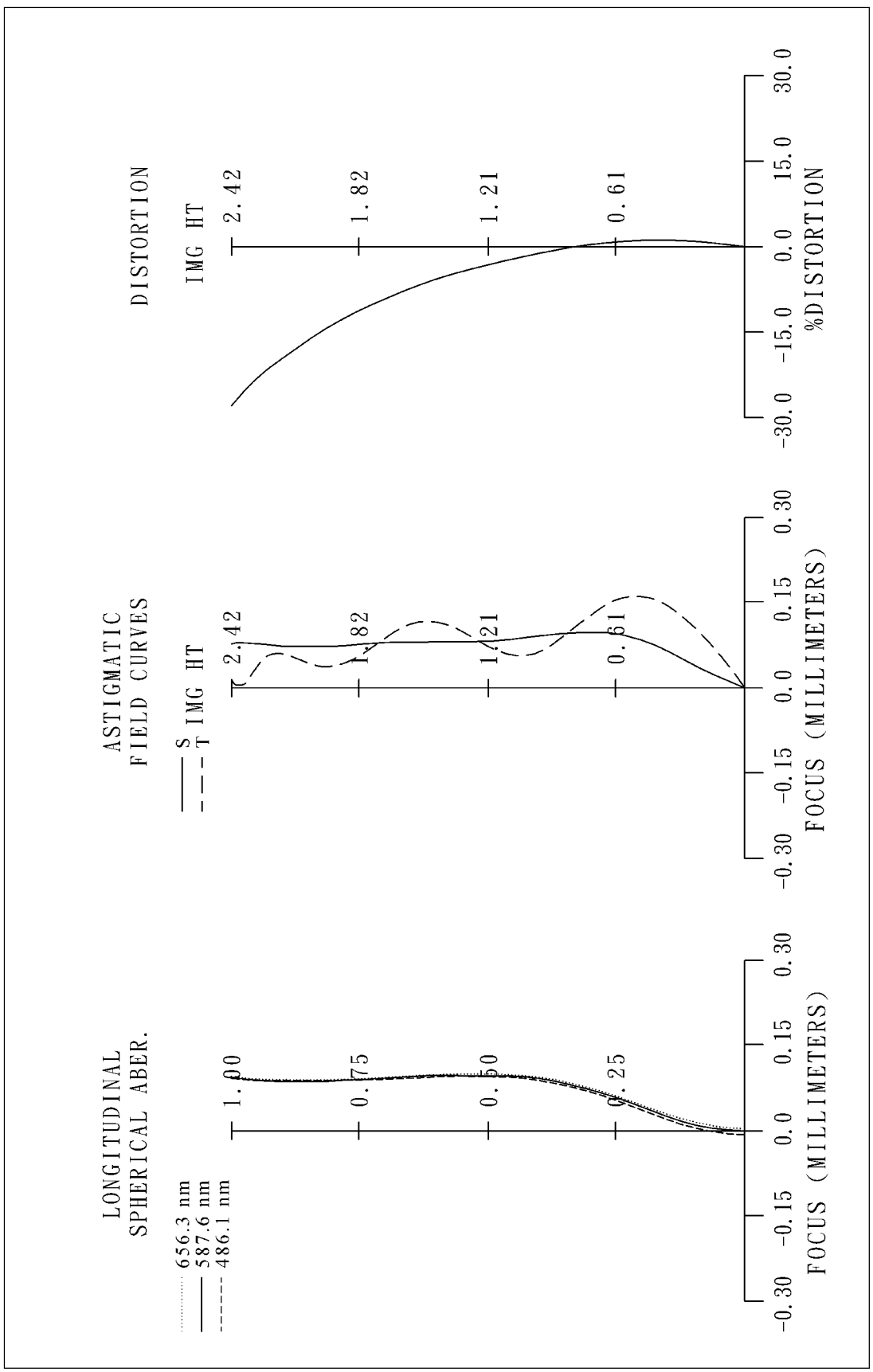
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes an image capturing lens assembly (not otherwise herein labeled) of the present disclosure and an image sensor 290. The image capturing lens assembly includes, in order from an object side to an image side, an aperture stop 200, a first lens element 210, a second lens element 220, a third lens element 230, a fourth lens element 240, a fifth lens element 250 and a sixth lens element 260.

The first lens element 210 with negative refractive power has an object-side surface 211 being concave in a paraxial region thereof, an image-side surface 212 being concave in a paraxial region thereof, and both the object-side surface 211 and the image-side surface 212 being aspheric. The first lens element 210 is made of plastic material.

The second lens element 220 with positive refractive power has an object-side surface 221 being convex in a paraxial region thereof, an image-side surface 222 being concave in a paraxial region thereof, and both the object-side surface 221 and the image-side surface 222 being aspheric. The second lens element 220 is made of plastic material.

The third lens element 230 with positive refractive power has an object-side surface 231 being convex in a paraxial region thereof, an image-side surface 232 being concave in a paraxial region thereof, and both the object-side surface 231 and the image-side surface 232 being aspheric. The third lens element 230 is made of plastic material.

The fourth lens element 240 with positive refractive power has an object-side surface 241 being concave in a paraxial region thereof, an image-side surface 242 being convex in a paraxial region thereof, and both the object-side surface 241 and the image-side surface 242 being aspheric. The fourth lens element 240 is made of plastic material.

The fifth lens element 250 with negative refractive power has an object-side surface 251 being convex in a paraxial region thereof, an image-side surface 252 being concave in a paraxial region thereof, and both the object-side surface 251 and the image-side surface 252 being aspheric. The fifth lens element 250 is made of plastic material.

The sixth lens element 260 with positive refractive power has an object-side surface 261 being convex in a paraxial region thereof, an image-side surface 262 being concave in a paraxial region thereof, both the object-side surface 261 and the image-side surface 262 being aspheric, and at least one inflection point on the image-side surface 262. The sixth lens element 260 is made of plastic material.

The image capturing lens assembly further includes an IR cut filter 270 located between the sixth lens element 260 and an image surface 280. The IR cut filter 270 is made of glass material and will not affect the focal length of the image capturing lens assembly. The image sensor 290 is disposed on or near the image surface 280 of the image capturing lens assembly.

The detailed optical data of the 2nd embodiment are shown in TABLE 3, and the aspheric surface data are shown in TABLE 4, wherein the units of the curvature radius, the thickness and the focal length are expressed in mm, and HFOV is a half of the maximal field of view.

TABLE 3

(2nd Embodiment)
f = 1.82 mm, Fno = 2.15, HFOV = 61.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.051 | | | | |
| 2 | Lens 1 | −73.624 | ASP | 0.233 | Plastic | 1.544 | 55.9 | −21.99 |
| 3 | | 14.289 | ASP | 0.040 | | | | |
| 4 | Lens 2 | 1.969 | ASP | 0.289 | Plastic | 1.544 | 55.9 | 7.33 |
| 5 | | 3.691 | ASP | 0.041 | | | | |
| 6 | Lens 3 | 1.703 | ASP | 0.205 | Plastic | 1.660 | 20.4 | 17.41 |
| 7 | | 1.904 | ASP | 0.193 | | | | |
| 8 | Lens 4 | −8.503 | ASP | 0.895 | Plastic | 1.544 | 55.9 | 1.39 |
| 9 | | −0.720 | ASP | 0.035 | | | | |
| 10 | Lens 5 | 11.484 | ASP | 0.200 | Plastic | 1.660 | 20.4 | −2.24 |
| 11 | | 1.299 | ASP | 0.073 | | | | |
| 12 | Lens 6 | 0.545 | ASP | 0.317 | Plastic | 1.544 | 55.9 | 12.27 |
| 13 | | 0.472 | ASP | 0.600 | | | | |
| 14 | IR Cut Filter | Plano | | 0.110 | Glass | 1.517 | 64.2 | — |
| 15 | | Plano | | 0.246 | | | | |
| 16 | Image Surface | Plano | | — | | | | |

*Reference wavelength is d-line 587.6 nm.

TABLE 4

Aspheric Coefficients

| Surface # | 2 | 3 | 4 | 5 |
|---|---|---|---|---|
| k = | −3.8204E−09 | −8.3535E+00 | −3.2725E+01 | −8.6693E+00 |
| A4 = | −3.5976E−01 | −1.2902E+00 | −1.2274E−01 | −3.4370E−01 |
| A6 = | 4.9508E−02 | 2.6092E−01 | −3.1170E+00 | 3.8982E−01 |
| A8 = | −1.7741E+00 | −3.3705E+00 | 8.9051E+00 | −2.2767E+00 |
| A10 = | −6.8961E+00 | 4.1787E+00 | −3.2953E+01 | 2.9747E+00 |
| A12 = | | | 4.4392E+01 | −1.8582E+00 |

| Surface # | 6 | 7 | 8 | 9 |
|---|---|---|---|---|
| k = | −9.0000E+01 | −1.6308E+01 | −1.3538E+01 | −2.1731E+00 |
| A4 = | 1.9379E−01 | −2.5135E−01 | −5.3833E−02 | −3.5055E−01 |
| A6 = | −6.3712E+00 | −7.3921E−01 | 3.6343E−01 | 7.0894E−01 |
| A8 = | 2.2105E+01 | 2.3430E+00 | −4.8555E−01 | −1.2485E+00 |
| A10 = | −3.4783E+01 | −2.3465E+00 | 3.4115E−01 | 1.4294E+00 |
| A12 = | 2.6996E+01 | 9.7004E−01 | −1.1287E−01 | −8.2115E−01 |
| A14 = | −8.5154E+00 | −1.5722E−01 | 1.0454E−02 | 2.2532E−01 |
| A16 = | | 6.2275E−03 | | −2.3893E−02 |

| Surface # | 10 | 11 | 12 | 13 |
|---|---|---|---|---|
| k = | −1.0000E+00 | −2.5576E+01 | −4.4458E+00 | −2.9594E+00 |
| A4 = | 8.6096E−02 | 3.3247E−01 | 2.8642E−02 | −8.6949E−02 |
| A6 = | 3.7309E−02 | −4.0733E−01 | −1.3831E−01 | −4.7564E−04 |
| A8 = | −2.1282E−01 | 2.4803E−01 | 6.6043E−02 | 8.4105E−03 |
| A10 = | 1.9002E−01 | −9.2143E−02 | −1.1730E−02 | −4.0905E−03 |
| A12 = | −8.2483E−02 | 2.0437E−02 | 5.1829E−04 | 1.0760E−03 |
| A14 = | 1.7398E−02 | −2.4296E−03 | 7.2059E−05 | −1.4038E−04 |
| A16 = | −1.4024E−03 | 1.1688E−04 | −6.3265E−06 | 6.8346E−06 |

In the 2nd embodiment, the equation of the aspheric surface profiles of the aforementioned lens elements is the same as the equation of the 1st embodiment. Also, the definitions of these parameters shown in TABLE 5 below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in TABLE 5.

TABLE 5

2nd Embodiment

| | | | |
|---|---|---|---|
| f [mm] | 1.82 | \|f/f5\| | 0.82 |
| Fno. | 2.15 | \|f/f6\| | 0.15 |
| HFOV [deg.] | 61.5 | SL/f | 1.93 |
| FOV [deg.] | 123.1 | TL/f | 1.91 |
| Nmax | 1.660 | SD/TD | 1.02 |
| (V3 + V5)/V1 | 0.73 | 1/tan(HFOV) | 0.54 |
| CT4/(ΣCT − CT4) | 0.72 | f/EPD | 2.15 |
| ΣAT/ΣCT | 0.18 | ImgH/R12 | 5.13 |
| \|R2/R1\| | 0.19 | TL/ImgH | 1.43 |
| (R11 − R12)/(R11 + R12) | 0.07 | TL/(ImgH*tan(HFOV)) | 0.78 |
| f/f2 | 0.25 | θstop [deg.] | 61.5 |
| \|f/f1\| | 0.08 | \|dsr1/dsr2\| | 0.18 |
| \|f/f2\| | 0.25 | Yc62/f | 0.75 |
| \|f/f3\| | 0.10 | Y11/Y62 | 0.22 |
| \|f/f4\| | 1.31 | | |

3rd Embodiment

Figure 3A:
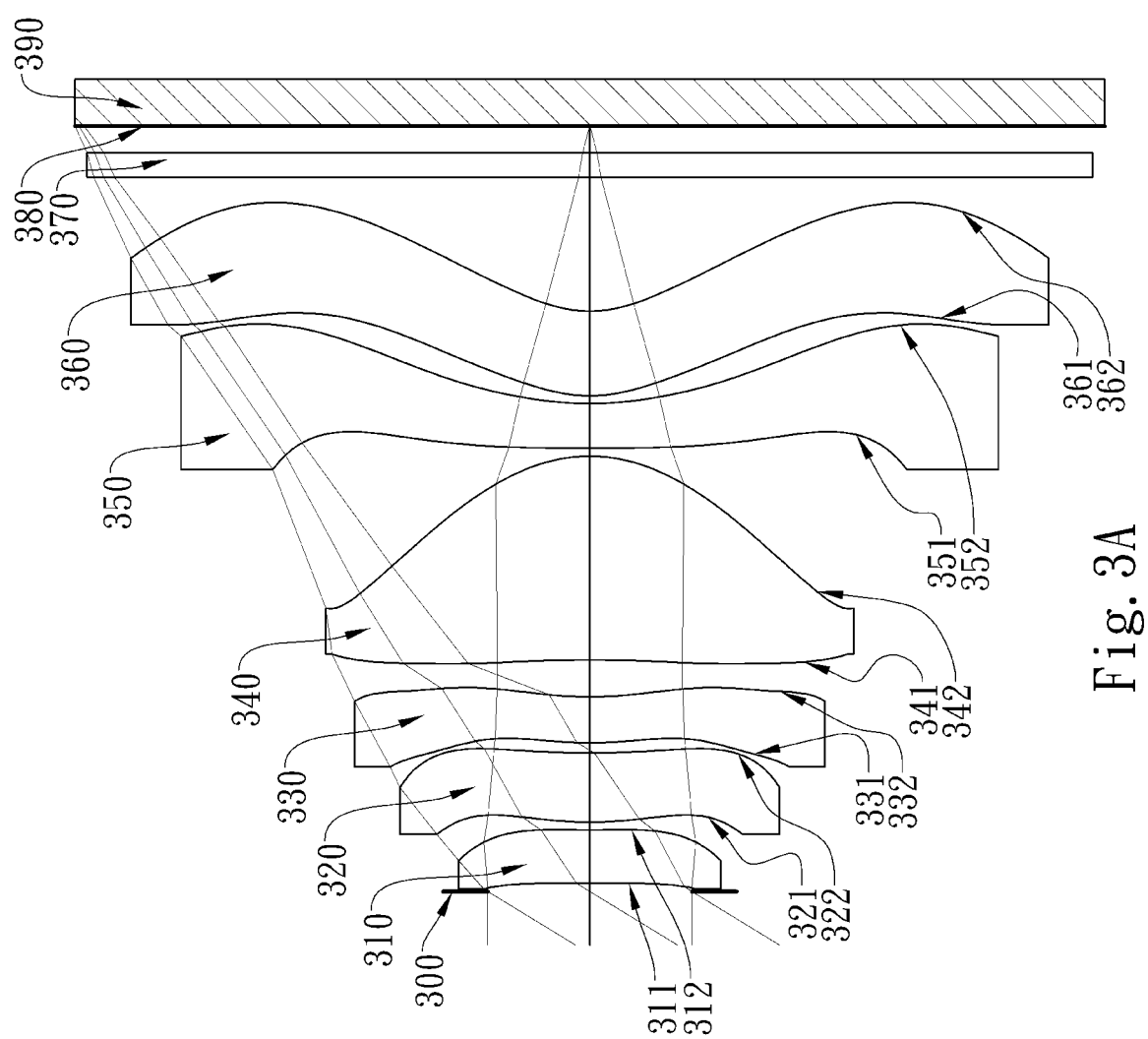
FIG. 3A is a schematic view of an imaging apparatus according to the 3rd embodiment of the present disclosure.
Figure 3B:
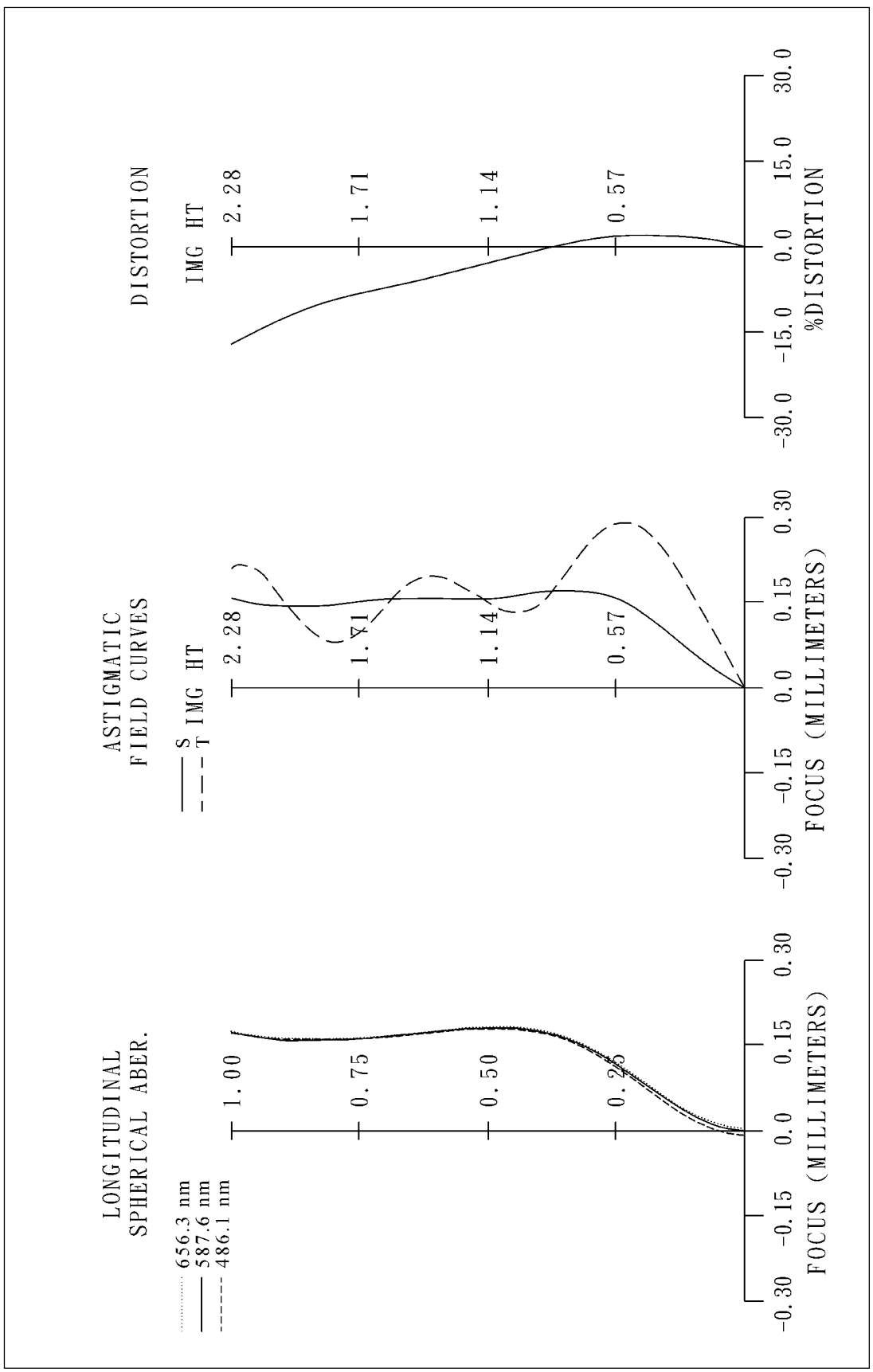
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes an image capturing lens assembly (not otherwise herein labeled) of the present disclosure and an image sensor 390. The image capturing lens assembly includes, in order from an object side to an image side, an aperture stop 300, a first lens element 310, a second lens element 320, a third lens element 330, a fourth lens element 340, a fifth lens element 350 and a sixth lens element 360.

The first lens element 310 with negative refractive power has an object-side surface 311 being concave in a paraxial region thereof, an image-side surface 312 being concave in a paraxial region thereof, and both the object-side surface 311 and the image-side surface 312 being aspheric. The first lens element 310 is made of plastic material.

The second lens element 320 with positive refractive power has an object-side surface 321 being convex in a paraxial region thereof, an image-side surface 322 being concave in a paraxial region thereof, and both the object-side surface 321 and the image-side surface 322 being aspheric. The second lens element 320 is made of plastic material.

The third lens element 330 with positive refractive power has an object-side surface 331 being convex in a paraxial region thereof, an image-side surface 332 being concave in a paraxial region thereof, and both the object-side surface 331 and the image-side surface 332 being aspheric. The third lens element 330 is made of plastic material.

The fourth lens element 340 with positive refractive power has an object-side surface 341 being concave in a paraxial region thereof, an image-side surface 342 being convex in a paraxial region thereof, and both the object-side surface 341 and the image-side surface 342 being aspheric. The fourth lens element 340 is made of plastic material.

The fifth lens element 350 with negative refractive power has an object-side surface 351 being convex in a paraxial region thereof, an image-side surface 352 being concave in a paraxial region thereof, and both the object-side surface 351 and the image-side surface 352 being aspheric. The fifth lens element 350 is made of plastic material.

The sixth lens element 360 with positive refractive power has an object-side surface 361 being convex in a paraxial region thereof, an image-side surface 362 being concave in a paraxial region thereof, both the object-side surface 361 and the image-side surface 362 being aspheric, and at least one inflection point on the image-side surface 362. The sixth lens element 360 is made of plastic material.

The image capturing lens assembly further includes an IR cut filter 370 located between the sixth lens element 360 and an image surface 380. The IR cut filter 370 is made of glass material and will not affect the focal length of the image capturing lens assembly. The image sensor 390 is disposed on or near the image surface 380 of the image capturing lens assembly.

The detailed optical data of the 3rd embodiment are shown in TABLE 6, and the aspheric surface data are shown in TABLE 7, wherein the units of the curvature radius, the thickness and the focal length are expressed in mm, and HFOV is a half of the maximal field of view.

TABLE 6

(3rd Embodiment)
f = 1.64 mm, Fno = 1.80, HFOV = 58.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.036 | | | | |
| 2 | Lens 1 | −7362.415 | ASP | 0.238 | Plastic | 1.544 | 55.9 | −12.27 |
| 3 | | 6.679 | ASP | 0.035 | | | | |
| 4 | Lens 2 | 1.511 | ASP | 0.310 | Plastic | 1.544 | 55.9 | 4.45 |
| 5 | | 3.738 | ASP | 0.046 | | | | |
| 6 | Lens 3 | 1.437 | ASP | 0.206 | Plastic | 1.660 | 20.4 | 18.55 |
| 7 | | 1.535 | ASP | 0.165 | | | | |
| 8 | Lens 4 | −7.265 | ASP | 0.914 | Plastic | 1.544 | 55.9 | 1.34 |
| 9 | | −0.693 | ASP | 0.035 | | | | |
| 10 | Lens 5 | 17.083 | ASP | 0.200 | Plastic | 1.660 | 20.4 | −2.27 |
| 11 | | 1.372 | ASP | 0.035 | | | | |
| 12 | Lens 6 | 0.614 | ASP | 0.379 | Plastic | 1.544 | 55.9 | 15.03 |

TABLE 6-continued (3rd Embodiment)
f = 1.64 mm, Fno = 1.80, HFOV = 58.5 deg.

| Surface # | | Curvature Radius | | Thickness | Material | Index | Abbe # | Focal Length |
|---|---|---|---|---|---|---|---|---|
| 13 | | 0.519 | ASP | 0.600 | | | | |
| 14 | IR Cut Filter | Plano | | 0.110 | Glass | 1.517 | 64.2 | — |
| 15 | | Plano | | 0.119 | | | | |
| 16 | Image Surface | Plano | | — | | | | |

*Reference wavelength is d-line 587.6 nm.

TABLE 7

Aspheric Coefficients

| Surface # | 2 | 3 | 4 | 5 |
|---|---|---|---|---|
| k = | −3.8194E−09 | −8.3535E+00 | −3.2711E+01 | −8.6967E+00 |
| A4 = | −3.7761E−01 | −1.5489E+00 | 2.5053E−01 | −1.6187E−01 |
| A6 = | −2.9287E−01 | 7.6542E−01 | −4.8216E+00 | 3.1799E−01 |
| A8 = | 3.3667E−01 | −2.9842E−01 | 1.4482E+01 | −3.1085E+00 |
| A10 = | −7.3808E+00 | −1.2620E+00 | −2.8724E+01 | 5.0516E+00 |
| A12 = | | | 2.4134E+01 | −3.0025E+00 |

| Surface # | 6 | 7 | 8 | 9 |
|---|---|---|---|---|
| k = | −8.9929E+01 | −1.6324E+01 | −1.3538E+01 | −2.1058E+00 |
| A4 = | 1.8331E−01 | −3.9370E−01 | −1.0521E−01 | −4.5726E−01 |
| A6 = | −5.8386E+00 | 4.6068E−01 | 9.8563E−01 | 1.5424E+00 |
| A8 = | 1.7597E+01 | −2.0767E+00 | −2.0904E+00 | −4.1022E+00 |
| A10 = | −2.2639E+01 | 5.6364E+00 | 2.0876E+00 | 6.7597E+00 |
| A12 = | 1.3690E+01 | −6.4137E+00 | −1.0109E+00 | −6.1572E+00 |
| A14 = | −3.3147E+00 | 3.2140E+00 | 1.9393E−01 | 2.8550E+00 |
| A16 = | | −5.9633E−01 | | −5.2091E−01 |

| Surface # | 10 | 11 | 12 | 13 |
|---|---|---|---|---|
| k = | −1.0000E+00 | −2.5604E+01 | −6.3447E+00 | −3.5516E+00 |
| A4 = | 1.0697E−01 | 2.6062E−01 | 1.0591E−01 | −4.4646E−02 |
| A6 = | −6.6977E−02 | −2.3854E−01 | −1.8419E−01 | −2.1169E−02 |
| A8 = | 5.0676E−02 | 8.6327E−02 | 9.6849E−02 | 2.0260E−02 |
| A10 = | −1.0670E−01 | −9.6142E−03 | −2.8922E−02 | −1.0812E−02 |
| A12 = | 8.4599E−02 | −3.3539E−03 | 5.6418E−03 | 3.2252E−03 |
| A14 = | −3.0667E−02 | 1.2110E−03 | −6.6560E−04 | −4.8211E−04 |
| A16 = | 4.1992E−03 | −1.1237E−04 | 3.4783E−05 | 2.8270E−05 |

In the 3rd embodiment, the equation of the aspheric surface profiles of the aforementioned lens elements is the same as the equation of the 1st embodiment. Also, the definitions of these parameters shown in TABLE 8 below are the same as those stated in the 1st embodiment with corresponding values for the 3rd embodiment, so an explanation in this regard will not be provided again.

Moreover, these parameters can be calculated from TABLE 6 and TABLE 7 and satisfy the conditions stated in TABLE 8.

TABLE 8

| 3rd Embodiment | | | |
|---|---|---|---|
| f [mm] | 1.64 | |f/f5| | 0.72 |
| Fno. | 1.80 | |f/f6| | 0.11 |
| HFOV [deg.] | 58.5 | SL/f | 2.08 |
| FOV [deg.] | 116.9 | TL/f | 2.06 |
| Nmax | 1.660 | SD/TD | 1.01 |
| (V3 + V5)/V1 | 0.73 | 1/tan(HFOV) | 0.61 |
| CT4/(ΣCT − CT4) | 0.69 | f/EPD | 1.80 |
| ΣAT/ΣCT | 0.14 | ImgH/R12 | 4.40 |
| |R2/R1| | 0.0009 | TL/ImgH | 1.48 |
| (R11 − R12)/(R11 + R12) | 0.08 | TL/(ImgH*tan(HFOV)) | 0.91 |
| f/f2 | 0.37 | θstop [deg.] | 58.5 |
| |f/f1| | 0.13 | |dsr1/dsr2| | 0.13 |
| |f/f2| | 0.37 | Yc62/f | 0.86 |
| |f/f3| | 0.09 | Y11/Y62 | 0.23 |
| |f/f4| | 1.22 | | |

4th Embodiment

Figure 4A:
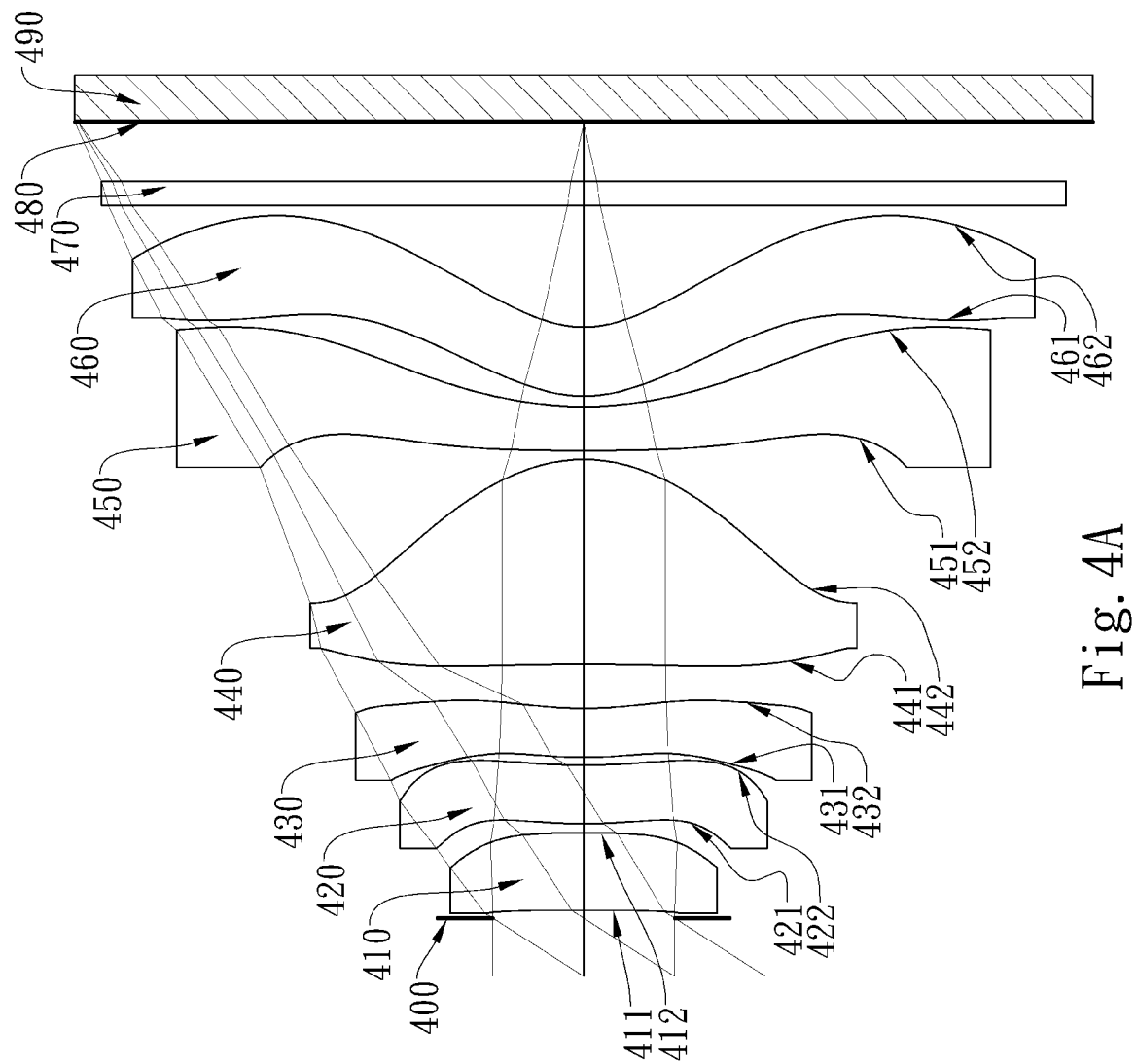
FIG. 4A is a schematic view of an imaging apparatus according to the 4th embodiment of the present disclosure.
Figure 4B:
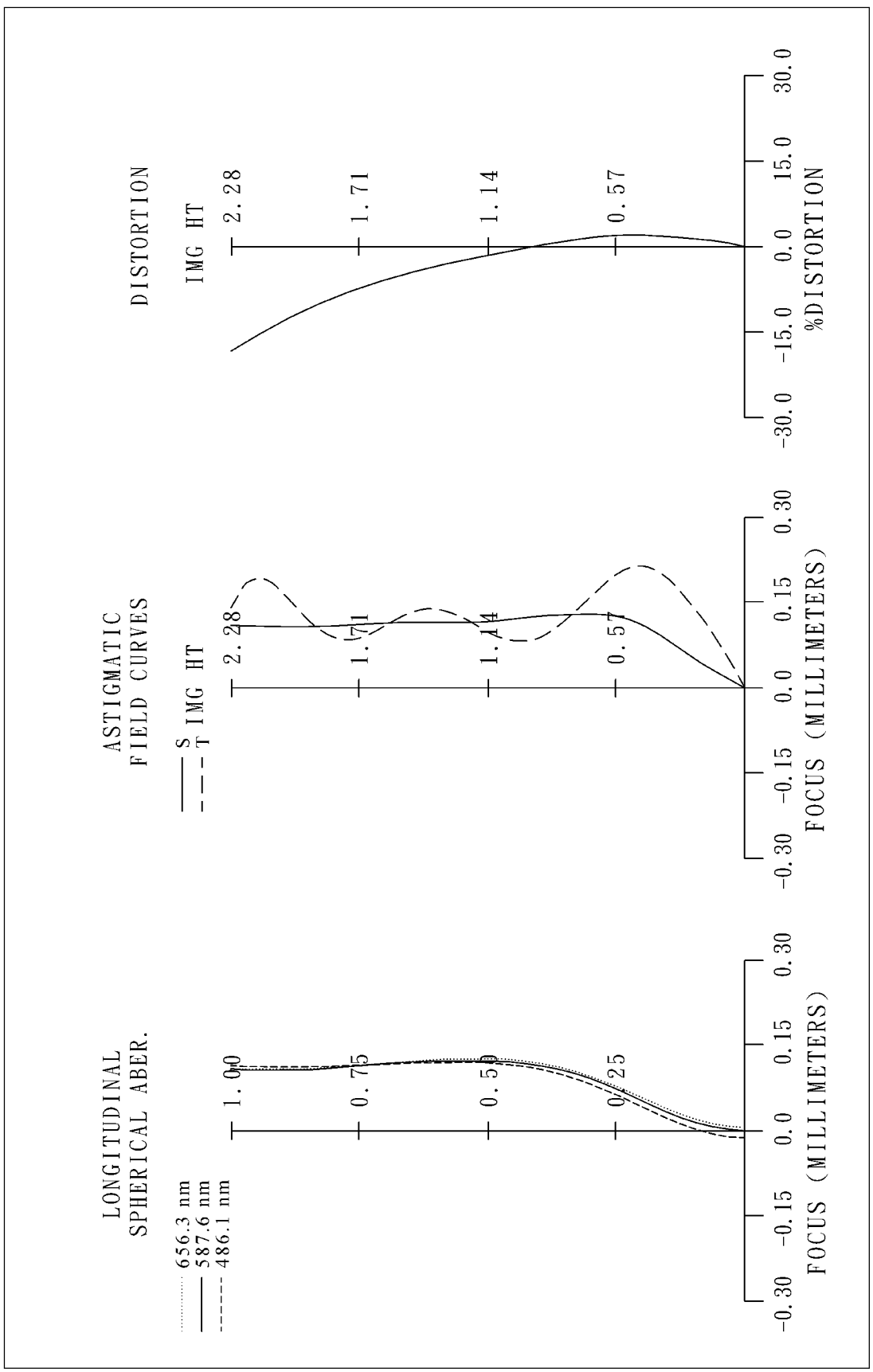
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes an image capturing lens assembly (not otherwise herein labeled) of the present disclosure and an image sensor 490. The image capturing lens assembly includes, in order from an object side to an image side, an aperture stop 400, a first lens element 410, a second lens element 420, a third lens element 430, a fourth lens element 440, a fifth lens element 450 and a sixth lens element 460.

The first lens element 410 with positive refractive power has an object-side surface 411 being concave in a paraxial region thereof, an image-side surface 412 being convex in a paraxial region thereof, and both the object-side surface 411 and the image-side surface 412 being aspheric. The first lens element 410 is made of plastic material.

The second lens element 420 with positive refractive power has an object-side surface 421 being convex in a paraxial region thereof, an image-side surface 422 being concave in a paraxial region thereof, and both the object-side surface 421 and the image-side surface 422 being aspheric. The second lens element 420 is made of plastic material.

The third lens element 430 with positive refractive power has an object-side surface 431 being convex in a paraxial region thereof, an image-side surface 432 being concave in a paraxial region thereof, and both the object-side surface 431 and the image-side surface 432 being aspheric. The third lens element 430 is made of plastic material.

The fourth lens element 440 with positive refractive power has an object-side surface 441 being concave in a paraxial region thereof, an image-side surface 442 being convex in a paraxial region thereof, and both the object-side surface 441 and the image-side surface 442 being aspheric. The fourth lens element 440 is made of plastic material.

The fifth lens element 450 with negative refractive power has an object-side surface 451 being convex in a paraxial region thereof, an image-side surface 452 being concave in a paraxial region thereof, and both the object-side surface 451 and the image-side surface 452 being aspheric. The fifth lens element 450 is made of plastic material.

The sixth lens element 460 with positive refractive power has an object-side surface 461 being convex in a paraxial region thereof, an image-side surface 462 being concave in a paraxial region thereof, both the object-side surface 461 and the image-side surface 462 being aspheric, and at least one inflection point on the image-side surface 462. The sixth lens element 460 is made of plastic material.

The image capturing lens assembly further includes an IR cut filter 470 located between the sixth lens element 460 and an image surface 480. The IR cut filter 470 is made of glass material and will not affect the focal length of the image capturing lens assembly. The image sensor 490 is disposed on or near the image surface 480 of the image capturing lens assembly.

The detailed optical data of the 4th embodiment are shown in TABLE 9, and the aspheric surface data are shown in TABLE 10, wherein the units of the curvature radius, the thickness and the focal length are expressed in mm, and HFOV is a half of the maximal field of view.

TABLE 9

(4th Embodiment)
f = 1.76 mm, Fno = 2.15, HFOV = 57.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.035 | | | | |
| 2 | Lens 1 | −73.624 | ASP | 0.349 | Plastic | 1.544 | 55.9 | 74.53 |
| 3 | | −26.179 | ASP | 0.042 | | | | |
| 4 | Lens 2 | 2.144 | ASP | 0.265 | Plastic | 1.584 | 28.2 | 13.63 |
| 5 | | 2.801 | ASP | 0.035 | | | | |
| 6 | Lens 3 | 1.536 | ASP | 0.221 | Plastic | 1.660 | 20.4 | 19.42 |
| 7 | | 1.646 | ASP | 0.199 | | | | |
| 8 | Lens 4 | −13.389 | ASP | 0.927 | Plastic | 1.544 | 55.9 | 1.35 |
| 9 | | −0.714 | ASP | 0.039 | | | | |
| 10 | Lens 5 | 13.187 | ASP | 0.200 | Plastic | 1.660 | 20.4 | −2.67 |
| 11 | | 1.546 | ASP | 0.047 | | | | |
| 12 | Lens 6 | 0.587 | ASP | 0.312 | Plastic | 1.544 | 55.9 | 324.40 |
| 13 | | 0.479 | ASP | 0.550 | | | | |
| 14 | IR Cut Filter | Plano | | 0.110 | Glass | 1.517 | 64.2 | — |
| 15 | | Plano | | 0.269 | | | | |
| 16 | Image Surface | Plano | | — | | | | |

*Reference wavelength is d-line 587.6 nm.

TABLE 10

| Aspheric Coefficients | | | | |
|---|---|---|---|---|
| Surface # | 2 | 3 | 4 | 5 |
| k = | −3.8264E−09 | −8.3535E+00 | −3.2725E+01 | −8.6693E+00 |
| A4 = | −1.9399E−01 | −1.2782E+00 | −1.8179E−01 | −2.5735E−01 |
| A6 = | −5.0760E−01 | 3.5437E−01 | −3.3176E+00 | −3.5810E−01 |
| A8 = | 1.0830E+00 | −1.3655E+00 | 9.8624E+00 | 2.6601E−01 |
| A10 = | −6.6224E+00 | 4.0857E+00 | −2.8905E+01 | −6.4192E−01 |
| A12 = | | | 3.4009E+01 | 7.5403E−02 |

TABLE 10-continued

| Aspheric Coefficients | | | | |
|---|---|---|---|---|
| Surface # | 6 | 7 | 8 | 9 |
| k = | −9.0000E+01 | −1.6308E+01 | −1.3538E+01 | −2.1951E+00 |
| A4 = | 1.1646E−01 | −4.0078E−01 | −9.9535E−03 | −3.7183E−01 |
| A6 = | −6.7270E+00 | −9.8950E−03 | 2.2246E−01 | 8.0869E−01 |
| A8 = | 2.5651E+01 | 4.9166E−01 | −2.6380E−01 | −1.4178E+00 |
| A10 = | −4.3837E+01 | 2.9901E−01 | 1.4368E−01 | 1.6011E+00 |
| A12 = | 3.6818E+01 | −1.1139E+00 | −2.0108E−02 | −9.2589E−01 |
| A14 = | −1.2521E+01 | 6.8549E−01 | −7.1691E−03 | 2.5783E−01 |
| A16 = | | −1.2995E−01 | | −2.7709E−02 |
| Surface # | 10 | 11 | 12 | 13 |
| k = | −1.0000E+00 | −2.5576E+01 | −4.3408E+00 | −2.8174E+00 |
| A4 = | 5.8235E−02 | 3.0668E−01 | 9.7601E−02 | −8.3773E−02 |
| A6 = | 9.7815E−02 | −3.4961E−01 | −2.8360E−01 | −3.0918E−02 |
| A8 = | −2.5037E−01 | 1.9312E−01 | 1.8398E−01 | 3.6662E−02 |
| A10 = | 1.8521E−01 | −6.4968E−02 | −5.8064E−02 | −1.5442E−02 |
| A12 = | −6.9530E−02 | 1.3376E−02 | 1.0012E−02 | 3.4655E−03 |
| A14 = | 1.2786E−02 | −1.5278E−03 | −9.0163E−04 | −4.0092E−04 |
| A16 = | −8.9735E−04 | 7.2684E−05 | 3.2662E−05 | 1.8431E−05 |

In the 4th embodiment, the equation of the aspheric surface profiles of the aforementioned lens elements is the same as the equation of the 1st embodiment. Also, the definitions of these parameters shown in TABLE 11 below are the same as those stated in the 1st embodiment with corresponding values for the 4th embodiment, so an explanation in this regard will not be provided again.

Moreover, these parameters can be calculated from TABLE 9 and TABLE 10 and satisfy the conditions stated in TABLE 11.

TABLE 11

| 4th Embodiment | | | |
|---|---|---|---|
| f [mm] | 1.76 | |f/f5| | 0.66 |
| Fno. | 2.15 | |f/f6| | 0.01 |
| HFOV [deg.] | 57.4 | SL/f | 2.04 |
| FOV [deg.] | 114.9 | TL/f | 2.02 |
| Nmax | 1.660 | SD/TD | 1.01 |
| (V3 + V5)/V1 | 0.73 | 1/tan(HFOV) | 0.64 |
| CT4/(ΣCT − CT4) | 0.69 | f/EPD | 2.15 |
| ΣAT/ΣCT | 0.16 | ImgH/R12 | 4.77 |
| |R2/R1| | 0.36 | TL/ImgH | 1.56 |
| (R11 − R12)/(R11 + R12) | 0.10 | TL/(ImgH * tan(HFOV)) | 1.00 |
| f/f2 | 0.13 | θstop [deg.] | 57.4 |
| |f/f1| | 0.02 | |dsr1/dsr2| | 0.09 |
| |f/f2| | 0.13 | Yc62/f | 0.79 |
| |f/f3| | 0.09 | Y11/Y62 | 0.22 |
| |f/f4| | 1.30 | | |

5th Embodiment

Figure 5A:
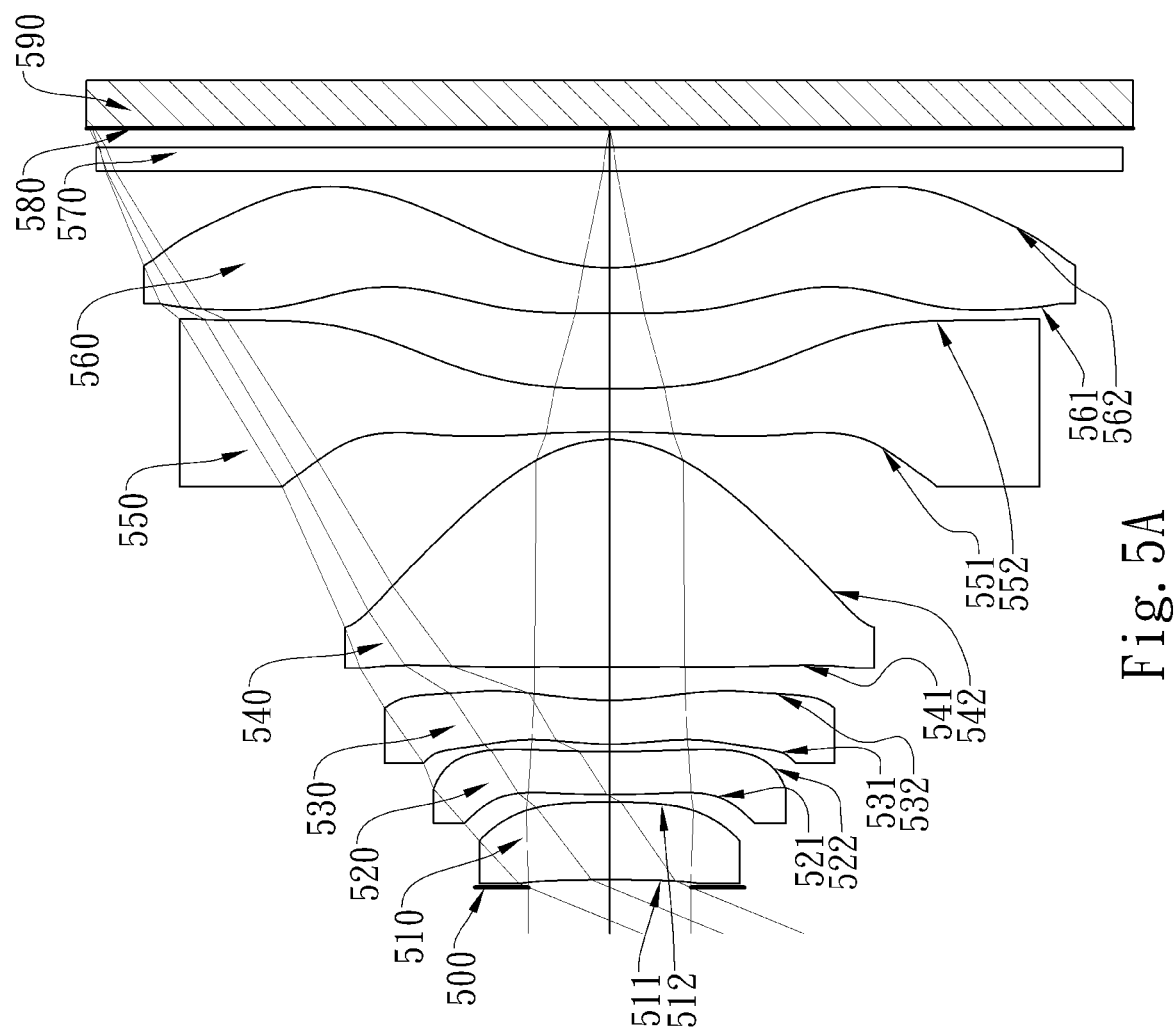
FIG. 5A is a schematic view of an imaging apparatus according to the 5th embodiment of the present disclosure.
Figure 5B:
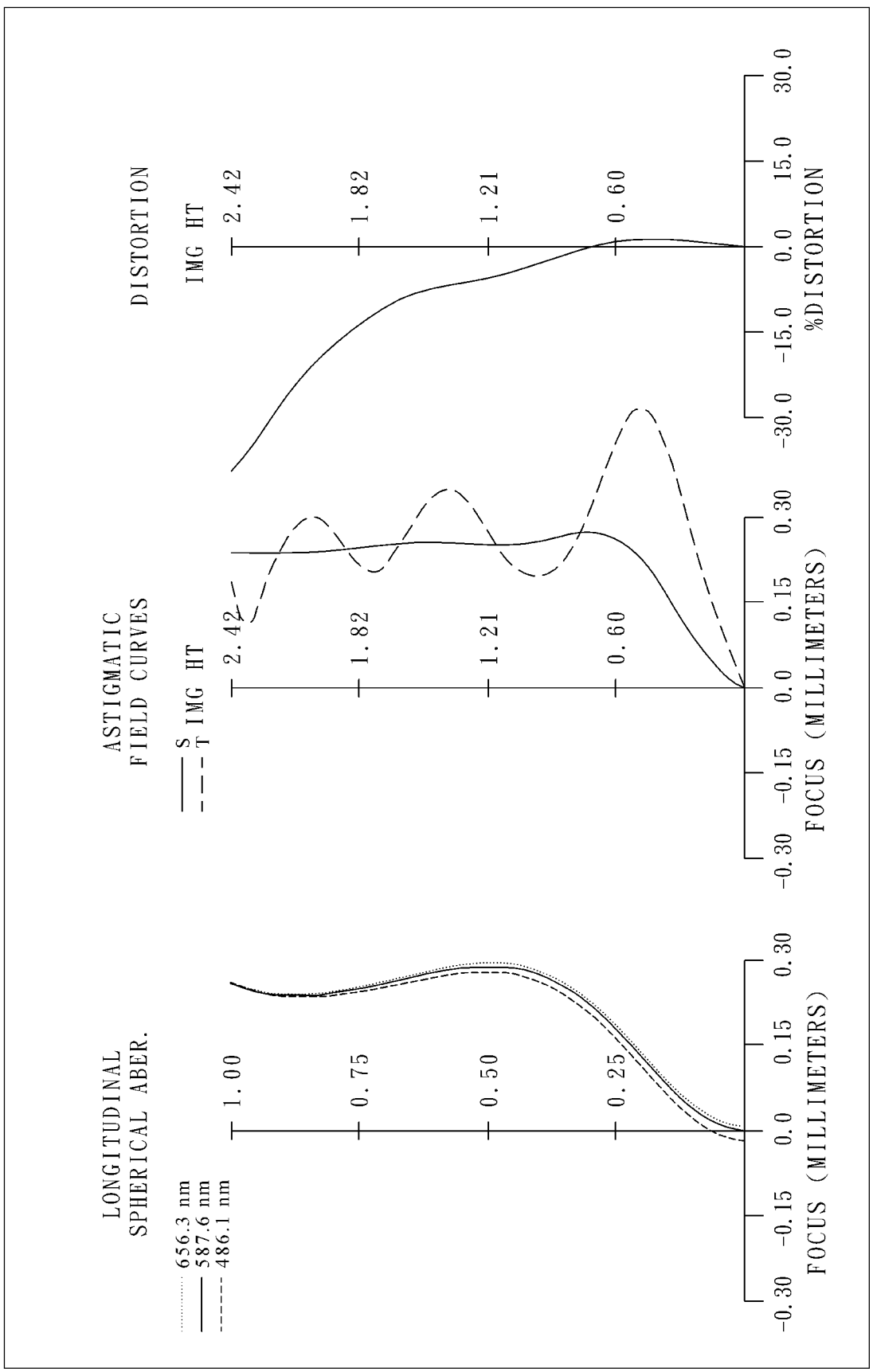
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus includes an image capturing lens assembly (not otherwise herein labeled) of the present disclosure and an image sensor 590. The image capturing lens assembly includes, in order from an object side to an image side, an aperture stop 500, a first lens element 510, a second lens element 520, a third lens element 530, a fourth lens element 540, a fifth lens element 550 and a sixth lens element 560.

The first lens element 510 with positive refractive power has an object-side surface 511 being concave in a paraxial region thereof, an image-side surface 512 being convex in a paraxial region thereof, and both the object-side surface 511 and the image-side surface 512 being aspheric. The first lens element 510 is made of plastic material.

The second lens element 520 with positive refractive power has an object-side surface 521 being convex in a paraxial region thereof, an image-side surface 522 being concave in a paraxial region thereof, and both the object-side surface 521 and the image-side surface 522 being aspheric. The second lens element 520 is made of plastic material.

The third lens element 530 with positive refractive power has an object-side surface 531 being convex in a paraxial region thereof, an image-side surface 532 being concave in a paraxial region thereof, and both the object-side surface 531 and the image-side surface 532 being aspheric. The third lens element 530 is made of plastic material.

The fourth lens element 540 with positive refractive power has an object-side surface 541 being convex in a paraxial region thereof, an image-side surface 542 being convex in a paraxial region thereof, and both the object-side surface 541 and the image-side surface 542 being aspheric. The fourth lens element 540 is made of plastic material.

The fifth lens element 550 with negative refractive power has an object-side surface 551 being concave in a paraxial region thereof, an image-side surface 552 being concave in a paraxial region thereof, and both the object-side surface 551 and the image-side surface 552 being aspheric. The fifth lens element 550 is made of plastic material.

The sixth lens element 560 with negative refractive power has an object-side surface 561 being concave in a paraxial region thereof, an image-side surface 562 being concave in a paraxial region thereof, both the object-side surface 561 and the image-side surface 562 being aspheric, and at least one inflection point on the image-side surface 562. The sixth lens element 560 is made of plastic material.

The image capturing lens assembly further includes an IR cut filter 570 located between the sixth lens element 560 and an image surface 580. The IR cut filter 570 is made of glass material and will not affect the focal length of the image capturing lens assembly. The image sensor 590 is disposed on or near the image surface 580 of the image capturing lens assembly.

The detailed optical data of the 5th embodiment are shown in TABLE 12, and the aspheric surface data are shown in TABLE 13, wherein the units of the curvature radius, the thickness and the focal length are expressed in mm, and HFOV is a half of the maximal field of view.

In the 5th embodiment, the equation of the aspheric surface profiles of the aforementioned lens elements is the same as the equation of the 1st embodiment. Also, the definitions of these parameters shown in TABLE 14 below are the same as those stated in the 1st embodiment with

TABLE 12

(5th Embodiment)
f = 1.62 mm, Fno = 2.15, HFOV = 67.7 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | 0.035 |  |  |  |  |
| 2 | Lens 1 | −12.306 | ASP | 0.362 | Plastic | 1.544 | 55.9 | 14.16 |
| 3 |  | −4.785 | ASP | 0.035 |  |  |  |  |
| 4 | Lens 2 | 4.380 | ASP | 0.200 | Plastic | 1.639 | 23.3 | 221.20 |
| 5 |  | 4.439 | ASP | 0.035 |  |  |  |  |
| 6 | Lens 3 | 1.177 | ASP | 0.205 | Plastic | 1.660 | 20.4 | 9.17 |
| 7 |  | 1.359 | ASP | 0.154 |  |  |  |  |
| 8 | Lens 4 | 11.101 | ASP | 1.063 | Plastic | 1.544 | 55.9 | 1.05 |
| 9 |  | −0.581 | ASP | 0.035 |  |  |  |  |
| 10 | Lens 5 | −6.485 | ASP | 0.200 | Plastic | 1.639 | 23.3 | −4.20 |
| 11 |  | 4.629 | ASP | 0.354 |  |  |  |  |
| 12 | Lens 6 | −49.787 | ASP | 0.211 | Plastic | 1.544 | 55.9 | −1.60 |
| 13 |  | 0.884 | ASP | 0.450 |  |  |  |  |
| 14 | IR Cut Filter | Plano |  | 0.110 | Glass | 1.517 | 64.2 | — |
| 15 |  | Plano |  | 0.090 |  |  |  |  |
| 16 | Image Surface | Plano |  | — |  |  |  |  |

*Reference wavelength is d-line 587.6 nm

TABLE 13

Aspheric Coefficients

| Surface # | 2 | 3 | 4 | 5 |
|---|---|---|---|---|
| k = | −4.4178E−09 | −8.3535E+00 | −3.2725E+01 | −8.6693E+00 |
| A4 = | −2.1958E−01 | −5.8223E−01 | 1.4265E−01 | −5.2205E−01 |
| A6 = | −5.8412E−01 | −4.3758E+00 | −3.3332E+00 | 3.1247E+00 |
| A8 = | 5.0649E+00 | 1.3869E+01 | 2.9521E+00 | −1.3030E+01 |
| A10 = | −2.9017E+01 | −1.4800E+01 | −6.5745E+00 | 2.2223E+01 |
| A12 = |  |  | 1.2373E+01 | −1.4585E+01 |

| Surface # | 6 | 7 | 8 | 9 |
|---|---|---|---|---|
| k = | −9.0000E+01 | −1.6308E+01 | −1.3538E+01 | −1.9189E+00 |
| A4 = | 3.2272E−01 | −5.1571E−01 | −4.8116E−01 | −3.6521E−01 |
| A6 = | −9.0354E+00 | 1.0889E+00 | 2.0060E+00 | 9.5962E−01 |
| A8 = | 3.6528E+01 | −3.9488E+00 | −3.8639E+00 | −2.2860E+00 |
| A10 = | −6.6832E+01 | 8.9331E+00 | 3.8814E+00 | 3.7531E+00 |
| A12 = | 6.1045E+01 | −9.6122E+00 | −1.9872E+00 | −3.4465E+00 |
| A14 = | −2.3229E+01 | 4.7456E+00 | 4.0839E−01 | 1.5817E+00 |
| A16 = |  | −8.7806E−01 |  | −2.8064E−01 |

| Surface # | 10 | 11 | 12 | 13 |
|---|---|---|---|---|
| k = | −1.0000E+00 | −2.5576E+01 | −1.0000E+00 | −7.1875E+00 |
| A4 = | −1.1541E−01 | 3.6104E−01 | 6.4085E−01 | 3.0934E−01 |
| A6 = | 8.3793E−01 | −3.4926E−01 | −8.9279E−01 | −5.0604E−01 |
| A8 = | −1.2945E+00 | 1.3893E−01 | 5.1868E−01 | 3.5755E−01 |
| A10 = | 1.0099E+00 | −2.4773E−02 | −1.5920E−01 | −1.4965E−01 |
| A12 = | −4.7817E−01 | 4.3941E−04 | 2.7139E−02 | 3.6961E−02 |
| A14 = | 1.2940E−01 | 4.9776E−04 | −2.4306E−03 | −4.9008E−03 |
| A16 = | −1.4947E−02 | −5.3546E−05 | 8.9301E−05 | 2.6701E−04 | corresponding values for the 5th embodiment, so an explanation in this regard will not be provided again.

Moreover, these parameters can be calculated from TABLE 12 and TABLE 13 and satisfy the conditions stated in TABLE 14.

TABLE 14

5th Embodiment

| | | | |
|---|---|---|---|
| f [mm] | 1.62 | \|f/f5\| | 0.39 |
| Fno. | 2.15 | \|f/f6\| | 1.02 |
| HFOV [deg.] | 67.7 | SL/f | 2.18 |
| FOV [deg.] | 135.5 | TL/f | 2.16 |
| Nmax | 1.660 | SD/TD | 1.01 |
| (V3 + V5)/V1 | 0.78 | 1/tan(HFOV) | 0.41 |
| CT4/(ΣCT − CT4) | 0.90 | f/EPD | 2.15 |
| ΣAT/ΣCT | 0.27 | ImgH/R12 | 2.74 |
| \|R2/R1\| | 0.39 | TL/ImgH | 1.44 |
| (R11 − R12)/(R11 + R12) | 1.04 | TL/(ImgH * tan(HFOV)) | 0.59 |
| f/f2 | 0.01 | θstop [deg.] | 67.7 |
| \|f/f1\| | 0.11 | \|dsr1/dsr2\| | 0.09 |
| \|f/f2\| | 0.01 | Yc62/f | 0.80 |
| \|f/f3\| | 0.18 | Y11/Y62 | 0.19 |
| \|f/f4\| | 1.55 | | |

6th Embodiment

Figure 6A:
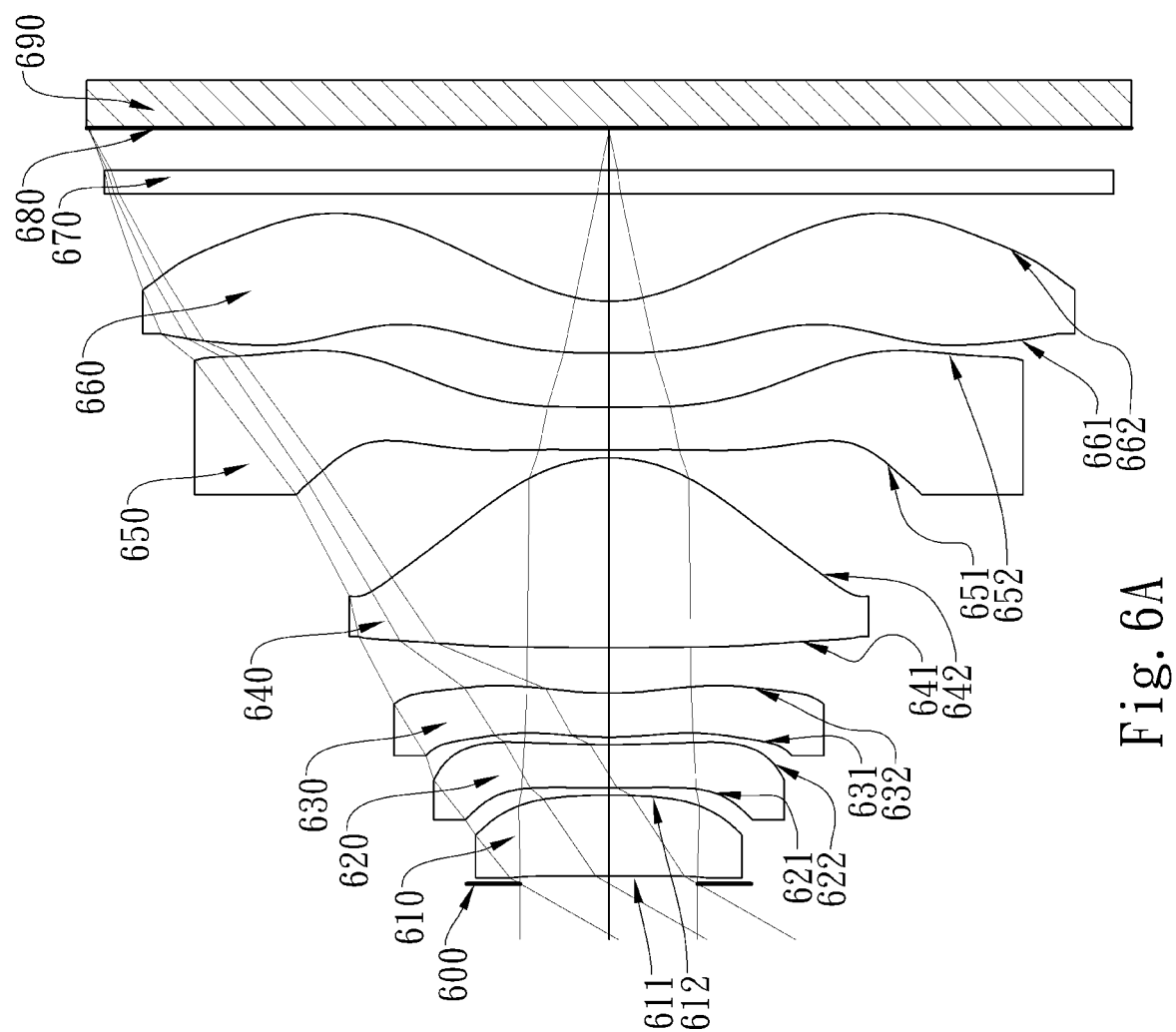
FIG. 6A is a schematic view of an imaging apparatus according to the 6th embodiment of the present disclosure.
Figure 6B:
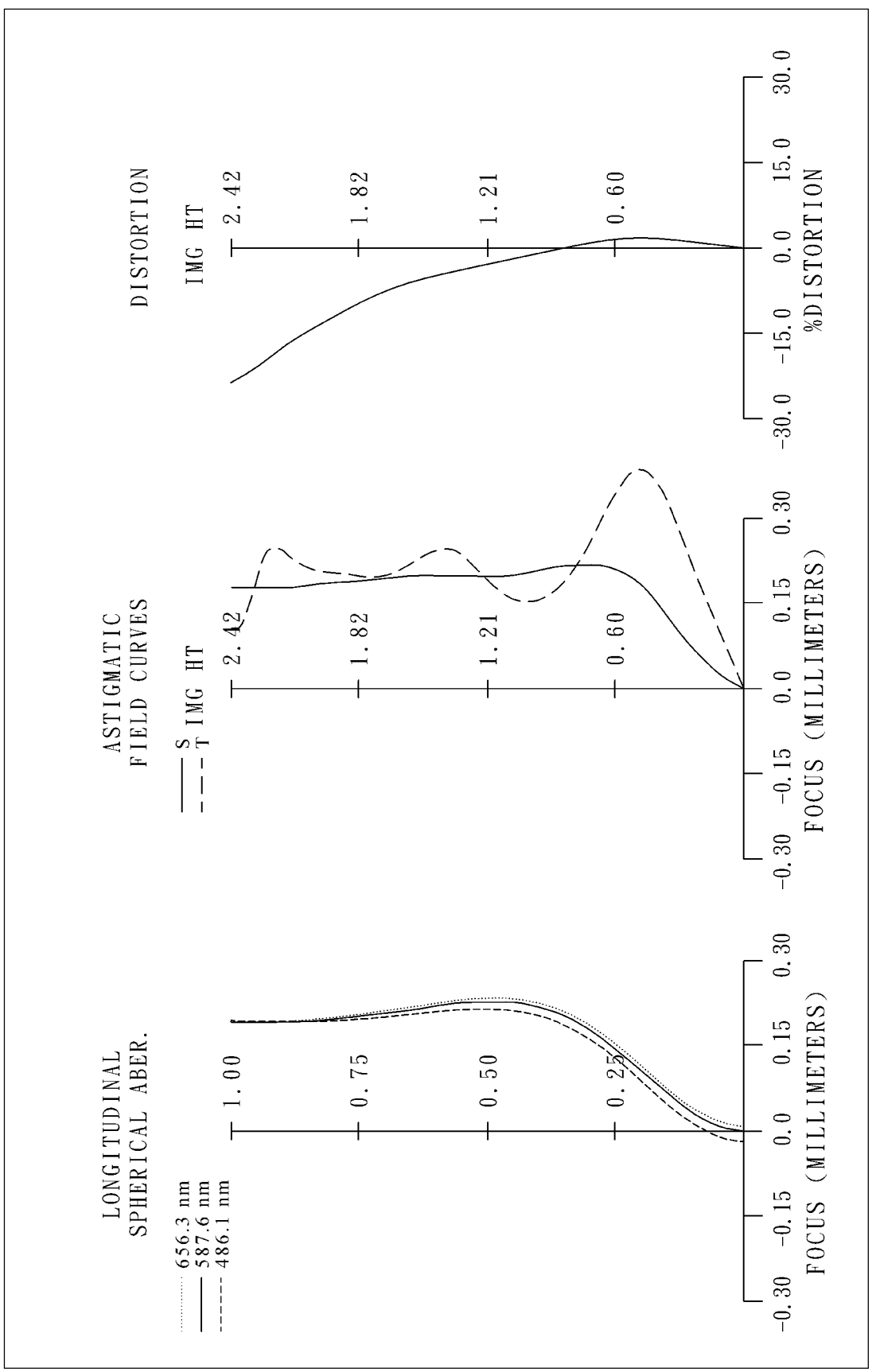
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes an image capturing lens assembly (not otherwise herein labeled) of the present disclosure and an image sensor 690. The image capturing lens assembly includes, in order from an object side to an image side, an aperture stop 600, a first lens element 610, a second lens element 620, a third lens element 630, a fourth lens element 640, a fifth lens element 650 and a sixth lens element 660.

The first lens element 610 with positive refractive power has an object-side surface 611 being convex in a paraxial region thereof, an image-side surface 612 being convex in a paraxial region thereof, and both the object-side surface 611 and the image-side surface 612 being aspheric. The first lens element 610 is made of plastic material.

The second lens element 620 with negative refractive power has an object-side surface 621 being concave in a paraxial region thereof, an image-side surface 622 being concave in a paraxial region thereof, and both the object-side surface 621 and the image-side surface 622 being aspheric. The second lens element 620 is made of plastic material.

The third lens element 630 with positive refractive power has an object-side surface 631 being convex in a paraxial region thereof, an image-side surface 632 being concave in a paraxial region thereof, and both the object-side surface 631 and the image-side surface 632 being aspheric. The third lens element 630 is made of plastic material.

The fourth lens element 640 with positive refractive power has an object-side surface 641 being convex in a paraxial region thereof, an image-side surface 642 being convex in a paraxial region thereof, and both the object-side surface 641 and the image-side surface 642 being aspheric. The fourth lens element 640 is made of plastic material.

The fifth lens element 650 with positive refractive power has an object-side surface 651 being convex in a paraxial region thereof, an image-side surface 652 being concave in a paraxial region thereof, and both the object-side surface 651 and the image-side surface 652 being aspheric. The fifth lens element 650 is made of plastic material.

The sixth lens element 660 with negative refractive power has an object-side surface 661 being convex in a paraxial region thereof, an image-side surface 662 being concave in a paraxial region thereof, both the object-side surface 661 and the image-side surface 662 being aspheric, and at least one inflection point on the image-side surface 662. The sixth lens element 660 is made of plastic material.

The image capturing lens assembly further includes an IR cut filter 670 located between the sixth lens element 660 and an image surface 680. The IR cut filter 670 is made of glass material and will not affect the focal length of the image capturing lens assembly. The image sensor 690 is disposed on or near the image surface 680 of the image capturing lens assembly.

The detailed optical data of the 6th embodiment are shown in TABLE 15, and the aspheric surface data are shown in TABLE 16, wherein the units of the curvature radius, the thickness and the focal length are expressed in mm, and HFOV is a half of the maximal field of view.

TABLE 15

(6th Embodiment)
f = 1.77 mm, Fno = 2.15, HFOV = 60.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.035 | | | | |
| 2 | Lens 1 | 19.374 | ASP | 0.378 | Plastic | 1.544 | 55.9 | 5.08 |
| 3 | | −3.198 | ASP | 0.035 | | | | |
| 4 | Lens 2 | −80.645 | ASP | 0.200 | Plastic | 1.639 | 23.3 | −7.37 |
| 5 | | 5.006 | ASP | 0.035 | | | | |
| 6 | Lens 3 | 1.317 | ASP | 0.205 | Plastic | 1.660 | 20.4 | 11.68 |
| 7 | | 1.490 | ASP | 0.211 | | | | |
| 8 | Lens 4 | 11.376 | ASP | 0.885 | Plastic | 1.530 | 55.8 | 1.45 |
| 9 | | −0.800 | ASP | 0.035 | | | | |
| 10 | Lens 5 | 5.714 | ASP | 0.201 | Plastic | 1.639 | 23.3 | 11.77 |
| 11 | | 23.473 | ASP | 0.252 | | | | |
| 12 | Lens 6 | 4.394 | ASP | 0.242 | Plastic | 1.535 | 55.8 | −1.58 |
| 13 | | 0.695 | ASP | 0.500 | | | | |

TABLE 15-continued (6th Embodiment)
f = 1.77 mm, Fno = 2.15, HFOV = 60.4 deg.

| Surface # | | Curvature Radius | Thickness | Material | Index | Abbe # | Focal Length |
|---|---|---|---|---|---|---|---|
| 14 | IR Cut Filter | Plano | 0.110 | Glass | 1.517 | 64.2 | — |
| 15 | | Plano | 0.197 | | | | |
| 16 | Image Surface | Plano | — | | | | |

*Reference wavelength is d-line 587.6 nm.

TABLE 16

Aspheric Coefficients

| Surface # | 2 | 3 | 4 | 5 |
|---|---|---|---|---|
| k = | −4.4715E−09 | −8.3535E+00 | −3.2725E+01 | −8.6693E+00 |
| A4 = | −1.9879E−01 | −2.9120E−01 | 4.3330E−01 | −3.6018E−01 |
| A6 = | −3.6111E−01 | −3.7663E+00 | −4.6505E+00 | 2.1510E+00 |
| A8 = | 1.7909E+00 | 8.5143E+00 | 7.9937E+00 | −9.4047E+00 |
| A10 = | −1.1144E+01 | −7.0942E+00 | −1.6859E+01 | 1.5151E+01 |
| A12 = | | | 2.0402E+01 | −9.6418E+00 |

| Surface # | 6 | 7 | 8 | 9 |
|---|---|---|---|---|
| k = | −9.0000E+01 | −1.6308E+01 | −1.3538E+01 | −1.8857E+00 |
| A4 = | 1.6371E−01 | −6.5368E−01 | −3.1004E−01 | −1.0369E+00 |
| A6 = | −6.7676E+00 | 1.9360E+00 | 1.3252E+00 | 3.5997E+00 |
| A8 = | 2.7739E+01 | −7.5029E+00 | −2.3277E+00 | −7.1732E+00 |
| A10 = | −5.1917E+01 | 1.6946E+01 | 2.0486E+00 | 9.5459E+00 |
| A12 = | 4.9110E+01 | −1.8966E+01 | −9.0887E−01 | −7.8516E+00 |
| A14 = | −1.9626E+01 | 1.0045E+01 | 1.6466E−01 | 3.4834E+00 |
| A16 = | | −2.0314E+00 | | −6.2552E−01 |

| Surface # | 10 | 11 | 12 | 13 |
|---|---|---|---|---|
| k = | −1.0000E+00 | −2.5576E+01 | −9.0000E+01 | −2.9019E+00 |
| A4 = | −9.0572E−01 | 4.8931E−01 | 5.8635E−01 | −4.8353E−02 |
| A6 = | 3.2652E+00 | −4.8882E−01 | −1.0012E+00 | −7.2505E−02 |
| A8 = | −5.3550E+00 | 2.2768E−01 | 6.7760E−01 | 6.4976E−02 |
| A10 = | 4.9489E+00 | −6.7643E−02 | −2.4053E−01 | −3.3518E−02 |
| A12 = | −2.6928E+00 | 1.4217E−02 | 4.7694E−02 | 1.0491E−02 |
| A14 = | 7.9313E−01 | −1.8760E−03 | −5.0282E−03 | −1.7074E−03 |
| A16 = | −9.6488E−02 | 1.0744E−04 | 2.2076E−04 | 1.0912E−04 |

In the 6th embodiment, the equation of the aspheric surface profiles of the aforementioned lens elements is the same as the equation of the 1st embodiment. Also, the definitions of these parameters shown in TABLE 17 below are the same as those stated in the 1st embodiment with corresponding values for the 6th embodiment, so an explanation in this regard will not be provided again.

Moreover, these parameters can be calculated from TABLE 15 and TABLE 16 and satisfy the conditions stated in TABLE 17.

TABLE 17

| 6th Embodiment | | | |
|---|---|---|---|
| f [mm] | 1.77 | |f/f5| | 0.15 |
| Fno. | 2.15 | |f/f6| | 1.12 |
| HFOV [deg.] | 60.4 | SL/f | 1.99 |
| FOV [deg.] | 120.7 | TL/f | 1.97 |
| Nmax | 1.660 | SD/TD | 1.01 |
| (V3 + V5)/V1 | 0.78 | 1/tan(HFOV) | 0.57 |
| CT4/(ΣCT − CT4) | 0.72 | f/EPD | 2.15 |
| ΣAT/ΣCT | 0.27 | ImgH/R12 | 3.49 |
| |R2/R1| | 0.17 | TL/ImgH | 1.44 |
| (R11 − R12)/(R11 + R12) | 0.73 | TL/(ImgH * tan(HFOV)) | 0.82 |
| f/f2 | −0.24 | θstop [deg.] | 60.4 |
| |f/f1| | 0.35 | |dsr1/dsr2| | 0.08 |
| |f/f2| | 0.24 | Yc62/f | 0.72 |
| |f/f3| | 0.15 | Y11/Y62 | 0.21 |
| |f/f4| | 1.22 | | |

7th Embodiment

Figure 7A:
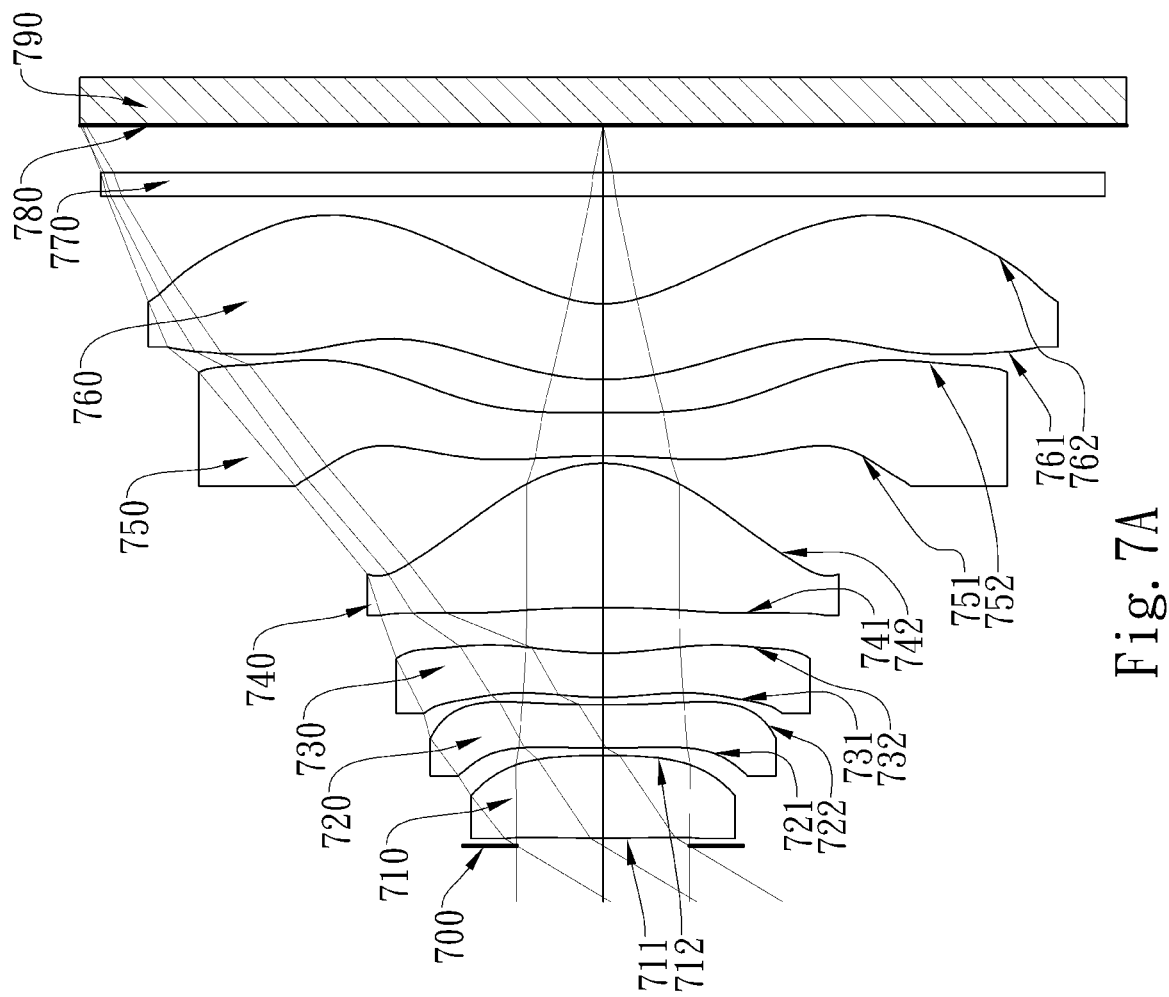
FIG. 7A is a schematic view of an imaging apparatus according to the 7th embodiment of the present disclosure.
Figure 7B:
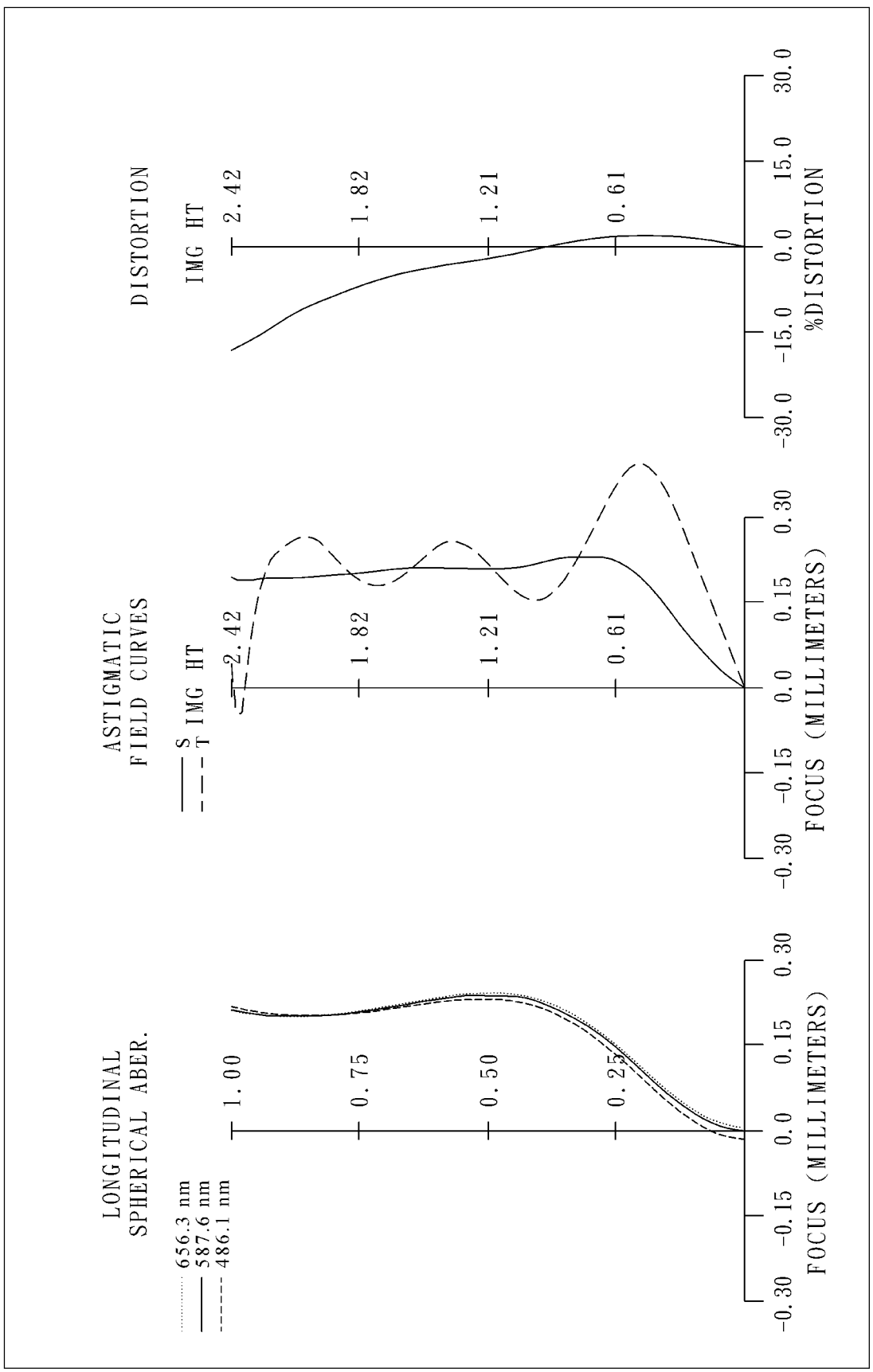
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus includes an image capturing lens assembly (not otherwise herein labeled) of the present disclosure and an image sensor 790. The image capturing lens assembly includes, in order from an object side to an image side, an aperture stop 700, a first lens element 710, a second lens element 720, a third lens element 730, a fourth lens element 740, a fifth lens element 750 and a sixth lens element 760.

The first lens element 710 with positive refractive power has an object-side surface 711 being convex in a paraxial region thereof, an image-side surface 712 being convex in a paraxial region thereof, and both the object-side surface 711 and the image-side surface 712 being aspheric. The first lens element 710 is made of plastic material.

The second lens element 720 with negative refractive power has an object-side surface 721 being convex in a paraxial region thereof, an image-side surface 722 being concave in a paraxial region thereof, and both the object-side surface 721 and the image-side surface 722 being aspheric. The second lens element 720 is made of plastic material.

The third lens element 730 with positive refractive power has an object-side surface 731 being convex in a paraxial region thereof, an image-side surface 732 being concave in a paraxial region thereof, and both the object-side surface 731 and the image-side surface 732 being aspheric. The third lens element 730 is made of plastic material.

The fourth lens element 740 with positive refractive power has an object-side surface 741 being concave in a paraxial region thereof, an image-side surface 742 being convex in a paraxial region thereof, and both the object-side surface 741 and the image-side surface 742 being aspheric. The fourth lens element 740 is made of plastic material.

The fifth lens element 750 with negative refractive power has an object-side surface 751 being concave in a paraxial region thereof, an image-side surface 752 being convex in a paraxial region thereof, and both the object-side surface 751 and the image-side surface 752 being aspheric. The fifth lens element 750 is made of plastic material.

The sixth lens element 760 with negative refractive power has an object-side surface 761 being convex in a paraxial region thereof, an image-side surface 762 being concave in a paraxial region thereof, both the object-side surface 761 and the image-side surface 762 being aspheric, and at least one inflection point on the image-side surface 762. The sixth lens element 760 is made of plastic material.

The image capturing lens assembly further includes an IR cut filter 770 located between the sixth lens element 760 and an image surface 780. The IR cut filter 770 is made of glass material and will not affect the focal length of the image capturing lens assembly. The image sensor 790 is disposed on or near the image surface 780 of the image capturing lens assembly.

The detailed optical data of the 7th embodiment are shown in TABLE 18, and the aspheric surface data are shown in TABLE 19, wherein the units of the curvature radius, the thickness and the focal length are expressed in mm, and HFOV is a half of the maximal field of view.

TABLE 18

(7th Embodiment)
f = 1.72 mm, Fno = 2.15, HFOV = 59.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.035 | | | | |
| 2 | Lens 1 | 7.065 | ASP | 0.384 | Plastic | 1.535 | 56.3 | 5.33 |
| 3 | | −4.691 | ASP | 0.035 | | | | |
| 4 | Lens 2 | 9.264 | ASP | 0.200 | Plastic | 1.639 | 23.3 | −12.04 |
| 5 | | 4.166 | ASP | 0.035 | | | | |
| 6 | Lens 3 | 1.257 | ASP | 0.205 | Plastic | 1.650 | 21.4 | 8.98 |
| 7 | | 1.499 | ASP | 0.211 | | | | |
| 8 | Lens 4 | −8.796 | ASP | 0.670 | Plastic | 1.535 | 55.8 | 1.32 |
| 9 | | −0.670 | ASP | 0.035 | | | | |
| 10 | Lens 5 | −3.468 | ASP | 0.200 | Plastic | 1.639 | 23.3 | −5.65 |
| 11 | | −90.477 | ASP | 0.153 | | | | |
| 12 | Lens 6 | 1.029 | ASP | 0.352 | Plastic | 1.535 | 56.3 | −2.65 |
| 13 | | 0.525 | ASP | 0.500 | | | | |
| 14 | IR Cut Filter | Plano | | 0.110 | Glass | 1.517 | 64.2 | — |
| 15 | | Plano | | 0.219 | | | | |
| 16 | Image Surface | Plano | | — | | | | |

*Reference wavelength is d-line 587.6 nm

TABLE 19

Aspheric Coefficients

| | Surface # | | | |
|---|---|---|---|---|
| | 2 | 3 | 4 | 5 |
| k = | 2.4237E−09 | −8.3535E+00 | −3.2725E+01 | −8.6693E+00 |
| A4 = | −2.4879E−01 | −7.9903E−01 | −5.9032E−02 | −4.9120E−01 |

TABLE 19-continued

| Aspheric Coefficients | | | | |
|---|---|---|---|---|
| A6 = | −3.3696E−01 | −1.7316E+00 | −1.9024E+00 | 3.1295E+00 |
| A8 = | 1.2978E+00 | 4.8211E+00 | −5.0529E−02 | −1.2902E+01 |
| A10 = | −1.2435E+01 | −5.2338E+00 | −6.0597E−01 | 2.0404E+01 |
| A12 = | | | 5.5209E+00 | −1.2671E+01 |

| | Surface # | | | |
|---|---|---|---|---|
| | 6 | 7 | 8 | 9 |
| k = | −9.0000E+01 | −1.6307E+01 | −1.3538E+01 | −2.4059E+00 |
| A4 = | 2.3280E−01 | −6.5431E−01 | −5.3736E−01 | −9.0985E−01 |
| A6 = | −6.9060E+00 | 2.7447E+00 | 2.8238E+00 | 3.5727E+00 |
| A8 = | 2.5680E+01 | −1.2263E+01 | −5.4574E+00 | −9.6101E+00 |
| A10 = | −4.3263E+01 | 2.8913E+01 | 4.9556E+00 | 1.8547E+01 |
| A12 = | 3.6719E+01 | −3.3731E+01 | −1.9630E+00 | −2.1458E+01 |
| A14 = | −1.3539E+01 | 1.8749E+01 | 2.0309E−01 | 1.2911E+01 |
| A16 = | | −3.9958E+00 | | −3.0759E+00 |

| | Surface # | | | |
|---|---|---|---|---|
| | 10 | 11 | 12 | 13 |
| k = | −1.0058E+00 | −2.5576E+01 | −1.8320E+01 | −4.3229E+00 |
| A4 = | 1.8738E−01 | 6.1935E−01 | 3.6947E−01 | 8.4715E−02 |
| A6 = | 9.9688E−01 | −7.3772E−01 | −7.2845E−01 | −2.7745E−01 |
| A8 = | −2.6485E+00 | 4.5084E−01 | 5.1290E−01 | 2.4508E−01 |
| A10 = | 3.0030E+00 | −1.7949E−01 | −1.8521E−01 | −1.2377E−01 |
| A12 = | −1.8928E+00 | 4.6648E−02 | 3.7113E−02 | 3.5861E−02 |
| A14 = | 6.2979E−01 | −6.9366E−03 | −3.9571E−03 | −5.4463E−03 |
| A16 = | −8.4998E−02 | 4.3292E−04 | 1.7701E−04 | 3.3409E−04 |

In the 7th embodiment, the equation of the aspheric surface profiles of the aforementioned lens elements is the same as the equation of the 1st embodiment. Also, the definitions of these parameters shown in TABLE 20 below are the same as those stated in the 1st embodiment with corresponding values for the 7th embodiment, so an explanation in this regard will not be provided again.

Moreover, these parameters can be calculated from TABLE 18 and TABLE 19 and satisfy the conditions stated in TABLE 20.

TABLE 20

| 7th Embodiment | | | |
|---|---|---|---|
| f [mm] | 1.72 | |f/f5| | 0.30 |
| Fno. | 2.15 | |f/f6| | 0.65 |
| HFOV [deg.] | 59.2 | SL/f | 1.95 |
| FOV [deg.] | 118.3 | TL/f | 1.93 |
| Nmax | 1.650 | SD/TD | 1.01 |
| (V3 + V5)/V1 | 0.79 | 1/tan(HFOV) | 0.60 |
| CT4/(ΣCT − CT4) | 0.50 | f/EPD | 2.15 |
| ΣAT/ΣCT | 0.23 | ImgH/R12 | 4.62 |
| |R2/R1| | 0.66 | TL/ImgH | 1.37 |
| (R11 − R12)/(R11 + R12) | 0.32 | TL/(ImgH * tan(HFOV)) | 0.81 |
| f/f2 | −0.14 | θstop [deg.] | 59.2 |
| |f/f1| | 0.32 | |dsr1/dsr2| | 0.08 |
| |f/f2| | 0.14 | Yc62/f | 0.74 |
| |f/f3| | 0.19 | Y11/Y62 | 0.22 |
| |f/f4| | 1.30 | | |

8th Embodiment

Figure 8A:
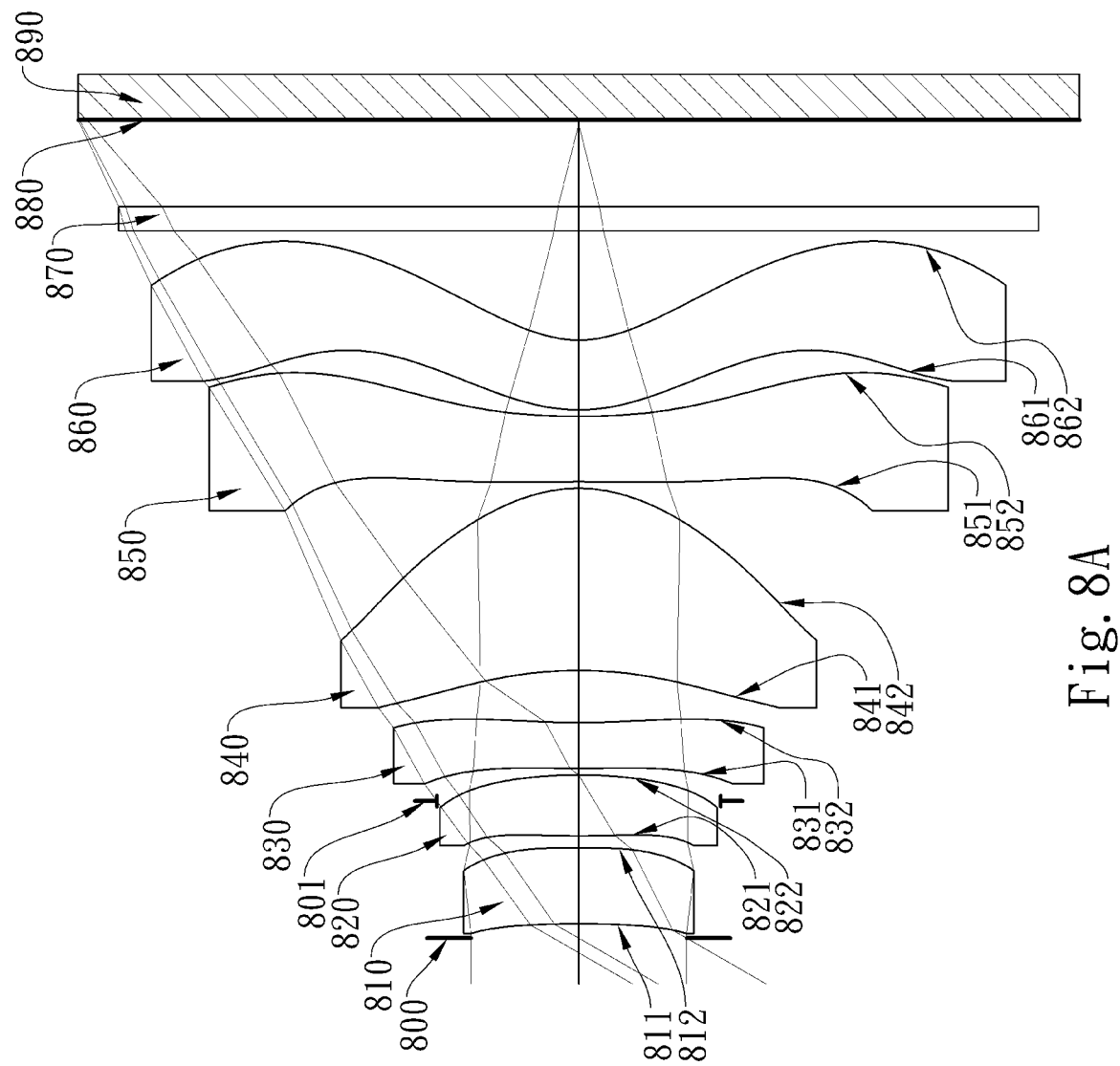
FIG. 8A is a schematic view of an imaging apparatus according to the 8th embodiment of the present disclosure.
Figure 8B:
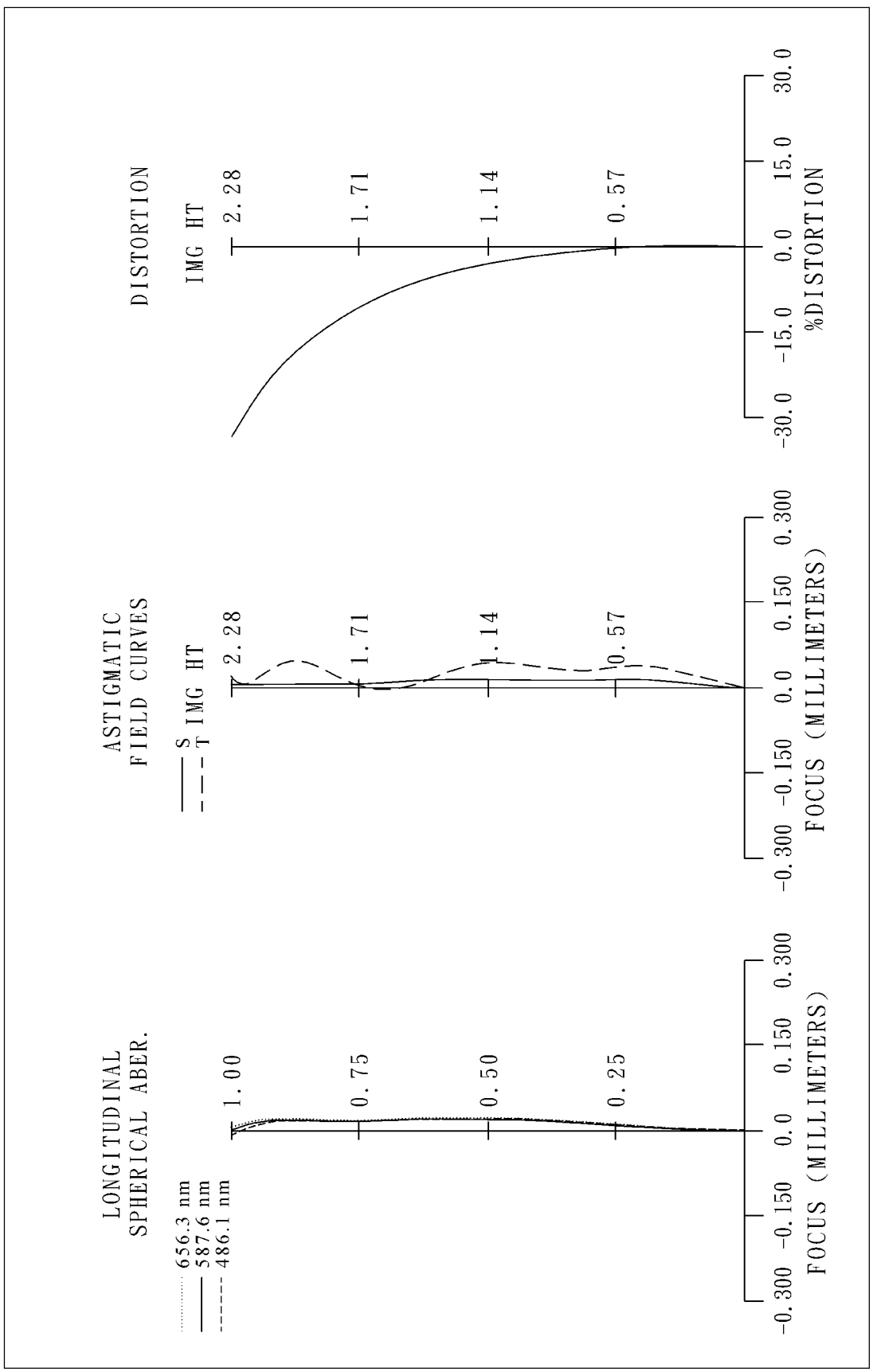
FIG. 8B shows longitudinal spherical aberration curves, astigmatic field curves and a distortion curve of the imaging apparatus according to the 8th embodiment.

FIG. 8A is a schematic view of an imaging apparatus according to the 8th embodiment of the present disclosure. FIG. 8B shows, in order from left to right, longitudinal spherical aberration curves, astigmatic field curves and a distortion curve of the imaging apparatus according to the 8th embodiment.

In FIG. 8A, the imaging apparatus includes an image capturing lens assembly (not otherwise herein labeled) of the present disclosure and an image sensor 890. The image capturing lens assembly includes, in order from an object side to an image side, an aperture stop 800, a first lens element 810, a second lens element 820, a stop 801, a third lens element 830, a fourth lens element 840, a fifth lens element 850 and a sixth lens element 860.

The first lens element 810 with positive refractive power has an object-side surface 811 being concave in a paraxial region thereof, an image-side surface 812 being convex in a paraxial region thereof, and both the object-side surface 811 and the image-side surface 812 being aspheric. The first lens element 810 is made of plastic material.

The second lens element 820 with positive refractive power has an object-side surface 821 being convex in a paraxial region thereof, an image-side surface 822 being convex in a paraxial region thereof, and both the object-side surface 821 and the image-side surface 822 being aspheric. The second lens element 820 is made of plastic material.

The third lens element 830 with negative refractive power has an object-side surface 831 being convex in a paraxial region thereof, an image-side surface 832 being concave in a paraxial region thereof, and both the object-side surface 831 and the image-side surface 832 being aspheric. The third lens element 830 is made of plastic material.

The fourth lens element 840 with positive refractive power has an object-side surface 841 being concave in a paraxial region thereof, an image-side surface 842 being convex in a paraxial region thereof, and both the object-side surface 841 and the image-side surface 842 being aspheric. The fourth lens element 840 is made of plastic material.

The fifth lens element 850 with negative refractive power has an object-side surface 851 being concave in a paraxial region thereof, an image-side surface 852 being concave in a paraxial region thereof, and both the object-side surface 851 and the image-side surface 852 being aspheric. The fifth lens element 850 is made of plastic material.

The sixth lens element 860 with negative refractive power has an object-side surface 861 being convex in a paraxial region thereof, an image-side surface 862 being concave in a paraxial region thereof, both the object-side surface 861 and the image-side surface 862 being aspheric, and at least one inflection point on the image-side surface 862. The sixth lens element 860 is made of plastic material.

The image capturing lens assembly further includes an IR cut filter 870 located between the sixth lens element 860 and an image surface 880. The IR cut filter 870 is made of glass material and will not affect the focal length of the image capturing lens assembly. The image sensor 890 is disposed on or near the image surface 880 of the image capturing lens assembly.

The detailed optical data of the 8th embodiment are shown in TABLE 21, and the aspheric surface data are shown in TABLE 22, wherein the units of the curvature radius, the thickness and the focal length are expressed in mm, and HFOV is a half of the maximal field of view.

TABLE 21

(8th Embodiment)
f = 2.03 mm, Fno = 2.05, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.065 | | | | |
| 2 | Lens 1 | −5.935 | ASP | 0.349 | Plastic | 1.544 | 55.9 | 7162.76 |
| 3 | | −6.049 | ASP | 0.054 | | | | |
| 4 | Lens 2 | 3.815 | ASP | 0.280 | Plastic | 1.544 | 55.9 | 2.48 |
| 5 | | −2.033 | ASP | −0.120 | | | | |
| 6 | Stop | Plano | | 0.150 | | | | |
| 7 | Lens 3 | 11.684 | ASP | 0.210 | Plastic | 1.660 | 20.4 | −7.50 |
| 8 | | 3.452 | ASP | 0.239 | | | | |
| 9 | Lens 4 | −1.912 | ASP | 0.835 | Plastic | 1.544 | 55.9 | 1.64 |
| 10 | | −0.703 | ASP | 0.030 | | | | |
| 11 | Lens 5 | −15.804 | ASP | 0.300 | Plastic | 1.660 | 20.4 | −4.08 |
| 12 | | 3.272 | ASP | 0.030 | | | | |
| 13 | Lens 6 | 0.787 | ASP | 0.320 | Plastic | 1.544 | 55.9 | −5.09 |
| 14 | | 0.525 | ASP | 0.500 | | | | |
| 15 | IR Cut Filter | Plano | | 0.110 | Glass | 1.517 | 64.2 | — |
| 16 | | Plano | | 0.399 | | | | |
| 17 | Image Surface | Plano | | — | | | | |

*Reference wavelength is d-line 587.6 nm.
*The effective radius of Surface 6 of the stop is 0.650 mm.

TABLE 22

Aspheric Coefficients

| Surface # | | | | |
|---|---|---|---|---|
| | 2 | 3 | 4 | 5 |
| k = | 0.0000E+00 | −1.4670E+01 | −3.3730E+01 | −8.3084E+00 |
| A4 = | −2.8147E−01 | −1.1302E+00 | −6.9593E−01 | 3.4498E−01 |
| A6 = | −5.9666E−01 | −5.9362E−01 | −1.3599E+00 | −5.4598E+00 |
| A8 = | 2.9147E+00 | 6.5746E+00 | −2.5688E−01 | 2.0249E+01 |
| A10 = | −9.5408E+00 | −1.2908E+01 | 2.0539E+01 | −3.8241E+01 |
| A12 = | | | −5.3538E+01 | 2.5537E+01 |

| Surface # | | | | |
|---|---|---|---|---|
| | 7 | 8 | 9 | 10 |
| k = | −8.6338E+01 | −1.7030E+01 | −1.3125E+01 | −2.0568E+00 |
| A4 = | −1.7166E−01 | −3.4921E−01 | −2.4362E−01 | −1.2983E−01 |
| A6 = | −3.2609E+00 | 1.7689E−01 | 4.1783E−01 | −8.2622E−02 |
| A8 = | 1.6997E+01 | 8.7606E−01 | −4.3965E−02 | 4.6320E−01 |
| A10 = | −4.0117E+01 | −2.6779E+00 | −3.9533E−01 | −8.7985E−01 |
| A12 = | 4.4005E+01 | 3.0703E+00 | 3.6842E−01 | 8.1057E−01 |
| A14 = | −1.7390E+01 | −1.6719E+00 | −1.3124E−01 | −3.2800E−01 |
| A16 = | | 3.6510E−01 | | 4.7227E−02 |

| Surface # | | | | |
|---|---|---|---|---|
| | 11 | 12 | 13 | 14 |
| k = | −1.0000E+00 | −2.9894E+01 | −3.0326E+01 | −2.8300E+00 |
| A4 = | 1.6556E−01 | 2.6357E−01 | −1.5685E−01 | −1.5825E−01 |
| A6 = | −4.8674E−02 | −3.6537E−01 | 2.6482E−02 | 7.2407E−02 |

TABLE 22-continued

| Aspheric Coefficients | | | | |
|---|---|---|---|---|
| A8 = | −2.4620E−01 | 2.4020E−01 | −3.2741E−02 | −3.3717E−02 |
| A10 = | 3.0172E−01 | −9.7678E−02 | 2.8337E−02 | 1.1658E−02 |
| A12 = | −1.6409E−01 | 2.3993E−02 | −9.2099E−03 | −2.4976E−03 |
| A14 = | 4.2353E−02 | −3.1709E−03 | 1.3186E−03 | 2.8502E−04 |
| A16 = | −4.1203E−03 | 1.6907E−04 | −7.0755E−05 | −1.2938E−05 |

In the 8th embodiment, the equation of the aspheric surface profiles of the aforementioned lens elements is the same as the equation of the 1st embodiment. Also, the definitions of these parameters shown in TABLE 23 below are the same as those stated in the 1st embodiment with corresponding values for the 8th embodiment, so an explanation in this regard will not be provided again.

Moreover, these parameters can be calculated from TABLE 21 and TABLE 22 and satisfy the conditions stated in TABLE 23.

TABLE 23

| 8th Embodiment | | | |
|---|---|---|---|
| f [mm] | 2.03 | |f/f5| | 0.50 |
| Fno. | 2.05 | |f/f6| | 0.40 |
| HFOV [deg.] | 60.0 | SL/f | 1.85 |
| FOV [deg.] | 119.9 | TL/f | 1.82 |
| Nmax | 1.660 | SD/TD | 1.02 |
| (V3 + V5)/V1 | 0.73 | 1/tan(HFOV) | 0.58 |
| CT4/(ΣCT − CT4) | 0.57 | f/EPD | 2.05 |
| ΣAT/ΣCT | 0.17 | ImgH/R12 | 4.35 |
| |R2/R1| | 1.02 | TL/ImgH | 1.61 |
| (R11 − R12)/(R11 + R12) | 0.20 | TL/(ImgH * tan(HFOV)) | 0.93 |
| f/f2 | 0.82 | θstop [deg.] | 60.0 |
| |f/f1| | 0.0003 | |dsr1/dsr2| | 0.16 |
| |f/f2| | 0.82 | Yc62/f | 0.66 |
| |f/f3| | 0.27 | Y11/Y62 | 0.25 |
| |f/f4| | 1.23 | | |

9th Embodiment

Figure 9A:
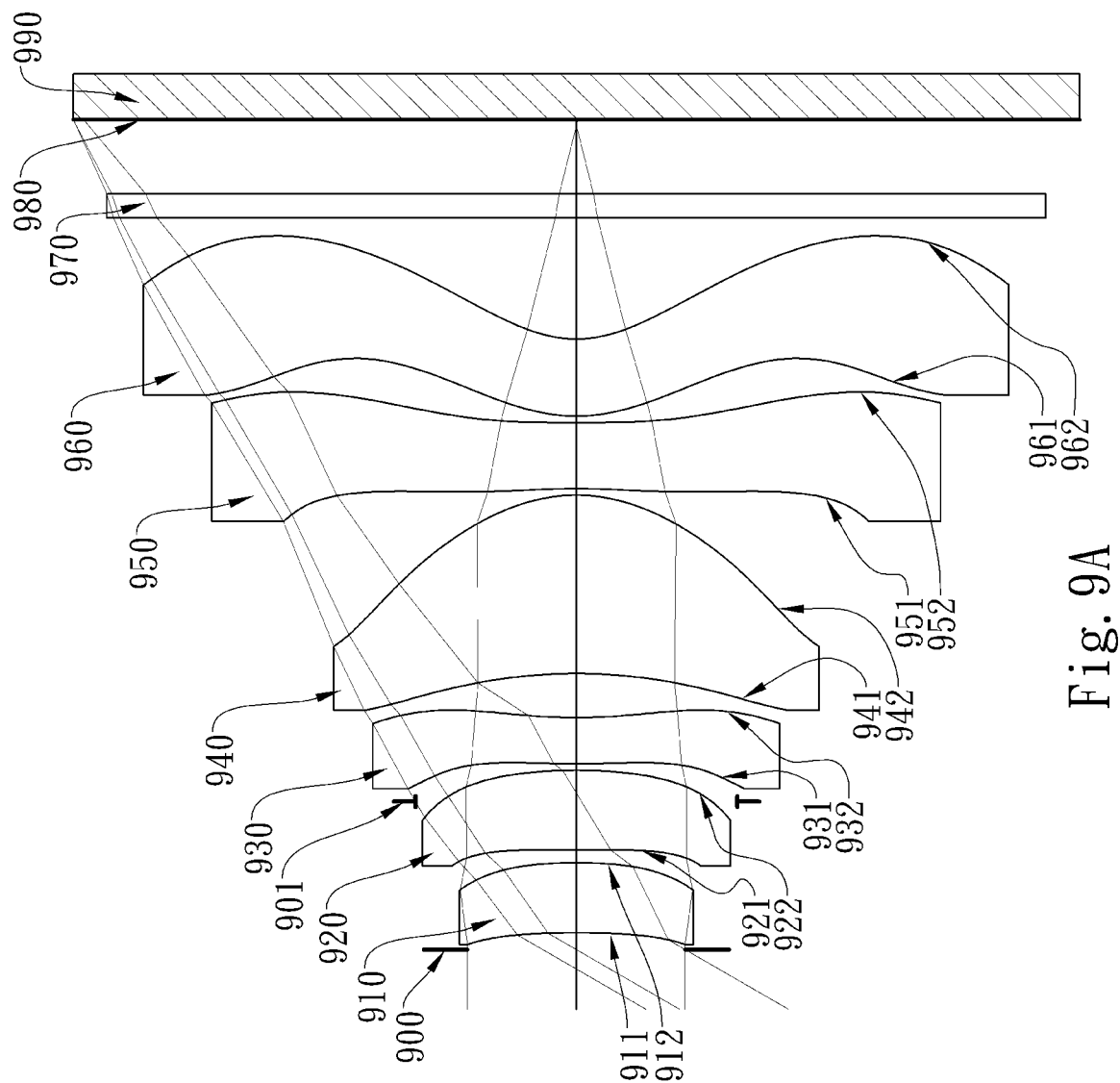
FIG. 9A is a schematic view of an imaging apparatus according to the 9th embodiment of the present disclosure.
Figure 9B:
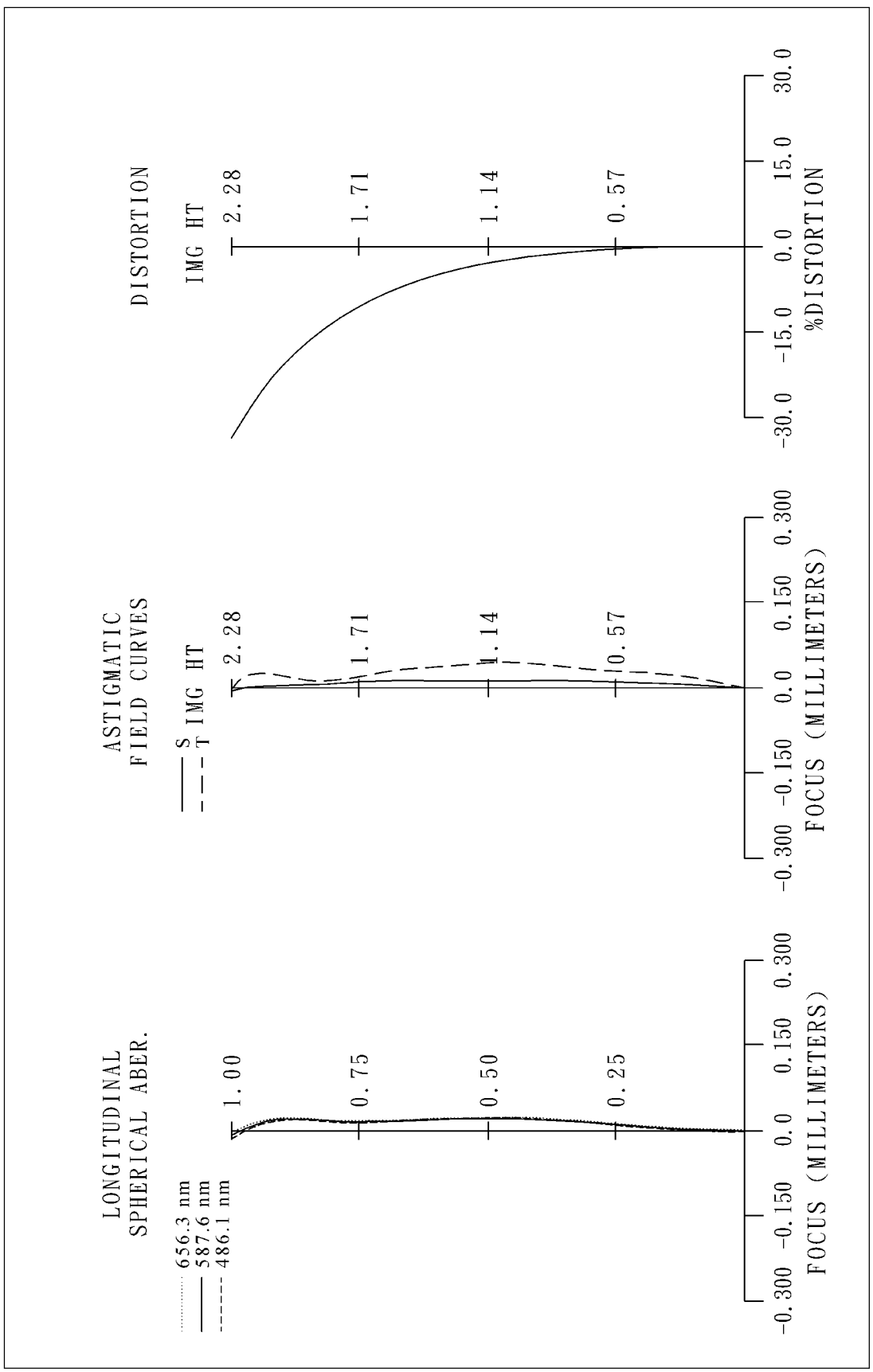
FIG. 9B shows longitudinal spherical aberration curves, astigmatic field curves and a distortion curve of the imaging apparatus according to the 9th embodiment.

FIG. 9A is a schematic view of an imaging apparatus according to the 9th embodiment of the present disclosure. FIG. 9B shows, in order from left to right, longitudinal spherical aberration curves, astigmatic field curves and a distortion curve of the imaging apparatus according to the 9th embodiment.

In FIG. 9A, the imaging apparatus includes an image capturing lens assembly (not otherwise herein labeled) of the present disclosure and an image sensor 990. The image capturing lens assembly includes, in order from an object side to an image side, an aperture stop 900, a first lens element 910, a second lens element 920, a stop 901, a third lens element 930, a fourth lens element 940, a fifth lens element 950 and a sixth lens element 960.

The first lens element 910 with positive refractive power has an object-side surface 911 being concave in a paraxial region thereof, an image-side surface 912 being convex in a paraxial region thereof, and both the object-side surface 911 and the image-side surface 912 being aspheric. The first lens element 910 is made of plastic material.

The second lens element 920 with positive refractive power has an object-side surface 921 being convex in a paraxial region thereof, an image-side surface 922 being convex in a paraxial region thereof, and both the object-side surface 921 and the image-side surface 922 being aspheric. The second lens element 920 is made of plastic material.

The third lens element 930 with negative refractive power has an object-side surface 931 being convex in a paraxial region thereof, an image-side surface 932 being concave in a paraxial region thereof, and both the object-side surface 931 and the image-side surface 932 being aspheric. The third lens element 930 is made of plastic material.

The fourth lens element 940 with positive refractive power has an object-side surface 941 being concave in a paraxial region thereof, an image-side surface 942 being convex in a paraxial region thereof, and both the object-side surface 941 and the image-side surface 942 being aspheric. The fourth lens element 940 is made of plastic material.

The fifth lens element 950 with negative refractive power has an object-side surface 951 being concave in a paraxial region thereof, an image-side surface 952 being concave in a paraxial region thereof, and both the object-side surface 951 and the image-side surface 952 being aspheric. The fifth lens element 950 is made of plastic material.

The sixth lens element 960 with negative refractive power has an object-side surface 961 being convex in a paraxial region thereof, an image-side surface 962 being concave in a paraxial region thereof, both the object-side surface 961 and the image-side surface 962 being aspheric, and at least one inflection point on the image-side surface 962. The sixth lens element 960 is made of plastic material.

The image capturing lens assembly further includes an IR cut filter 970 located between the sixth lens element 960 and an image surface 980. The IR cut filter 970 is made of glass material and will not affect the focal length of the image capturing lens assembly. The image sensor 990 is disposed on or near the image surface 980 of the image capturing lens assembly.

The detailed optical data of the 9th embodiment are shown in TABLE 24, and the aspheric surface data are shown in TABLE 25, wherein the units of the curvature radius, the thickness and the focal length are expressed in mm, and HFOV is a half of the maximal field of view.

TABLE 24

| (9th Embodiment) f = 2.03 mm, Fno = 2.05, HFOV = 59.9 deg. | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | 0.076 | | | | |
| 2 | Lens 1 | −4.525 | ASP | 0.318 | Plastic | 1.544 | 55.9 | 9.89 |
| 3 | | −2.518 | ASP | 0.057 | | | | |

TABLE 24-continued (9th Embodiment)
f = 2.03 mm, Fno = 2.05, HFOV = 59.9 deg.

| Surface # | | Curvature Radius | | Thickness | Material | Index | Abbe # | Focal Length |
|---|---|---|---|---|---|---|---|---|
| 4 | Lens 2 | 10.602 | ASP | 0.363 | Plastic | 1.544 | 55.9 | 3.63 |
| 5 | | −2.398 | ASP | −0.142 | | | | |
| 6 | Stop | Plano | | 0.172 | | | | |
| 7 | Lens 3 | 4.234 | ASP | 0.210 | Plastic | 1.634 | 23.8 | −7.70 |
| 8 | | 2.224 | ASP | 0.200 | | | | |
| 9 | Lens 4 | −2.417 | ASP | 0.811 | Plastic | 1.544 | 55.9 | 1.70 |
| 10 | | −0.747 | ASP | 0.029 | | | | |
| 11 | Lens 5 | −3.646 | ASP | 0.300 | Plastic | 1.660 | 20.4 | −4.27 |
| 12 | | 12.778 | ASP | 0.030 | | | | |
| 13 | Lens 6 | 0.750 | ASP | 0.350 | Plastic | 1.544 | 55.9 | −6.41 |
| 14 | | 0.516 | ASP | 0.550 | | | | |
| 15 | IR Cut Filter | Plano | | 0.110 | Glass | 1.517 | 64.2 | — |
| 16 | | Plano | | 0.336 | | | | |
| 17 | Image Surface | Plano | | — | | | | |

\*Reference wavelength is d-line 587.6 nm.
\*The effective radius of Surface 6 of the stop is 0.730 mm.

TABLE 25

Aspheric Coefficients

| | Surface # | | | |
|---|---|---|---|---|
| | 2 | 3 | 4 | 5 |
| k = | 1.7882E−09 | −6.7961E+01 | −7.0655E+01 | −1.1572E+00 |
| A4 = | −3.3839E−01 | −1.5039E+00 | −7.7141E−01 | −3.8641E−01 |
| A6 = | −3.8493E−01 | 2.8406E+00 | 3.6729E−02 | 1.2828E+00 |
| A8 = | 1.6883E+00 | −6.7216E+00 | 7.6569E+00 | −8.4264E+00 |
| A10 = | −8.1062E+00 | 1.1564E+01 | −6.2213E+01 | 1.9705E+01 |
| A12 = | | −1.8387E+01 | 1.8856E+02 | −2.2766E+01 |
| A14 = | | | −2.3939E+02 | 8.7325E+00 |

| | Surface # | | | |
|---|---|---|---|---|
| | 7 | 8 | 9 | 10 |
| k = | −7.7490E+01 | −1.9666E+01 | −1.3490E+01 | −2.0312E+00 |
| A4 = | −6.4566E−01 | −2.1924E−01 | −1.3706E−01 | −1.2540E−01 |
| A6 = | 1.2122E+00 | −1.0522E−02 | 4.2085E−01 | 1.8432E−04 |
| A8 = | −5.2637E+00 | −2.6821E−01 | −1.4044E+00 | 8.2769E−02 |
| A10 = | 9.8294E+00 | 7.4509E−01 | 2.5396E+00 | −4.4507E−01 |
| A12 = | −6.9045E+00 | −5.9100E−01 | −2.1776E+00 | 6.7498E−01 |
| A14 = | 1.5475E+00 | 1.3986E−01 | 8.5625E−01 | −3.5335E−01 |
| A16 = | | | −1.2410E−01 | 6.0084E−02 |

| | Surface # | | | |
|---|---|---|---|---|
| | 11 | 12 | 13 | 14 |
| k = | −1.0000E+00 | −1.0000E+00 | −2.5565E+00 | −2.5487E+00 |
| A4 = | 4.3614E−01 | 3.4845E−01 | −2.6086E−01 | −2.0122E−01 |
| A6 = | −6.0225E−01 | −5.4049E−01 | 1.3477E−01 | 1.1089E−01 |
| A8 = | 4.1180E−01 | 4.1122E−01 | −1.1723E−01 | −5.2516E−02 |
| A10 = | −1.4726E−01 | −1.8678E−01 | 7.0546E−02 | 1.7929E−02 |
| A12 = | 1.8712E−02 | 4.9620E−02 | −2.0916E−02 | −3.9977E−03 |
| A14 = | 2.5679E−04 | −6.9900E−03 | 2.9608E−03 | 4.9635E−04 |
| A16 = | −6.6298E−05 | 3.9621E−04 | −1.6187E−04 | −2.5027E−05 |

In the 9th embodiment, the equation of the aspheric surface profiles of the aforementioned lens elements is the same as the equation of the 1st embodiment. Also, the definitions of these parameters shown in TABLE 26 below are the same as those stated in the 1st embodiment with corresponding values for the 9th embodiment, so an explanation in this regard will not be provided again.

Moreover, these parameters can be calculated from TABLE 24 and TABLE 25 and satisfy the conditions stated in TABLE 26.

TABLE 26

9th Embodiment

| | | | |
|---|---|---|---|
| f [mm] | 2.03 | \|f/f5\| | 0.47 |
| Fno. | 2.05 | \|f/f6\| | 0.32 |
| HFOV [deg.] | 59.9 | SL/f | 1.86 |
| FOV [deg.] | 119.9 | TL/f | 1.82 |
| Nmax | 1.660 | SD/TD | 1.03 |
| (V3 + V5)/V1 | 0.79 | 1/tan(HFOV) | 0.58 |
| CT4/(ΣCT − CT4) | 0.53 | f/EPD | 2.05 |
| ΣAT/ΣCT | 0.15 | ImgH/R12 | 4.43 |
| \|R2/R1\| | 0.56 | TL/ImgH | 1.62 |
| (R11 − R12)/(R11 + R12) | 0.19 | TL/(ImgH * tan(HFOV)) | 0.94 |
| f/f2 | 0.56 | θstop [deg.] | 59.9 |
| \|f/f1\| | 0.20 | \|dsr1/dsr2\| | 0.19 |
| \|f/f2\| | 0.56 | Yc62/f | 0.67 |
| \|f/f3\| | 0.26 | Y11/Y62 | 0.25 |
| \|f/f4\| | 1.19 | | |

10th Embodiment

Figure 10A:
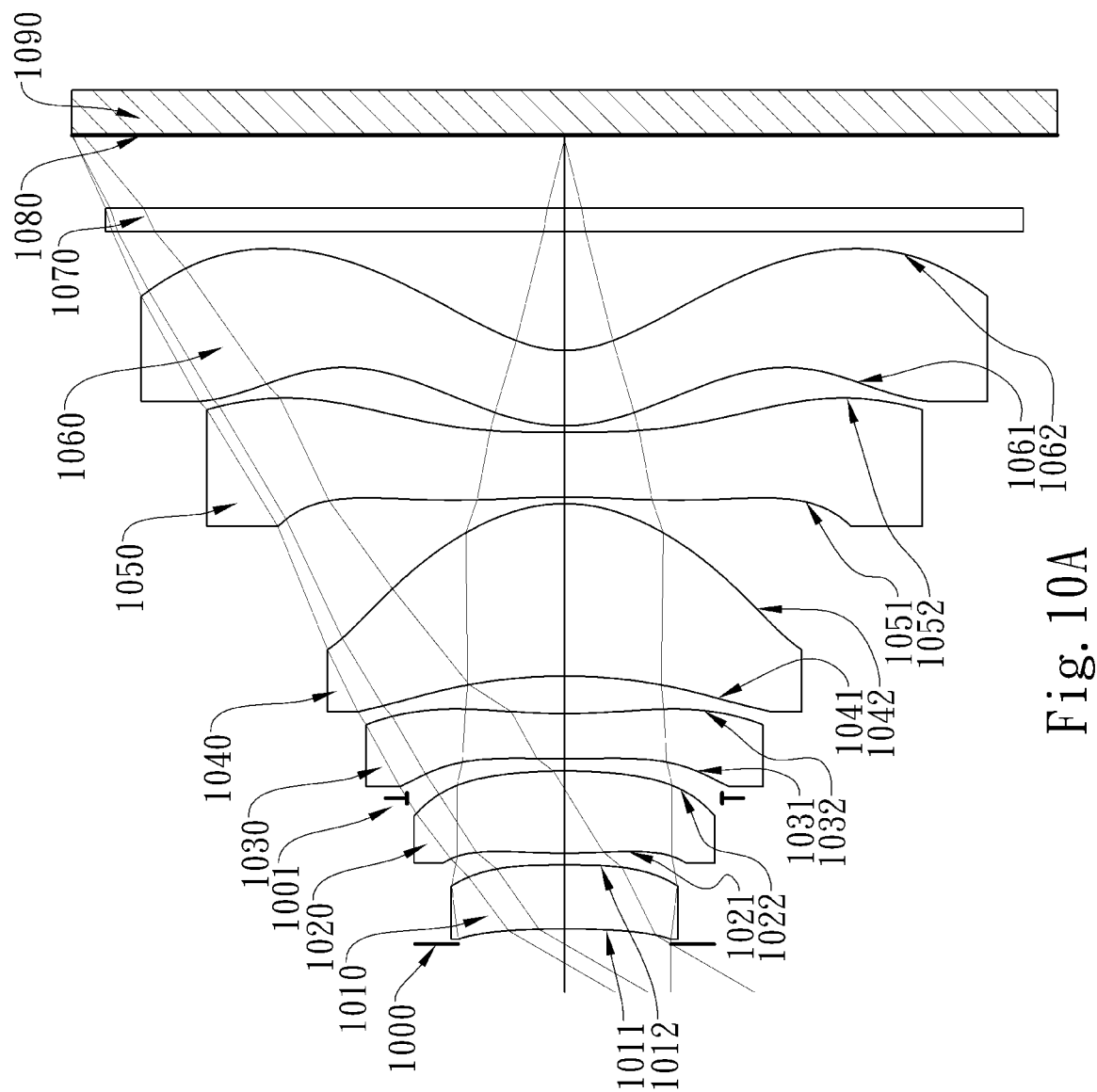
FIG. 10A is a schematic view of an imaging apparatus according to the 10th embodiment of the present disclosure.
Figure 10B:
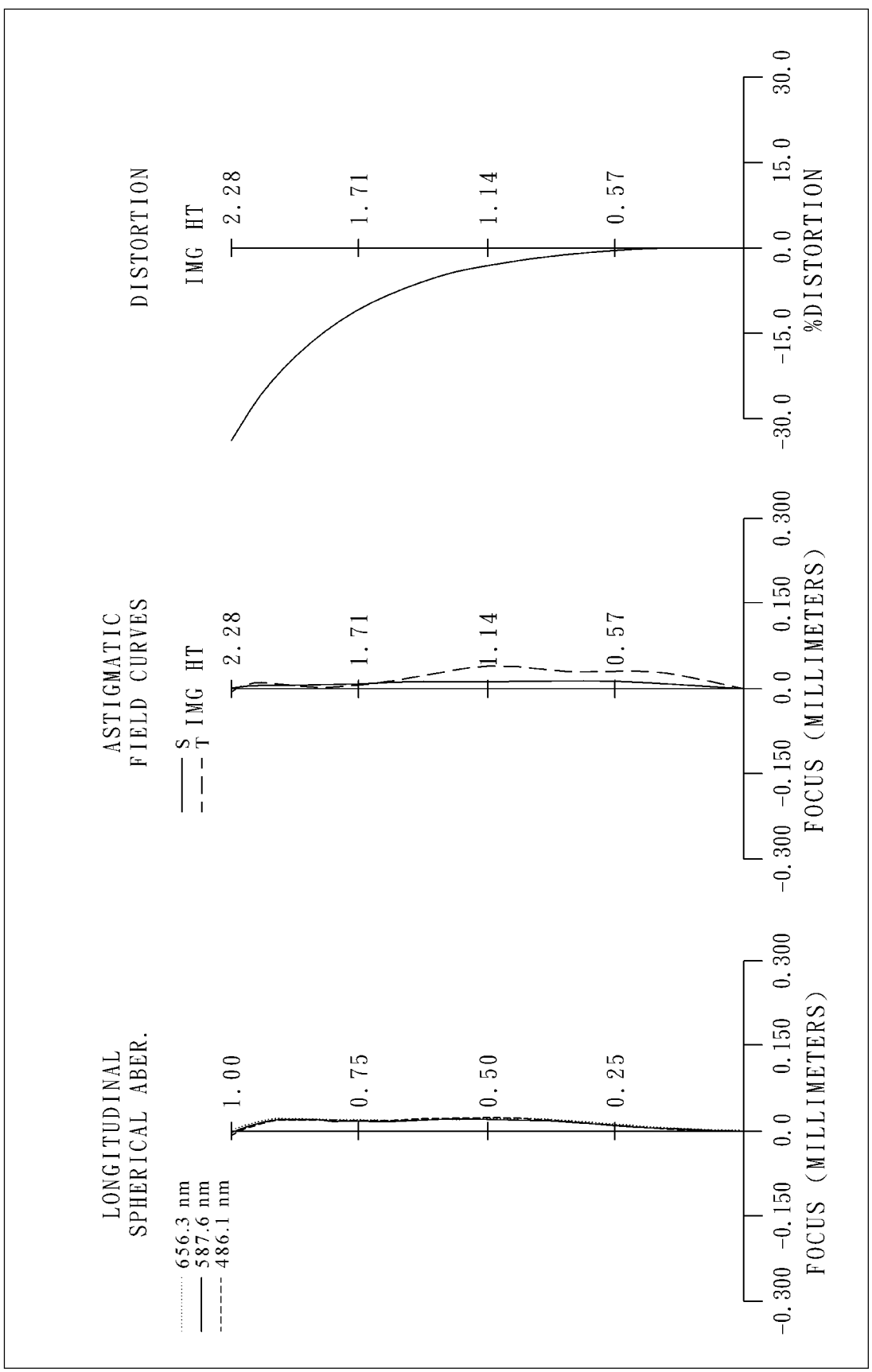
FIG. 10B shows longitudinal spherical aberration curves, astigmatic field curves and a distortion curve of the imaging apparatus according to the 10th embodiment.

FIG. 10A is a schematic view of an imaging apparatus according to the 10th embodiment of the present disclosure. FIG. 10B shows, in order from left to right, longitudinal spherical aberration curves, astigmatic field curves and a distortion curve of the imaging apparatus according to the 10th embodiment.

In FIG. 10A, the imaging apparatus includes an image capturing lens assembly (not otherwise herein labeled) of the present disclosure and an image sensor 1090. The image capturing lens assembly includes, in order from an object side to an image side, an aperture stop 1000, a first lens element 1010, a second lens element 1020, a stop 1001, a third lens element 1030, a fourth lens element 1040, a fifth lens element 1050 and a sixth lens element 1060.

The first lens element 1010 with negative refractive power has an object-side surface 1011 being concave in a paraxial region thereof, an image-side surface 1012 being convex in a paraxial region thereof, and both the object-side surface 1011 and the image-side surface 1012 being aspheric. The first lens element 1010 is made of plastic material.

The second lens element 1020 with positive refractive power has an object-side surface 1021 being convex in a paraxial region thereof, an image-side surface 1022 being convex in a paraxial region thereof, and both the object-side surface 1021 and the image-side surface 1022 being aspheric. The second lens element 1020 is made of plastic material.

The third lens element 1030 with negative refractive power has an object-side surface 1031 being convex in a paraxial region thereof, an image-side surface 1032 being concave in a paraxial region thereof, and both the object-side surface 1031 and the image-side surface 1032 being aspheric. The third lens element 1030 is made of plastic material.

The fourth lens element 1040 with positive refractive power has an object-side surface 1041 being concave in a paraxial region thereof, an image-side surface 1042 being convex in a paraxial region thereof, and both the object-side surface 1041 and the image-side surface 1042 being aspheric. The fourth lens element 1040 is made of plastic material.

The fifth lens element 1050 with negative refractive power has an object-side surface 1051 being concave in a paraxial region thereof, an image-side surface 1052 being concave in a paraxial region thereof, and both the object-side surface 1051 and the image-side surface 1052 being aspheric. The fifth lens element 1050 is made of plastic material.

The sixth lens element 1060 with negative refractive power has an object-side surface 1061 being convex in a paraxial region thereof, an image-side surface 1062 being concave in a paraxial region thereof, both the object-side surface 1061 and the image-side surface 1062 being aspheric, and at least one inflection point on the image-side surface 1062. The sixth lens element 1060 is made of plastic material.

The image capturing lens assembly further includes an IR cut filter 1070 located between the sixth lens element 1060 and an image surface 1080. The IR cut filter 1070 is made of glass material and will not affect the focal length of the image capturing lens assembly. The image sensor 1090 is disposed on or near the image surface 1080 of the image capturing lens assembly.

The detailed optical data of the 10th embodiment are shown in TABLE 27, and the aspheric surface data are shown in TABLE 28, wherein the units of the curvature radius, the thickness and the focal length are expressed in mm, and HFOV is a half of the maximal field of view.

TABLE 27

(10th Embodiment)
f = 2.02 mm, Fno = 2.05, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.070 | | | | |
| 2 | Lens 1 | −5.254 | ASP | 0.297 | Plastic | 1.544 | 55.9 | −47.33 |
| 3 | | −6.733 | ASP | 0.054 | | | | |
| 4 | Lens 2 | 2.796 | ASP | 0.382 | Plastic | 1.544 | 55.9 | 2.59 |
| 5 | | −2.704 | ASP | −0.127 | | | | |
| 6 | Stop | Plano | | 0.184 | | | | |
| 7 | Lens 3 | 7.912 | ASP | 0.210 | Plastic | 1.639 | 23.3 | −7.22 |
| 8 | | 2.883 | ASP | 0.174 | | | | |
| 9 | Lens 4 | −2.456 | ASP | 0.801 | Plastic | 1.544 | 55.9 | 1.66 |
| 10 | | −0.737 | ASP | 0.030 | | | | |
| 11 | Lens 5 | −3.836 | ASP | 0.301 | Plastic | 1.660 | 20.4 | −4.48 |
| 12 | | 13.262 | ASP | 0.030 | | | | |
| 13 | Lens 6 | 0.757 | ASP | 0.350 | Plastic | 1.544 | 55.9 | −5.66 |
| 14 | | 0.509 | ASP | 0.550 | | | | |

TABLE 27-continued (10th Embodiment)
f = 2.02 mm, Fno = 2.05, HFOV = 60.0 deg.

| Surface # | | Curvature Radius | Thickness | Material | Index | Abbe # | Focal Length |
|---|---|---|---|---|---|---|---|
| 15 | IR Cut Filter | Plano | 0.110 | Glass | 1.517 | 64.2 | — |
| 16 | | Plano | 0.340 | | | | |
| 17 | Image Surface | Plano | — | | | | |

*Reference wavelength is d-line 587.6 nm.
*The effective radius of Surface 6 of the stop is 0.730 mm.

TABLE 28

Aspheric Coefficients

| | Surface # | | | |
|---|---|---|---|---|
| | 2 | 3 | 4 | 5 |
| k = | 1.1523E−09 | −6.7961E+01 | −7.0655E+01 | −1.1572E+00 |
| A4 = | −3.2110E−01 | −1.2902E+00 | −6.0844E−01 | −1.8470E−01 |
| A6 = | −3.1614E−01 | 1.5649E+00 | −4.6904E−01 | −4.1504E−02 |
| A8 = | 1.3052E+00 | −3.8772E+00 | 2.7519E+00 | −4.8698E+00 |
| A10 = | −6.4865E+00 | 1.0118E+01 | −2.8045E+01 | 1.4724E+01 |
| A12 = | | −1.9476E+01 | 1.0149E+02 | −1.9376E+01 |
| A14 = | | | −1.5124E+02 | 8.8326E+00 |

| | Surface # | | | |
|---|---|---|---|---|
| | 7 | 8 | 9 | 10 |
| k = | −7.7490E+01 | −1.9666E+01 | −1.3490E+01 | −2.0551E+00 |
| A4 = | −6.1607E−01 | −2.9589E−01 | −9.1667E−02 | −1.3602E−01 |
| A6 = | 5.7761E−01 | 4.5530E−02 | 5.5884E−02 | 8.3398E−03 |
| A8 = | −2.9376E+00 | −1.0359E−02 | −3.8572E−01 | 1.5927E−01 |
| A10 = | 6.4778E+00 | 2.6925E−01 | 1.2598E+00 | −5.4091E−01 |
| A12 = | −4.7611E+00 | −3.1450E−01 | −1.4032E+00 | 7.0196E−01 |
| A14 = | 1.0409E+00 | 8.7425E−02 | 6.3602E−01 | −3.4780E−01 |
| A16 = | | | −1.0048E−01 | 5.7684E−02 |

| | Surface # | | | |
|---|---|---|---|---|
| | 11 | 12 | 13 | 14 |
| k = | −1.0000E+00 | −1.0000E+00 | −2.5565E+00 | −2.5486E+00 |
| A4 = | 3.7798E−01 | 3.3694E−01 | −2.3875E−01 | −1.9857E−01 |
| A6 = | −4.0017E−01 | −4.5308E−01 | 1.1862E−01 | 1.1203E−01 |
| A8 = | 1.8228E−01 | 3.0803E−01 | −1.1159E−01 | −5.6470E−02 |
| A10 = | −2.3906E−02 | −1.3291E−01 | 6.9431E−02 | 2.0155E−02 |
| A12 = | −1.8097E−02 | 3.5146E−02 | −2.0814E−02 | −4.5364E−03 |
| A14 = | 6.8086E−03 | −5.0385E−03 | 2.9615E−03 | 5.5723E−04 |
| A16 = | −6.1846E−04 | 2.9198E−04 | −1.6241E−04 | −2.7673E−05 |

In the 10th embodiment, the equation of the aspheric surface profiles of the aforementioned lens elements is the same as the equation of the 1st embodiment. Also, the definitions of these parameters shown in TABLE 29 below are the same as those stated in the 1st embodiment with corresponding values for the 10th embodiment, so an explanation in this regard will not be provided again.

Moreover, these parameters can be calculated from TABLE 27 and TABLE 28 and satisfy the conditions stated in TABLE 29.

TABLE 29

10th Embodiment

| f [mm] | 2.02 | |f/f5| | 0.45 |
|---|---|---|---|
| Fno. | 2.05 | |f/f6| | 0.36 |
| HFOV [deg.] | 60.0 | SL/f | 1.86 |
| FOV [deg.] | 120.0 | TL/f | 1.82 |
| Nmax | 1.660 | SD/TD | 1.03 |
| (V3 + V5)/V1 | 0.78 | 1/tan(HFOV) | 0.58 |
| CT4/(ΣCT − CT4) | 0.52 | f/EPD | 2.05 |
| ΣAT/ΣCT | 0.15 | ImgH/R12 | 4.49 |
| |R2/R1| | 1.28 | TL/ImgH | 1.61 |
| (R11 − R12)/(R11 + R12) | 0.20 | TL/(ImgH * tan(HFOV)) | 0.93 |
| f/f2 | 0.78 | θstop [deg.] | 60.0 |
| |f/f1| | 0.04 | |dsr1/dsr2| | 0.19 |
| |f/f2| | 0.78 | Yc62/f | 0.67 |
| |f/f3| | 0.28 | Y11/Y62 | 0.25 |
| |f/f4| | 1.22 | | |

11th Embodiment

Figure 11A:
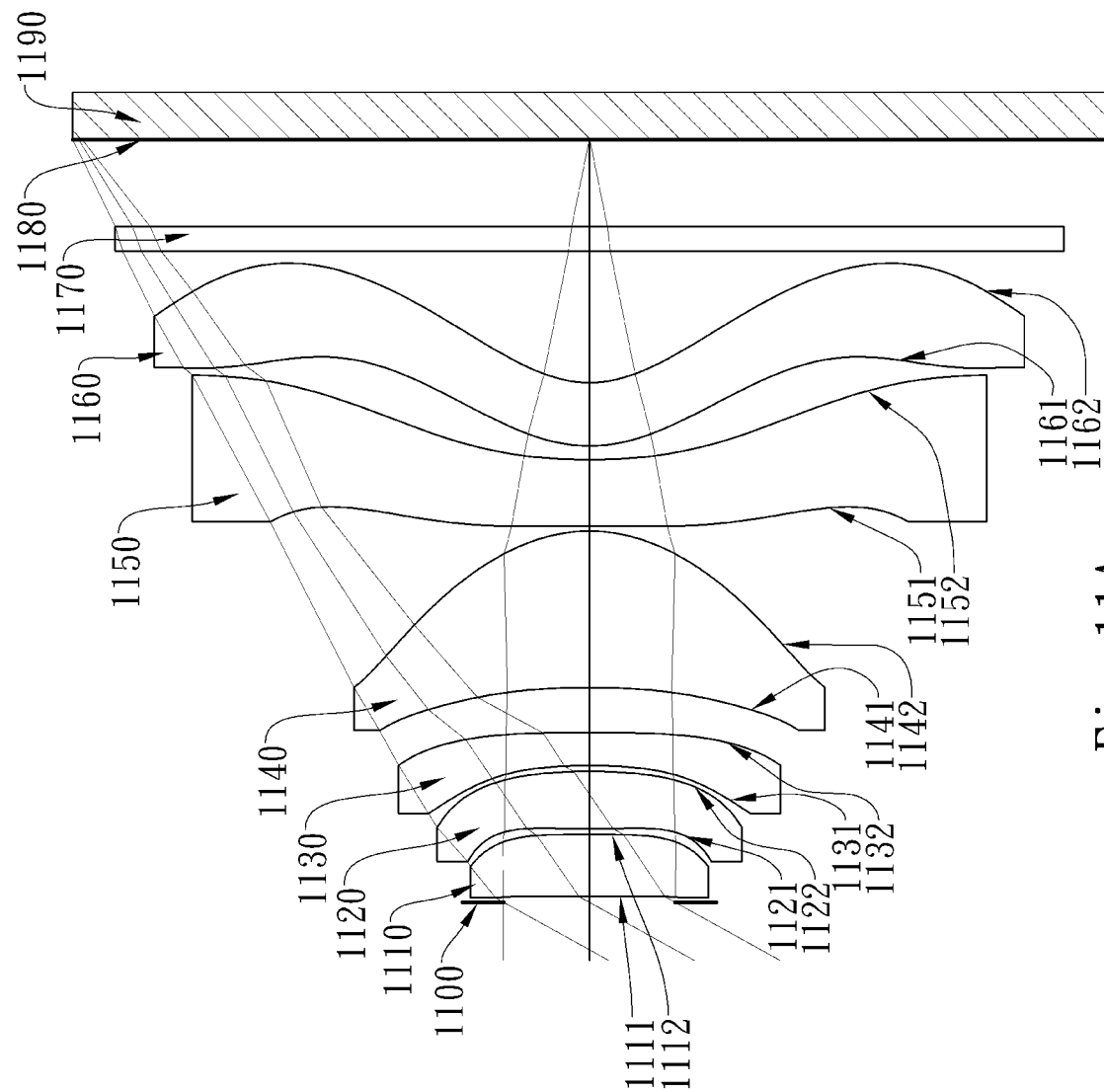
FIG. 11A is a schematic view of an imaging apparatus according to the 11th embodiment of the present disclosure.
Figure 11B:
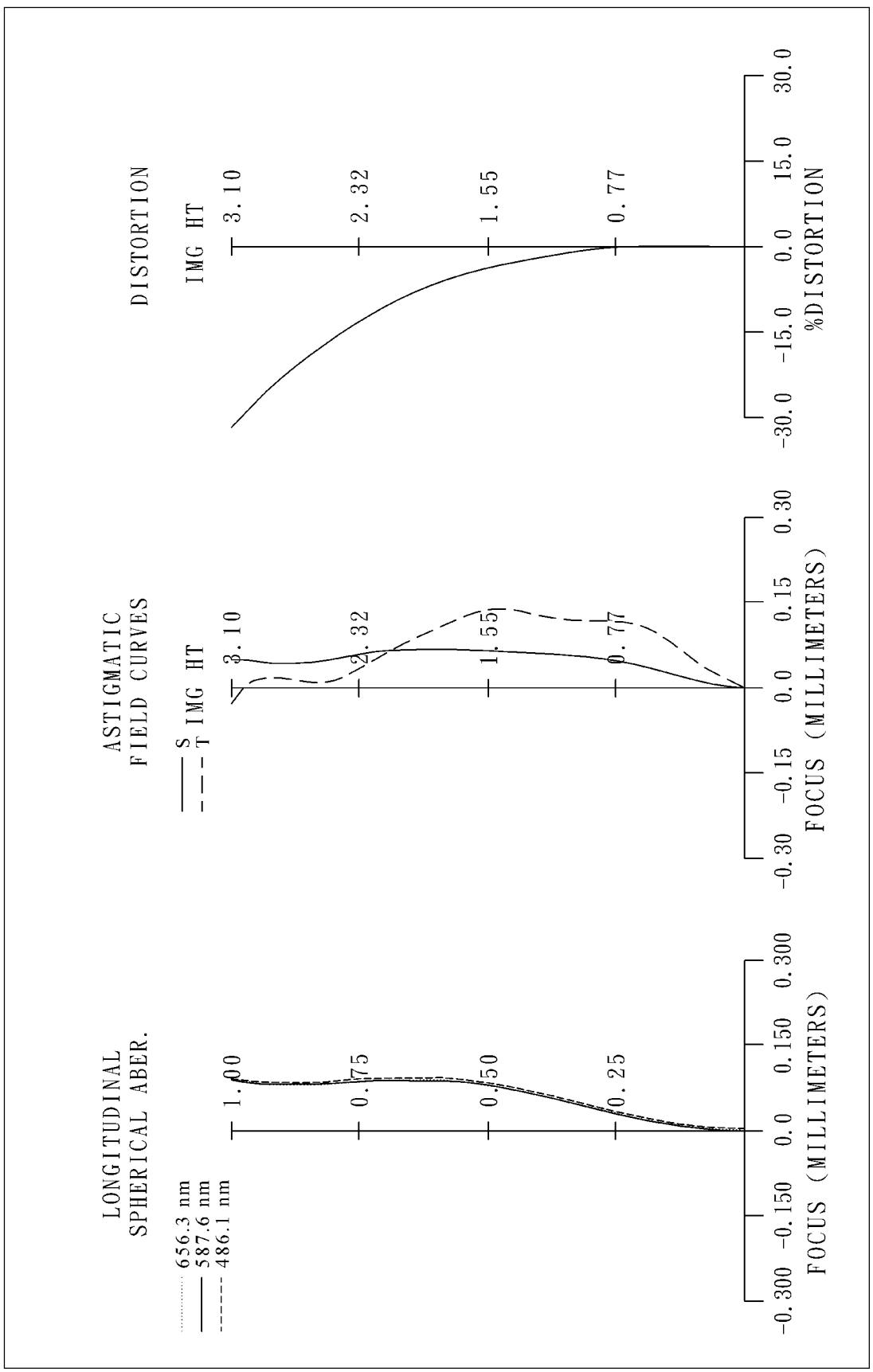
FIG. 11B shows longitudinal spherical aberration curves, astigmatic field curves and a distortion curve of the imaging apparatus according to the 11th embodiment.

FIG. 11A is a schematic view of an imaging apparatus according to the 11th embodiment of the present disclosure. FIG. 11B shows, in order from left to right, longitudinal spherical aberration curves, astigmatic field curves and a distortion curve of the imaging apparatus according to the 11th embodiment.

In FIG. 11A, the imaging apparatus includes an image capturing lens assembly (not otherwise herein labeled) of the present disclosure and an image sensor 1190. The image capturing lens assembly includes, in order from an object side to an image side, an aperture stop 1100, a first lens element 1110, a second lens element 1120, a third lens element 1130, a fourth lens element 1140, a fifth lens element 1150 and a sixth lens element 1160.

The first lens element 1110 with positive refractive power has an object-side surface 1111 being convex in a paraxial region thereof, an image-side surface 1112 being concave in a paraxial region thereof, and both the object-side surface 1111 and the image-side surface 1112 being aspheric. The first lens element 1110 is made of plastic material.

The second lens element 1120 with positive refractive power has an object-side surface 1121 being convex in a paraxial region thereof, an image-side surface 1122 being convex in a paraxial region thereof, and both the object-side surface 1121 and the image-side surface 1122 being aspheric. The second lens element 1120 is made of plastic material.

The third lens element 1130 with negative refractive power has an object-side surface 1131 being concave in a paraxial region thereof, an image-side surface 1132 being convex in a paraxial region thereof, and both the object-side surface 1131 and the image-side surface 1132 being aspheric. The third lens element 1130 is made of plastic material.

The fourth lens element 1140 with positive refractive power has an object-side surface 1141 being concave in a paraxial region thereof, an image-side surface 1142 being convex in a paraxial region thereof, and both the object-side surface 1141 and the image-side surface 1142 being aspheric. The fourth lens element 1140 is made of plastic material.

The fifth lens element 1150 with negative refractive power has an object-side surface 1151 being concave in a paraxial region thereof, an image-side surface 1152 being concave in a paraxial region thereof, and both the object-side surface 1151 and the image-side surface 1152 being aspheric. The fifth lens element 1150 is made of plastic material.

The sixth lens element 1160 with negative refractive power has an object-side surface 1161 being convex in a paraxial region thereof, an image-side surface 1162 being concave in a paraxial region thereof, both the object-side surface 1161 and the image-side surface 1162 being aspheric, and at least one inflection point on the image-side surface 1162. The sixth lens element 1160 is made of plastic material.

The image capturing lens assembly further includes an IR cut filter 1170 located between the sixth lens element 1160 and an image surface 1180. The IR cut filter 1170 is made of glass material and will not affect the focal length of the image capturing lens assembly. The image sensor 1190 is disposed on or near the image surface 1180 of the image capturing lens assembly.

The detailed optical data of the 11th embodiment are shown in TABLE 30, and the aspheric surface data are shown in TABLE 31, wherein the units of the curvature radius, the thickness and the focal length are expressed in mm, and HFOV is a half of the maximal field of view.

TABLE 30

(11th Embodiment)
f = 2.55 mm, Fno = 2.45, HFOV = 61.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.035 | | | | |
| 2 | Lens 1 | 22.422 | ASP | 0.376 | Plastic | 1.535 | 55.8 | 82.23 |
| 3 | | 45.467 | ASP | 0.035 | | | | |
| 4 | Lens 2 | 5.651 | ASP | 0.350 | Plastic | 1.544 | 55.9 | 3.72 |
| 5 | | −3.082 | ASP | 0.035 | | | | |
| 6 | Lens 3 | −3.458 | ASP | 0.200 | Plastic | 1.634 | 23.8 | −5.98 |
| 7 | | −39.928 | ASP | 0.274 | | | | |
| 8 | Lens 4 | −5.125 | ASP | 0.951 | Plastic | 1.544 | 55.9 | 2.02 |
| 9 | | −0.964 | ASP | 0.030 | | | | |
| 10 | Lens 5 | −22.462 | ASP | 0.405 | Plastic | 1.634 | 23.8 | −4.92 |
| 11 | | 3.651 | ASP | 0.083 | | | | |
| 12 | Lens 6 | 0.882 | ASP | 0.384 | Plastic | 1.530 | 55.8 | −13.48 |
| 13 | | 0.666 | ASP | 0.800 | | | | |
| 14 | IR Cut Filter | Plano | | 0.150 | Glass | 1.517 | 64.2 | — |
| 15 | | Plano | | 0.528 | | | | |
| 16 | Image Surface | Plano | | — | | | | |

*Reference wavelength is d-line 587.6 nm.

TABLE 31

Aspheric Coefficients

| Surface # | 2 | 3 | 4 | 5 |
|---|---|---|---|---|
| k = | −9.0000E+01 | −1.0000E+00 | −9.0000E+01 | −1.6368E+00 |
| A4 = | −1.2210E−01 | −5.4304E−01 | −4.2608E−01 | 3.6923E−02 |
| A6 = | 1.1947E−01 | −4.7053E−01 | −4.0097E−01 | −1.0696E+00 |
| A8 = | −2.9866E−01 | 9.8637E−01 | −2.9092E−01 | 2.1410E+00 |
| A10 = | −7.8382E−01 | −1.5196E+00 | 8.3283E−01 | −2.1530E+00 |
| A12 = | | | −2.1463E+00 | 7.0931E−01 |

| Surface # | 6 | 7 | 8 | 9 |
|---|---|---|---|---|
| k = | −1.0000E+00 | −1.0000E+00 | −1.5400E+00 | −1.5999E+00 |
| A4 = | −1.5774E−01 | −1.2675E−01 | −9.9443E−02 | −4.4397E−02 |
| A6 = | −6.5617E−01 | 9.3373E−03 | 6.2769E−02 | −4.1428E−02 |
| A8 = | 1.8735E+00 | 1.2529E−01 | 2.6383E−02 | 7.2612E−02 |
| A10 = | −2.2389E+00 | −1.9788E−01 | −5.3368E−02 | −6.4788E−02 |
| A12 = | 1.2960E+00 | 1.2896E−01 | 2.4086E−02 | 3.3107E−02 |
| A14 = | −2.7607E−01 | −4.2470E−02 | −4.5089E−03 | −7.4804E−03 |
| A16 = | | 5.5715E−03 | | 5.6636E−04 |

| Surface # | 10 | 11 | 12 | 13 |
|---|---|---|---|---|
| k = | −2.5729E+01 | −7.8322E+00 | −2.1057E+00 | −2.1728E+00 |
| A4 = | 9.4180E−02 | 1.0823E−01 | −4.7758E+00 | −7.5234E−02 |
| A6 = | −1.7178E−02 | −7.7769E−02 | 6.6598E+00 | 1.8516E−02 |
| A8 = | −2.4031E−02 | 2.7665E−02 | −2.4385E+01 | −4.5553E−03 |
| A10 = | 1.6437E−02 | −6.0668E−03 | 6.9334E+01 | 7.8677E−04 |
| A12 = | −4.8023E−03 | 8.0756E−04 | −9.0007E+01 | −8.6323E−05 |
| A14 = | 6.7712E−04 | −5.8784E−05 | 5.4210E+01 | 5.5384E−06 |
| A16 = | −3.7210E−05 | 1.7689E−06 | −1.2559E+01 | −1.5537E−07 |

In the 11th embodiment, the equation of the aspheric surface profiles of the aforementioned lens elements is the same as the equation of the 1st embodiment. Also, the definitions of these parameters shown in TABLE 32 below are the same as those stated in the 1st embodiment with corresponding values for the 11th embodiment, so an explanation in this regard will not be provided again.

Moreover, these parameters can be calculated from TABLE 30 and TABLE 31 and satisfy the conditions stated in TABLE 32.

TABLE 32

11th Embodiment

| | | | |
|---|---|---|---|
| f [mm] | 2.55 | |f/f5| | 0.52 |
| Fno. | 2.45 | |f/f6| | 0.19 |
| HFOV [deg.] | 61.0 | SL/f | 1.82 |
| FOV [deg.] | 122.0 | TL/f | 1.80 |
| Nmax | 1.634 | SD/TD | 1.01 |
| (V3 + V5)/V1 | 0.86 | 1/tan(HFOV) | 0.55 |
| CT4/(ΣCT − CT4) | 0.55 | f/EPD | 2.45 |
| ΣAT/ΣCT | 0.17 | ImgH/R12 | 4.65 |
| |R2/R1| | 2.03 | TL/ImgH | 1.48 |
| (R11 − R12)/(R11 + R12) | 0.14 | TL/(ImgH * tan(HFOV)) | 0.82 |
| f/f2 | 0.69 | θstop [deg.] | 61.0 |
| |f/f1| | 0.03 | |dsr1/dsr2| | 0.09 |
| |f/f2| | 0.69 | Yc62/f | 0.72 |
| |f/f3| | 0.43 | Y11/Y62 | 0.22 |
| |f/f4| | 1.26 | | |

The foregoing description, for purpose of explanation, has been described with reference to specific embodiments. It is to be noted that TABLES 1-32 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens assembly comprising six lens elements, the six lens elements being, in order from an object side to an image side: a first lens element, a second lens element, a third lens element, a fourth lens element, a fifth lens element and a sixth lens element; each of the six lens elements comprising an object-side surface facing toward the object side and an image-side surface facing toward the image side;

wherein the object-side surface of the second lens element is convex in a paraxial region thereof, the object-side surface of the third lens element is convex in a paraxial region thereof, the image-side surface of the sixth lens element is aspheric and concave in a paraxial region thereof, and the image-side surface of the sixth lens element has at least one inflection point thereon;

wherein the image capturing lens assembly has a total of six lens elements; a maximum refractive index among the six lens elements is Nmax, a half of a maximal field of view of the image capturing lens assembly is HFOV, an axial distance between the object-side surface of the first lens element and an image surface is TL, a focal length of the image capturing lens assembly is f, and the following conditions are satisfied:

$1.660 \leq N\max < 1.72;$ $0 < 1/\tan(HFOV) < 0.70;$ and $1.50 < TL/f < 5.0.$

2. The image capturing lens assembly of claim 1, wherein the first lens element has negative refractive power and the image-side surface of the first lens element is concave in a paraxial region thereof.

3. The image capturing lens assembly of claim 1, wherein the object-side surface of the fifth lens element is convex in a paraxial region thereof.

4. The image capturing lens assembly of claim 1, wherein the focal length of the image capturing lens assembly is f, an entrance pupil diameter of the image capturing lens assembly is EPD, and the following condition is satisfied:

$1.25 < f/EPD < 2.30.$

5. The image capturing lens assembly of claim 4, wherein the third lens element has positive refractive power and the image-side surface of the second lens element is concave in a paraxial region thereof.

6. The image capturing lens assembly of claim 1, wherein the focal length of the image capturing lens assembly is f, a focal length of the fourth lens element is f4, a focal length of the i-th lens element is fi, and the following condition is satisfied:

$|f/fi| < |f/f4|, i=1,2,3,5,6.$

7. The image capturing lens assembly of claim 1, wherein an Abbe number of the first lens element is V1, an Abbe number of the third lens element is V3, an Abbe number of the fifth lens element is V5, and the following condition is satisfied:

$0.3 < (V3+V5)/V1 < 1.0.$

8. The image capturing lens assembly of claim 1, wherein the axial distance between the object-side surface of the first lens element and the image surface is TL, a maximum image height of the image capturing lens assembly is ImgH, and the following condition is satisfied:

$TL/\text{Img}H < 1.80.$

9. The image capturing lens assembly of claim 1, further comprising an aperture stop and wherein a maximum image height of the image capturing lens assembly is ImgH, a curvature radius of the image-side surface of the sixth lens element is R12, an angle between a chief ray of the maximum image height and an optical axis at the aperture stop is θstop, and the following conditions are satisfied:

$1.0 < \text{Img}H/R12 < 8.0;$ and $55 \text{ degrees} < \theta\text{stop} < 80 \text{ degrees}.$ 10. The image capturing lens assembly of claim 1, wherein a central thickness of the second lens element is larger than a central thickness of the third lens element.

11. An imaging apparatus, comprising the image capturing lens assembly of claim 1 and an image sensor disposed on the image surface of the image capturing lens assembly.

12. An electronic device, comprising the imaging apparatus of claim 11.

13. An image capturing lens assembly comprising six lens elements, the six lens elements being, in order from an object side to an image side: a first lens element, a second lens element, a third lens element, a fourth lens element, a fifth lens element and a sixth lens element; each of the six lens elements comprising an object-side surface facing toward the object side and an image-side surface facing toward the image side;

wherein the second lens element has positive refractive power, the image-side surface of the sixth lens element is aspheric and concave in a paraxial region thereof, and the image-side surface of the sixth lens element has at least one inflection point thereon;

wherein the image capturing lens assembly has a total of six lens elements; a maximum refractive index among the six lens elements is Nmax, a half of a maximal field of view of the image capturing lens assembly is HFOV, an axial distance between the object-side surface of the first lens element and an image surface is TL, a focal length of the image capturing lens assembly is f, and the following conditions are satisfied:

$1.660 \leq N\max < 1.72;$ $0 < 1/\tan(HFOV) < 0.70;$ and $1.70 < TL/f < 4.0.$

14. The image capturing lens assembly of claim 13, wherein the first lens element has negative refractive power and the image-side surface of the first lens element is concave in a paraxial region thereof.

15. The image capturing lens assembly of claim 13, wherein the third lens element has negative refractive power and the image-side surface of the third lens element is concave in a paraxial region thereof.

16. The image capturing lens assembly of claim 13, wherein the fourth lens element has positive refractive power and the image-side surface of the fourth lens element is convex in a paraxial region thereof.

17. The image capturing lens assembly of claim 13, wherein the object-side surface of the fourth lens element is convex in a paraxial region thereof.

18. The image capturing lens assembly of claim 13, wherein the object-side surface of the fifth lens element is convex in a paraxial region thereof.

19. The image capturing lens assembly of claim 13, wherein the focal length of the image capturing lens assembly is f, an entrance pupil diameter of the image capturing lens assembly is EPD, a vertical distance between an off-axial critical point on the image-side surface of the sixth lens element and an optical axis is Yc62, and the following conditions are satisfied:

$1.25 < f/EPD < 2.30;$ and $0.3 < Yc62/f < 1.2.$

20. The image capturing lens assembly of claim 19, wherein the object-side surface of the second lens element is convex in a paraxial region thereof, the object-side surface of the sixth lens element is convex in a paraxial region thereof, a curvature radius of the object-side surface of the first lens element is R1, a curvature radius of the image-side surface of the first lens element is R2, and the following condition is satisfied:

$|R2/R1| < 1.70.$

21. The image capturing lens assembly of claim 19, wherein a central thickness of the first lens element is larger than an axial distance between the fifth lens element and the sixth lens element, the focal length of the image capturing lens assembly is f, a focal length of the second lens element is f2, a focal length of the fourth lens element is f4, and the following condition is satisfied:

$$|f/f2|<|f/f4|.$$

22. The image capturing lens assembly of claim 13, wherein a curvature radius of the object-side surface of the sixth lens element is R11, a curvature radius of the image-side surface of the sixth lens element is R12, and the following condition is satisfied:

$$-0.10<(R11-R12)/(R11+R12)<0.35.$$

23. The image capturing lens assembly of claim 13, wherein the axial distance between the object-side surface of the first lens element and the image surface is TL, a maximum image height of the image capturing lens assembly is ImgH, the half of the maximal field of view of the image capturing lens assembly is HFOV, and the following condition is satisfied:

$$0.20<TL/(ImgH*\tan(HFOV))<1.35.$$

24. The image capturing lens assembly of claim 13, wherein a central thickness of the fourth lens element is the largest among the first lens element, the second lens element, the third lens element, the fourth lens element, the fifth lens element, and the sixth lens element.

25. An image capturing lens assembly comprising six lens elements, the six lens elements being, in order from an object side to an image side: a first lens element, a second lens element, a third lens element, a fourth lens element, a fifth lens element and a sixth lens element; each of the six lens elements comprising an object-side surface facing toward the object side and an image-side surface facing toward the image side;
   wherein the object-side surface of the first lens element is concave in a paraxial region thereof, the image-side surface of the sixth lens element is aspheric and concave in a paraxial region thereof, and the image-side surface of the sixth lens element has at least one inflection point thereon;
   wherein the image capturing lens assembly has a total of six lens elements; a maximum refractive index among the six lens elements is Nmax, a half of a maximal field of view of the image capturing lens assembly is HFOV, and the following conditions are satisfied:

$$1.660 \leq N\max<1.72; \text{ and}$$

$$0<1/\tan(HFOV)<0.70.$$

26. The image capturing lens assembly of claim 25, wherein the third lens element has negative refractive power and the images-side surface of the third lens element is concave in a paraxial region thereof.

27. The image capturing lens assembly of claim 25, wherein the image-side surface of the first lens element is concave in a paraxial region thereof, a focal length of the image capturing lens assembly is f, a focal length of the second lens element is f2, and the following condition is satisfied:

$$0.15<f/f2<1.80.$$

28. The image capturing lens assembly of claim 25, wherein the object-side surface of the sixth lens element is convex in a paraxial region thereof, an axial distance between the object-side surface of the first lens element and an image surface is TL, a maximum image height of the image capturing lens assembly is ImgH, and the following condition is satisfied:

$$TL/ImgH<1.80.$$

29. The image capturing lens assembly of claim 25, wherein a focal length of the image capturing lens assembly is f, an entrance pupil diameter of the image capturing lens assembly is EPD, and the following condition is satisfied:

$$1.25<f/EPD<2.30.$$

30. The image capturing lens assembly of claim 29, wherein the object-side surface of the third lens element is convex in a paraxial region thereof, the maximal field of view of the image capturing lens assembly is FOV, and the following condition is satisfied:

$$110 \text{ degrees}<FOV<150 \text{ degrees}.$$

31. The image capturing lens assembly of claim 25, wherein the object-side surface of the fifth lens element is convex in a paraxial region thereof.

32. The image capturing lens assembly of claim 25, wherein the image-side surface of the fifth lens element is concave in a paraxial region thereof, an axial distance between the object-side surface of the first lens element and an image surface is TL, a focal length of the image capturing lens assembly is f, and the following condition is satisfied:

$$1.50<TL/f<5.0.$$

33. The image capturing lens assembly of claim 25, wherein a curvature radius of the object-side surface of the first lens element is R1, a curvature radius of the image-side surface of the first lens element is R2, and the following condition is satisfied:

$$0.19 \leq |R2/R1| \leq 0.56.$$

34. An image capturing lens assembly comprising six lens elements, the six lens elements being, in order from an object side to an image side: a first lens element, a second lens element, a third lens element, a fourth lens element, a fifth lens element and a sixth lens element; each of the six lens elements comprising an object-side surface facing toward the object side and an image-side surface facing toward the image side;
   wherein the image-side surface of the fifth lens element is concave in a paraxial region thereof, the image-side surface of the sixth lens element is aspheric and concave in a paraxial region thereof, and the image-side surface of the sixth lens element has at least one inflection point thereon;
   wherein the image capturing lens assembly has a total of six lens elements; a maximum refractive index among the six lens elements is Nmax, a half of a maximal field of view of the image capturing lens assembly is HFOV, an axial distance between the object-side surface of the first lens element and an image surface is TL, a focal length of the image capturing lens assembly is f, and the following conditions are satisfied:

$$1.660 \leq N\max<1.72;$$

$$0<1/\tan(HFOV)<0.70; \text{ and}$$

$$1.50<TL/f<5.0.$$

35. The image capturing lens assembly of claim 34, wherein the fifth lens element has negative refractive power.

36. The image capturing lens assembly of claim 34, wherein the object-side surface of the fifth lens element is convex in a paraxial region thereof.

37. The image capturing lens assembly of claim 34, wherein the object-side surface of the sixth lens element is convex in a paraxial region thereof, the axial distance between the object-side surface of the first lens element and the image surface is TL, a maximum image height of the image capturing lens assembly is ImgH, and the following condition is satisfied:

$TL/ImgH < 1.80$.

38. The image capturing lens assembly of claim 34, wherein a maximum image height of the image capturing lens assembly is ImgH, a curvature radius of the image-side surface of the sixth lens element is R12, the focal length of the image capturing lens assembly is f, an entrance pupil diameter of the image capturing lens assembly is EPD, and the following conditions are satisfied:

$1.0 < ImgH/R12 < 8.0$; and $1.25 < f/EPD < 2.30$.

39. The image capturing lens assembly of claim 34, wherein the axial distance between the object-side surface of the first lens element and the image surface is TL, a maximum image height of the image capturing lens assembly is ImgH, the half of the maximal field of view of the image capturing lens assembly is HFOV, and the following condition is satisfied:

$0.20 < TL/(ImgH * \tan(HFOV)) < 1.50$.

* * * * *